US012508243B2

(12) United States Patent
Gomperts et al.

(10) Patent No.: US 12,508,243 B2
(45) Date of Patent: Dec. 30, 2025

(54) COMPOSITIONS AND METHODS FOR TREATING CANCER AND IMPROVING EPITHELIAL HOMEOSTASIS

(71) Applicant: The Regents of the University of California, Oakland, CA (US)

(72) Inventors: Brigitte N. Gomperts, Los Angeles, CA (US); Cody J. Aros, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 683 days.

(21) Appl. No.: 17/789,044

(22) PCT Filed: Oct. 26, 2020

(86) PCT No.: PCT/US2020/057332
§ 371 (c)(1),
(2) Date: Jun. 24, 2022

(87) PCT Pub. No.: WO2021/133460
PCT Pub. Date: Jul. 1, 2021

(65) Prior Publication Data
US 2023/0092441 A1    Mar. 23, 2023

Related U.S. Application Data

(60) Provisional application No. 62/953,260, filed on Dec. 24, 2019.

(51) Int. Cl.
| | | |
|---|---|---|
| A61K 31/352 | (2006.01) | |
| A61K 31/404 | (2006.01) | |
| A61K 31/496 | (2006.01) | |
| A61K 31/5377 | (2006.01) | |
| A61P 11/00 | (2006.01) | |
| A61P 35/00 | (2006.01) | |

(52) U.S. Cl.
CPC .......... *A61K 31/352* (2013.01); *A61K 31/404* (2013.01); *A61K 31/496* (2013.01); *A61K 31/5377* (2013.01); *A61P 11/00* (2018.01); *A61P 35/00* (2018.01)

(58) Field of Classification Search
CPC ..... A61K 31/352; A61K 31/404; A61P 11/00; A61P 35/00
See application file for complete search history.

(56) References Cited

FOREIGN PATENT DOCUMENTS

| EP | 2902388 A1 | 8/2015 |
|---|---|---|
| KR | 20200055867 A | 5/2020 |
| WO | WO-2009/060215 A1 | 5/2009 |
| WO | WO-2009/089508 A1 | 7/2009 |
| WO | WO-2017/001733 A1 | 1/2017 |
| WO | WO-2018/223023 A1 | 12/2018 |
| WO | WO-2020/130120 A1 | 6/2020 |
| WO | WO-2021/133460 A1 | 7/2021 |

OTHER PUBLICATIONS

Betts et al., Anatomy and Physiology, Ch. 4.2 Epithelial Tissue, OpenStax, Houston, TX., Apr. 25, 2013 (Year: 2013).*
Youngson, R.M., "Lung Cancer." The Royal Society of Medicine Health Encyclopedia, 2nd ed., Bloomsbury, published 2000, retrieved from Credo Reference, https://search.credoreference.com/articles/Qm9va0FydGljbGU6MTU1MDMzOA==?aid=279753 on Mar. 27, 2025 (Year: 2000).*
Henderson et al., PNAS, 2010, 107(32), 14309-14314 (Year: 2010).*
Hynds R.E. & Janes S.M., Cancer Prev. Res., 2017, 10(9), 491-493 (Year: 2017).*
Kim, Y., Journal of Thoracic Oncology, 2016, 11(12), 2193-2201 (Year: 2016).*
Ooi et al., Cancer Res., 2010, 70(16), 6639-6648 (Year: 2010).*
Goel et al., International Journal of Pharmaceutical Investigation, 2013, 3(1), 8-14 (Year: 2013).*
Areias et al., "New chromene scaffolds for adenosine A2A receptors: Synthesis, pharmacology and structure-activity relationships," Eur J Med Chem, 54: 303-310 (2012).
Aros et al., "High-throughput drug screening identifies a potent Wnt inhibitor that promotes airway basal stem cell homeostasis," Cell Reports D, 1-18 (Nov. 5, 2019).
Asadipour et al., "Novel coumarin-3-carboxamides bearing N-benzylpiperidine moiety as potent acetylcholinesterase inhibitors," Eur J Med Chem, 70: 623-630 (2013).
Bastakoty et al., "Inhibition of Wnt/ß-catenin pathway promotes regenerative repair of cutaneous and cartilage injury," J FASEB, 29(12): 4881-4892 (2015).
Bastakoty et al., "Wnt/ß-catenin pathway in tissue injury: roles in pathology and therapeutic opportunities for regeneration," J FASEB, 30(10): 3271-3284 (2016).
Bi et al., "Anti-tumor activity of three ginsenoside derivatives in lung cancer is associated with Wnt/ß-catenin signaling inhibition," European Journal of Pharmacology, 742: 145-152 (2014).
Bujak et al., "Discovery of TRAF-2 and NCK-interacting kinase (TNIK) inhibitors by ligand-based virtual screening methods," MedChemComm, 6(8): 1564-1572 (2015).
Cheng et al., "Therapeutic potential of targeting the Wnt/β-catenin signaling pathway in colorectal cancer," Biomedicine & Pharmacotherapy, 110:473-481 (2019).
Emami et al., "A small molecule inhibitor of ß-catenin/CREB-binding protein transcription," PNAS, 101(34): 12682-12687 (2004).
Fujii et al., "An antagonist of dishevelled protein-protein interaction suppresses ß-catenin—dependent tumor cell growth," Cancer Res, 67(2): 573-579 (2007).

(Continued)

*Primary Examiner* — John S Kenyon
*Assistant Examiner* — Sara Elizabeth Bell
(74) *Attorney, Agent, or Firm* — Foley Hoag LLP; David P. Halstead; Alexander J. Chatterley

(57) ABSTRACT

The present disclosure relates to compositions for use in the treatment of certain disorders (e.g., cancer). The present disclosure also provides methods of treating cancer and/or promoting airway homeostasis.

14 Claims, 34 Drawing Sheets

(56) References Cited

OTHER PUBLICATIONS

Giangreco et al., "ß-Catenin determines upper airway progenitor cell fate and preinvasive squamous lung cancer progression by modulating epithelial-mesenchymal transition," J Pathol, 226(4): 575-587 (2012).
Harb et al., "Recent development of Wnt signaling pathway inhibitors for cancer therapeutics," Current Oncology Reports, 21(2): 12 (2019).
Hu et al., "The role of the Wnt/ß-catenin-Annexin A1 pathway in the process of sevoflurane-induced cognitive dysfunction," J Neurochem, 137(2): 240-252 (2016).
International Search Report and Written Opinion for International Application No. PCT/US2020/057332 mailed Feb. 17, 2021.
Kempen et al., "6-Substituted 2-oxo-2H-1-benzopyran-3-carboxylic acid derivatives in a new approach of the treatment of cancer cell invasion and metastasis," Eur J Med Chem, 43(12): 2735-2750 (2008).
Korolkov et al., "Synthesis of substituted coumarins and their carborane derivatives as potencial anticancer drugs," Chemical Journal of Kazakhstan, 2(66): 219-229 (2019).
Lafyatis et al., "Inhibition of ß-Catenin Signaling in the Skin Rescues Cutaneous Adipogenesis in Systemic Sclerosis: A Randomized, Double-Blind, Placebo-Controlled Trial of C-82," JInvestDermatol, 137(12): 2473-2483 (2017).
Lu., "EGFR and WNT/ß-catenin signalling in airway homeostasis and repair," Doctoral Dissertation, University College London (168 pages) (2011).
Lynch et al., "Wnt signaling regulates airway epithelial stem cells in adult murine submucosal glands," Stem Cells, 34(11): 2758-2771 (2016).
Malleske et al., "Regulation of Human Airway Epithelial Tissue Stem Cell Differentiation by ß-Catenin, P300, and CBP," Stem Cells, 36(12): 1905-1916 (2018).
PubChem CID: 3975636; IUPAC Name: N-butyl-8-methoxy-2-oxochromene-3-carboxamide; Create date: Sep. 12, 2005; National Center for Biotechnology Information. Retrieved from URL: <https://pubchem.ncbi.nlm.nih.gov/compound/3975636>. & BioAssay AID: 1347041.
PubChem CID: 43816620; IUPAC Name: 8-methoxy-N-[2-(5-methylfuran-2-yl)phenyl]-2-oxochromene-3-carboxamide; Create date: Jul. 21, 2009; National Center for Biotechnology Information. Retrieved from URL: <https://pubchem.ncbi.nlm.nih.gov/compound/43816620>. & BioAssay AID: 1259416.
PubChem CID: 754821; IUPAC Name: 8-methoxy-2-oxo-N-phenylchromene-3-carboxamide; Create date: Jul. 8, 2005; National Center for Biotechnology Information. Retrieved from URL: <https://pubchem.ncbi.nlm.nih.gov/compound/754821>. & BioAssay AIDs: 1259422, 1259374, 1259354, 1259310, 492967, 493162, 485395, 504770, 404320, 404326, 404321, 1949, 404327 and 404323.
Robert et al., "Novel 3-carboxamide-coumarins as potent and selective FXIIa inhibitors," J Med Chem, 51(11): 3077-3080 (2008).
Sang et al., "FAM46B suppresses proliferation, migration and invasion of non-small cell lung cancer via ß-catenin/MMP7 signaling," Transl Cancer Res, 8(4): 1497-1505 (2019).
Shah et al., "Synthesis of some new carboxanilides and amides of 8-methoxycoumarin-3-carboxylic acid as possible antifungal and antibacterial agents," Journal of the Indian Chemical Society, vol. LXIV: 708-709 (1987).
Tam et al., "Discovery of a Small Molecule Inhibitor of The Wnt Pathway (sm04646) Delivered as an Inhaled Aerosol for The Treatment of Idiopathic Pulmonary Fibrosis (IPF)," American Journal of Respiratory and Critical Care Medicine, American Thoracic Society International Conference Abstracts, In C28. From Targets to Therapies in Fibrosis, Poster Disussion Session, 195: A5139 (2017).
Wang et al., "Discovery of novel CDK8 inhibitors using multiple crystal structures in docking-based virtual screening," Eur J Med Chem, 129: 275-286 (2017).
Aros et al: "High-Throughput Drug screening Identifies a Potent Wnt Inhibitor that Promotes Airway Basal Stem Cell Homeostasis", Cell Reports, vol. 30, No. 7, Feb. 1, 2020, pp. 2055-2064+5.
Botham et al: "Dual Small-Molecule Targeting of Procaspase-3 Dramatically Enhances Zymogen Activation and Anticancer Activity", Journal of the American Chemical Society, vol. 136, No. 4, Jan. 29, 2014, pp. 1312-1319.
Partial Supplementary European Search Report for EP Application No. 20905509.4 dated Jan. 2, 2024.
Zorn et al: "Self-Assembling Small Molecules Form Nanofibrils That Bind Procaspase-3 to Promote Activation", Journal of the American Chemical Society, vol. 133, No. 49, Nov. 17, 2011, pp. 19630-19633.

* cited by examiner

Scale: 50μm

COMPOSITIONS AND METHODS FOR TREATING CANCER AND IMPROVING EPITHELIAL HOMEOSTASIS

RELATED APPLICATIONS

This application is the § 371 National Stage of PCT/US2020/057332, filed Oct. 26, 2020, which claims the benefit of U.S. Provisional Patent Application No. 62/953,260, filed on Dec. 24, 2019; the contents of each of the aforementioned applications are hereby incorporated by reference in their entirety

STATEMENT OF GOVERNMENT SUPPORT

This invention was made with government support under Grant Numbers CA009056, GM008042, CA239655, CA208303, awarded by the National Institutes of Health. The government has certain rights in the invention.

BACKGROUND

The conducting airways play a vital role in host defense that protects mammals from airborne pathogens. This is accomplished by a specialized pseudostratified mucociliary epithelium that arises from anatomically-defined, resident adult airway basal stem cells (ABSCs) marked by Keratin 5 (K5) expression. Following injury, the tracheal repair response occurs in two distinct phases: initial epithelial denuding triggers ABSC proliferation followed by a phase of differentiation. This ultimately leads to epithelial repair with the optimal proportion of ABSCs and mucociliary cells. Dysregulated repair can lead to various pathologies, including ABSC hyperplasia and stepwise progression to squamous lung cancer (SqLC). As such, developing a nuanced understanding of the mechanisms governing ABSC homeostasis is paramount to making strides in improving clinical outcomes for lung diseases. However, the canonical Wnt/β-catenin signaling cascade, although previously implicated in modulating airway homeostasis, remains poorly understood. Thus there is an unmet need for therapies, such as small molecules that can restore dysregulated homeostasis, and improve the normal regenerative capacity of cells, thereby acting as clinically relevant interventions for epithelial diseases, such as epithelial cancers (e.g., lung cancer).

SUMMARY OF THE INVENTION

In one aspect, the present disclosure provides a method of:
i) treating cancer; or
ii) promoting epithelial homeostasis,
in a subject comprising administering to the subject a Wnt/β-catenin inhibitor.

DETAILED DESCRIPTION OF THE INVENTION

Figure 1A:
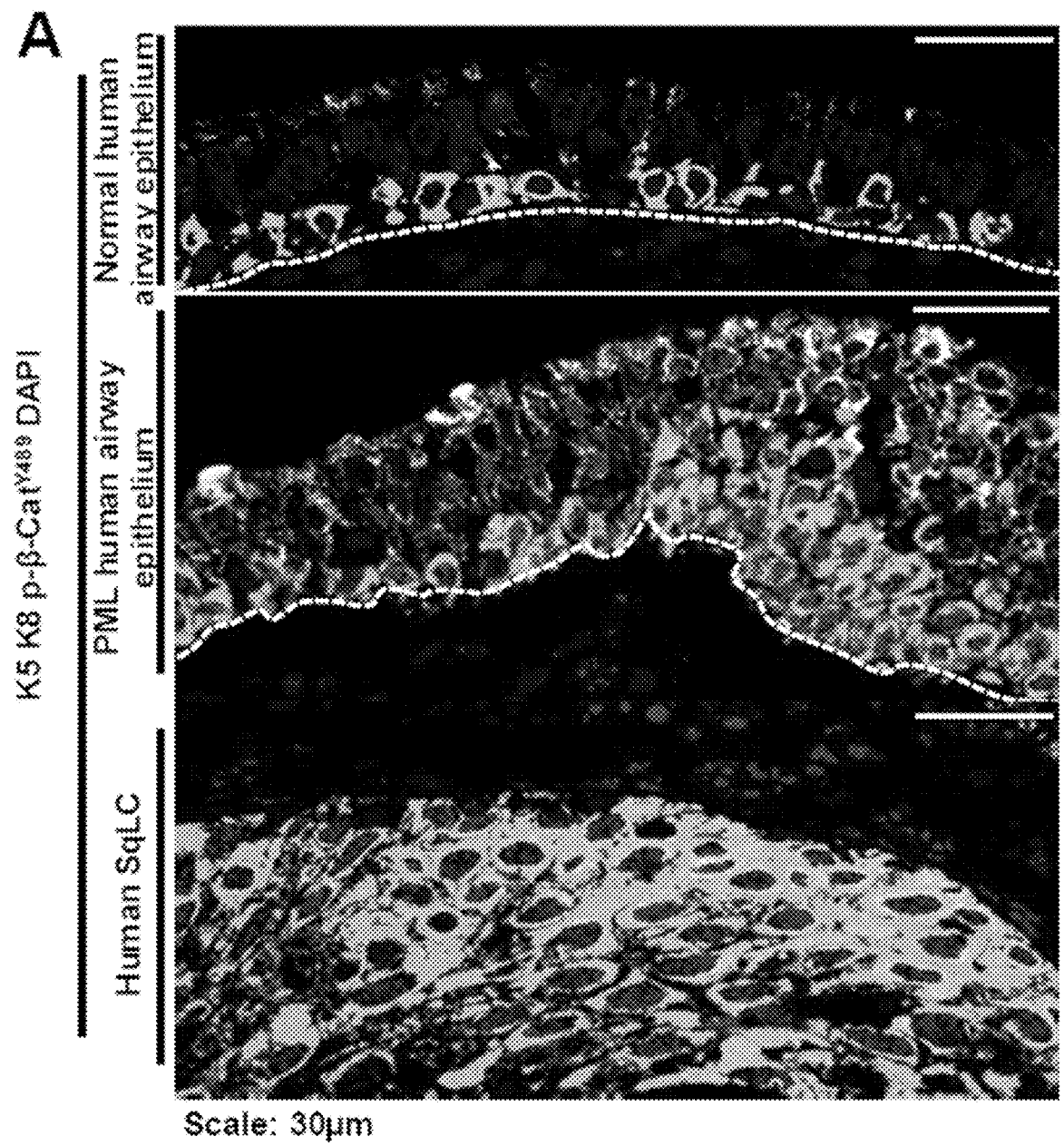
FIGS. 1A-1I shows the immunofluorescence (IF) staining and analysis of human patient airway samples for certain pathway components.
Figure 1B:
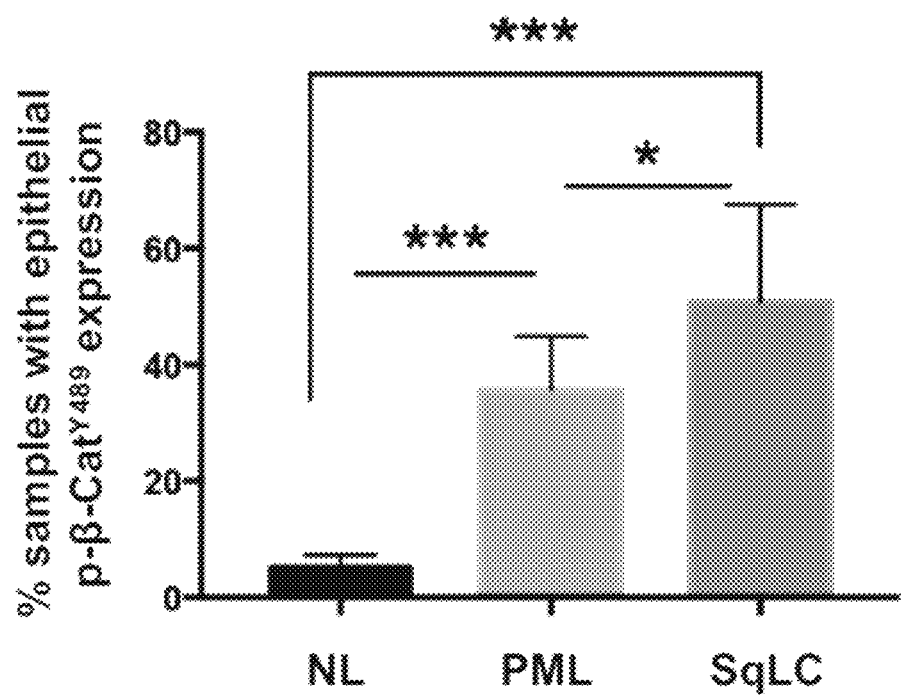

Lung premalignancy is characterized by loss of differentiated luminal cells and airway basal stem cell (ABSC) hyperproliferation. However, the mechanisms underpinning maintenance of airway epithelial homeostasis and ways to prevent its dysregulation remain elusive. Herein, is disclosed a phosphorylated form of β-catenin at Y489 (p-β-catenin$^{Y489}$) that emerged during human squamous lung cancer progression. Further disclosed is an in vitro model of ABSC progression by driving canonical Wnt/β-catenin signaling, resulting in a morphology that resembled premalignant lesions concomitant with loss of ciliated cell differentiation. To identify small molecules that could reverse this process, a high-throughput drug screen was performed for inhibitors of Wnt/β-catenin signaling. This screen unveiled Wnt Inhibitor Compound 1 (WIC1), a compound that suppressed TCF/LEF activity, reduced Wnt/β-catenin-driven human ABSC hyperproliferation and promoted ciliated cell differentiation in vitro. Further, this disclosure elucidates a dysregulated Wnt/p-β-catenin$^{Y489}$ signaling axis in lung premalignancy that can be modeled in vitro as well as the identification of a Wnt/β-catenin inhibitors that can restore airway homeostasis, such as WIC1. Therefore, WIC1 is an avenue to regenerative medicine applications with implications for promoting normal airway homeostasis after injury.

In one aspect, the present disclosure provides a method of:
i) treating cancer; or
ii) promoting epithelial homeostasis,
in a subject, comprising administering to the subject a Wnt/β-catenin inhibitor.

In certain embodiments of the methods disclosed herein, the Wnt/β-catenin inhibitor is a compound represented by formula (I):

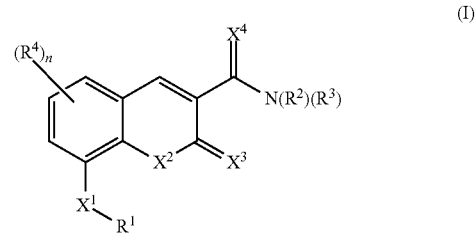

or a pharmaceutically acceptable salt thereof, wherein
$X^1$ and $X^2$ are each independently selected from O, S, and N($R^5$); or $X^1$ is H and $R^1$ is absent;
$X^2$ is O, S, or N($R^2$);
$X^3$ and $X^4$ are each independently selected from O, S, and N($R^5$);
$R^1$ is H, alkyl, acyl, oxyalkyl, alkyloxyalkyl, aminoalkyl, alkenyl, alkynyl, cycloalkyl, heterocyclylalkyl, sulfonamide, aryl, heteroaryl, heteroaralkyl, heterocyclyl, or aralkyl;

$R^2$ and $R^5$ are each, independently for each occurrence, selected from H or alkyl;

$R^3$ is alkyl, acyl, oxyalkyl, alkyloxyalkyl, aminoalkyl, alkenyl, alkynyl, cycloalkyl, heterocyclylalkyl, sulfonamide, aryl, heteroaryl, heteroaralkyl, heterocyclyl, or aralkyl;

each $R^4$ is independently selected from alkyl, halo, hydroxyl, carboxyl, acyl, ester, thioester, alkoxy, phosphoryl, amino, amido, cyano, nitro, azido, alkylthio, alkenyl, alkynyl, cycloalkyl, heterocyclylalkyl, heteroaralkyl, sulfonamide, aryl, heteroaryl, heterocyclyl, and aralkyl; and n is 0, 1, 2, or 3.

In certain embodiments, the compound is not

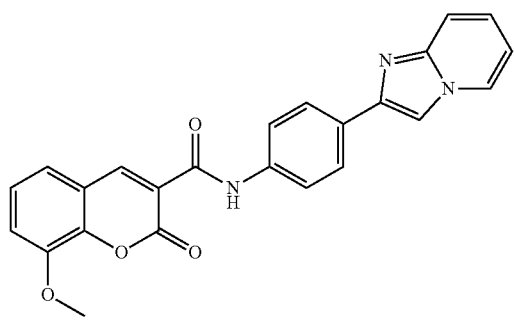 [SMILES: COc1cccc2cc(C(=O)Nc3ccc(-c4cn5ccccc5n4)cc3)c(=O)oc12]

or a pharmaceutically acceptable salt thereof.

In certain embodiments of Formula (I), $X^1$ is O.

In certain embodiments of Formula (I), $R^1$ is alkyl (e.g., methyl). In certain such embodiments, $R^1$ is methyl and $X^1$ is O.

In certain embodiments of Formula (I), $X^1$ is H and $R^1$ is absent.

In certain embodiments of Formula (I), $X^2$ is O.

In certain embodiments of Formula (I), $X^3$ is O.

In certain embodiments of Formula (I), $X^4$ is O.

In certain embodiments of Formula (I), $X^1$ is O, $X^2$ is O, $X^3$ is O, and $X^4$ is O.

In certain embodiments of Formula (I), $R^2$ is H. In other embodiments, $R^2$ is alkyl (e.g., methyl).

In certain embodiments, the compound is represented by formula Ia:

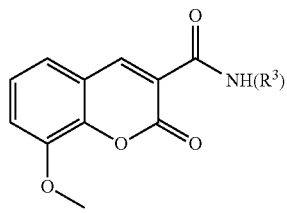

or a pharmaceutically acceptable salt thereof.

In certain embodiments of formula (I) or formula (Ia), $R^3$ is alkyl (e.g., butyl). In other embodiments, $R^3$ is aryl (e.g., phenyl). In other embodiment, $R^3$ is heterocyclyl (e.g., indolinyl).

In certain embodiments, $R^3$ is substituted with one or more $R^6$, wherein each $R^6$ is independently selected from alkyl, halo, hydroxyl, carboxyl, acyl, ester, thioester, alkoxy, phosphoryl, amino, amido, cyano, nitro, azido, alkylthio, alkenyl, alkynyl, cycloalkyl, heterocyclylalkyl, heteroaralkyl, sulfonamide, aryl, heteroaryl, heterocyclyl, and aralkyl.

In certain preferred embodiments, $R^3$ is substituted with one $R^6$. In certain even further preferred embodiments, $R^3$ is a nitrogen-containing heterocyclyl (e.g., indolinyl) and the nitrogen of the heterocyclyl is substituted with one $R^6$.

In certain embodiments, $R^6$ is heteroaryl (e.g., methylfuranyl), heterocyclylalkyl (e.g., morpholinylmethyl), or acyl (e.g., acetyl, cyclopropanecarbonyl, tertiary-butylcarbonyl, or cyclopentylcarbonyl).

In certain embodiments, the compound represented by formula (I) is:

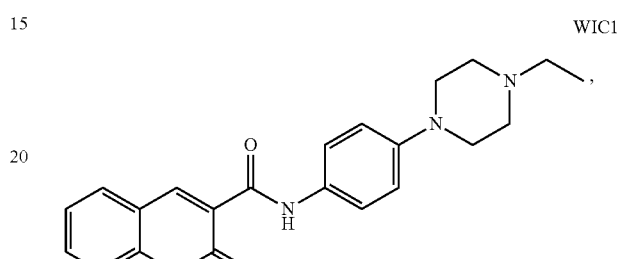
WIC1

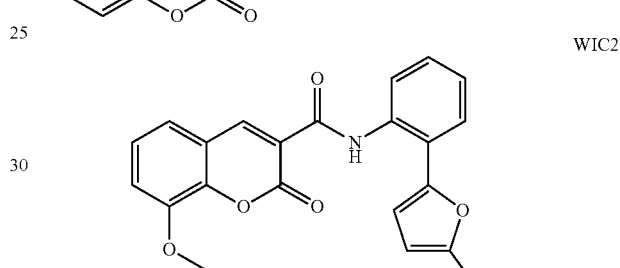
WIC2

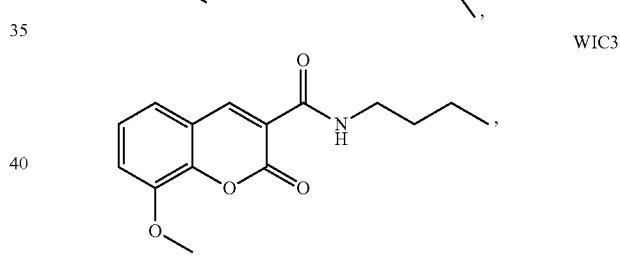
WIC3

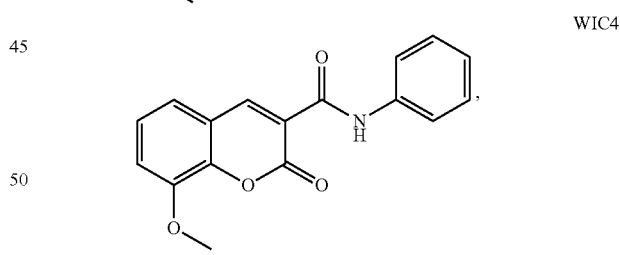
WIC4

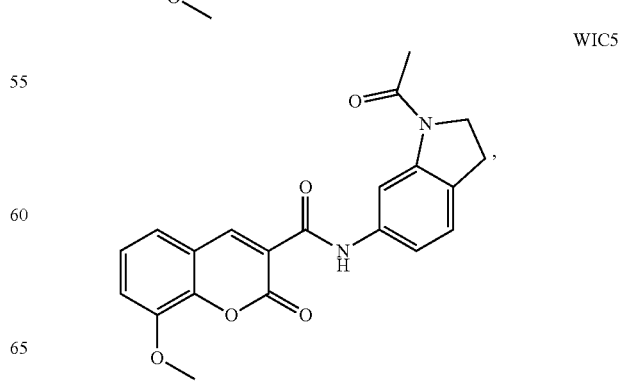
WIC5

-continued

WIC6
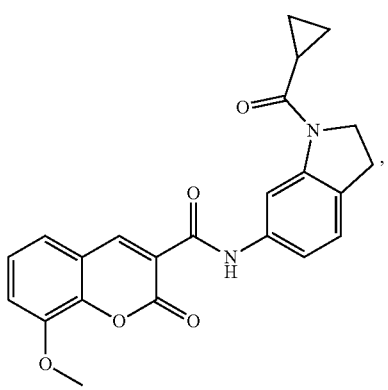

WIC7
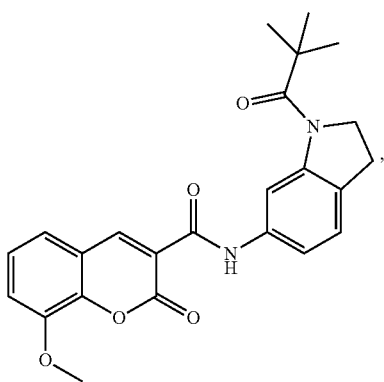

WIC8
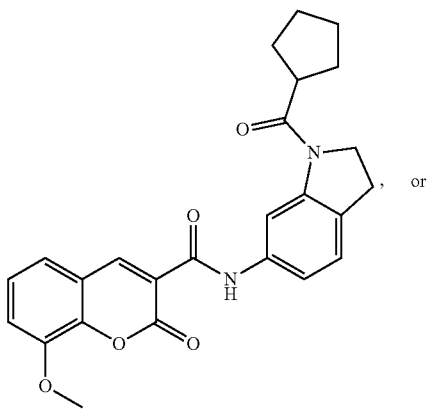, or

WIC9
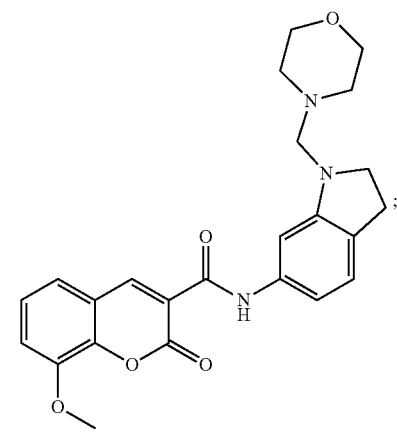;

or a pharmaceutically acceptable salt thereof.

In certain embodiments of the methods disclosed herein, the Wnt/β-catenin inhibitor is IWR1, XAV939, NVP-TNKS656, JW74, IWP-2, NSC668036, J01-017a, PKF115-584, ICG-001, PKF118-310, NCB-0846, LGK974, OMP-18R5 (Vantictumab), OMP-54 F28 (Ipafricept), Foxy-5, OTSA 101, CWP232291, PRI-724, DKN-01, Niclosamide, Sulindac, Pyrvinium, MK0752, RO4929097, PF-03084014, BMS-906024, MEDI0639, OMP-52M51, Vismodegib, Erismodegib, Glasdegibo Saridegib (IPI-926), SM08502, XAV-939, ICG-001, IWR-1-endo, Wnt-C59 (C59), IWP-2, IWP-L6, iCRT14, or IWP-O1.

In certain embodiments of the methods disclosed herein, the methods treat cancer in a subject in need thereof. In certain preferred embodiments, the cancer is mediated by Wnt/β-catenin signaling. In certain even further preferred embodiments, the cancer is mediated by loss of differential luminal cells and airway basal stem cell (ABSC) hyperproliferation. In certain embodiments, the cancer is lung cancer. In certain embodiments, the lung cancer is squamous lung cancer. In other embodiments, the cancer is bronchial cancer.

In certain embodiments, the method inhibits Wnt/β-catenin signaling.

In certain embodiments, the method inhibits ABSC hyperproliferation.

In certain embodiments, the method promotes epithelial homeostasis.

In certain embodiments, prior to administration of the compound, the subject has suffered an injury to their airway. In certain embodiments, the subject suffered the injury 1, 2, 3, 4, 5, 6, 7, 8, 9, 10, 11, or 12 months prior to administration of the compound.

In certain embodiments, the compound is administered by pulmonary administration, e.g., via inhaler. In other embodiments, the compound is administered topically.

In certain aspects, the present disclosure provides pharmaceutical compositions comprising a compound represented by formula (I) and at least one pharmaceutically acceptable excipient:

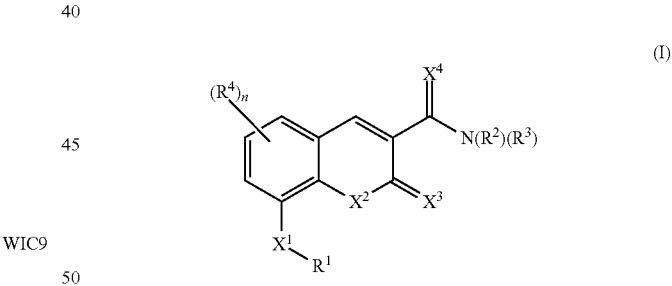

or a pharmaceutically acceptable salt thereof, wherein
X$^1$ and X$^2$ are each independently selected from O, S, and N(R$^5$); or X$^1$ is H and R$^1$ is absent;
X$^2$ is O, S, or N(R$^2$);
X$^3$ and X$^4$ are each independently selected from O, S, and N(R$^5$);
R$^1$ is H, alkyl, acyl, oxyalkyl, alkyloxyalkyl, aminoalkyl, alkenyl, alkynyl, cycloalkyl, heterocyclylalkyl, sulfonamide, aryl, heteroaryl, heteroaralkyl, heterocyclyl, or aralkyl;
R$^2$ and R$^5$ are each, independently for each occurrence, selected from H or alkyl;
R$^3$ is alkyl, acyl, oxyalkyl, alkyloxyalkyl, aminoalkyl, alkenyl, alkynyl, cycloalkyl, heterocyclylalkyl, sulfonamide, aryl, heteroaryl, heteroaralkyl, heterocyclyl, or aralkyl;

each R⁴ is independently selected from alkyl, halo, hydroxyl, carboxyl, acyl, ester, thioester, alkoxy, phosphoryl, amino, amido, cyano, nitro, azido, alkylthio, alkenyl, alkynyl, cycloalkyl, heterocyclylalkyl, heteroaralkyl, sulfonamide, aryl, heteroaryl, heterocyclyl, and aralkyl; and n is 0, 1, 2, or 3.

In certain embodiments, the compound is not

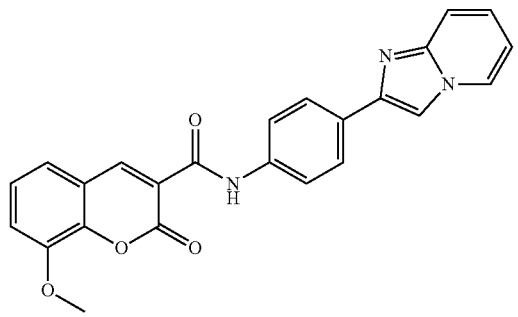 [SMILES: COc1cccc2cc(C(=O)Nc3ccc(-c4cn5ccccc5n4)cc3)c(=O)oc12]

or a pharmaceutically acceptable salt thereof.

In certain embodiments of Formula (I), $X^1$ is O.

In certain embodiments of Formula (I), $R^1$ is alkyl (e.g., methyl). In certain such embodiment, $R^1$ is methyl and $X^1$ is O.

In certain embodiments of Formula (I), $X^1$ is H and $R^1$ is absent.

In certain embodiments of Formula (I), $X^2$ is O.

In certain embodiments of Formula (I), $X^3$ is O.

In certain embodiments of Formula (I), $X^4$ is O.

In certain embodiments of Formula (I), $X^1$ is O, $X^2$ is O, $X^3$ is O, and $X^4$ is O.

In certain embodiments of Formula (I), $R^2$ is H. In other embodiments, $R^2$ is alkyl (e.g., methyl).

In certain embodiments, the compound is represented by formula Ia:

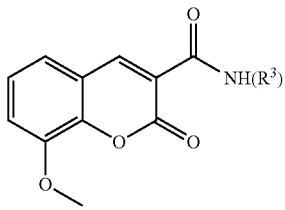

or a pharmaceutically acceptable salt thereof.

In certain embodiments of formula (I) or formula (Ia), $R^3$ is alkyl (e.g., butyl). In other embodiments, $R^3$ is aryl (e.g., phenyl). In other embodiment, $R^3$ is heterocyclyl (e.g., indolinyl).

In certain embodiments, $R^3$ is substituted with one or more $R^6$, wherein each $R^6$ is independently selected from alkyl, halo, hydroxyl, carboxyl, acyl, ester, thioester, alkoxy, phosphoryl, amino, amido, cyano, nitro, azido, alkylthio, alkenyl, alkynyl, cycloalkyl, heterocyclylalkyl, heteroaralkyl, sulfonamide, aryl, heteroaryl, heterocyclyl, and aralkyl. In certain preferred embodiments, $R^3$ is substituted with one $R^6$. In certain even further preferred embodiments, $R^3$ is a nitrogen-containing heterocyclyl (e.g., indolinyl) and the nitrogen of the heterocyclyl is substituted with one $R^6$.

In certain embodiments, $R^6$ is heteroaryl (e.g., methylfuranyl), heterocyclylalkyl (e.g., morpholinylmethyl), or acyl (e.g., acetyl, cyclopropanecarbonyl, tertiary-butylcarbonyl, or cyclopentylcarbonyl).

In certain embodiments the compound represented by formula (I) is:

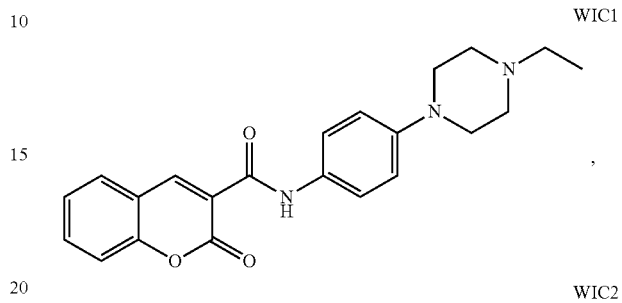

WIC1

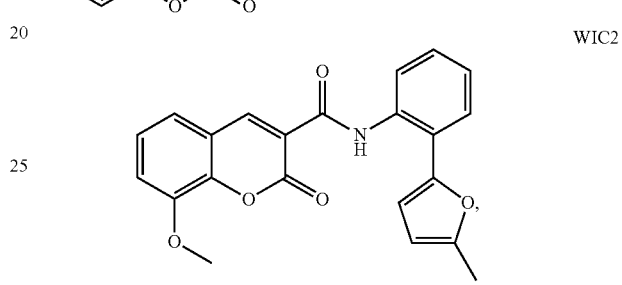

WIC2

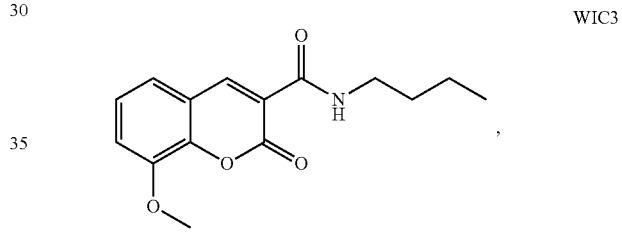

WIC3

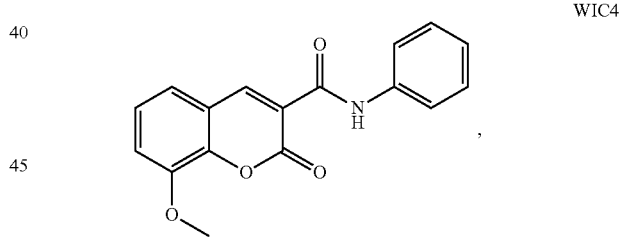

WIC4

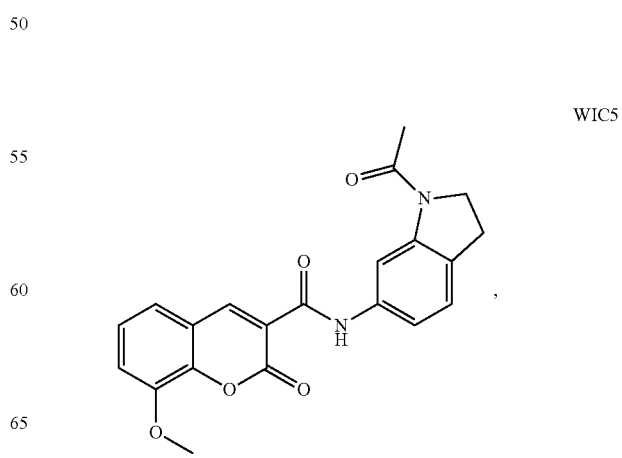

WIC5

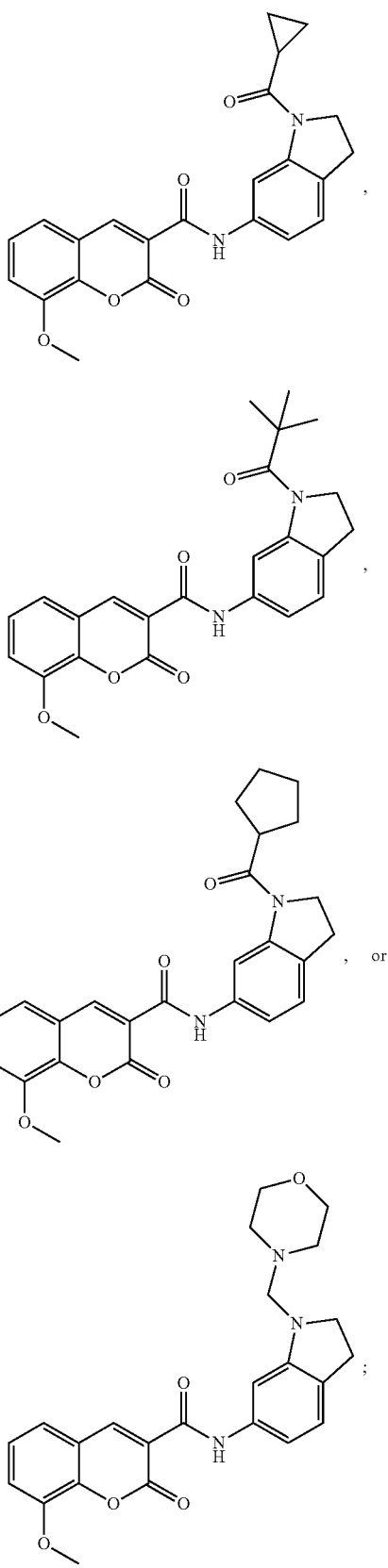

or a pharmaceutically acceptable salt thereof.

In certain embodiments, the composition is formulated for topical administration. In other embodiments, the composition is formulated for systemic administration (e.g., intravenous administration or oral administration). In yet other embodiments, the composition is formulated for pulmonary administration (e.g., via inhaler).

In certain aspects, the present disclosure provides pharmaceutical compositions comprising a Wnt/β-catenin inhibitor, wherein the composition is formulated for topical administration or pulmonary administration, e.g., via inhaler.

In certain embodiments, the composition is formulated for topical administration. In other embodiments, the composition is formulated for pulmonary administration, e.g., via inhaler.

Pharmaceutical Compositions

The compositions and methods of the present invention may be utilized to treat an individual in need thereof. In certain embodiments, the individual is a mammal such as a human, or a non-human mammal. When administered to an animal, such as a human, the composition or the compound is preferably administered as a pharmaceutical composition comprising, for example, a compound of the invention and a pharmaceutically acceptable carrier. Pharmaceutically acceptable carriers are well known in the art and include, for example, aqueous solutions such as water or physiologically buffered saline or other solvents or vehicles such as glycols, glycerol, oils such as olive oil, or injectable organic esters. In preferred embodiments, when such pharmaceutical compositions are for human administration, particularly for invasive routes of administration (i.e., routes, such as injection or implantation, that circumvent transport or diffusion through an epithelial barrier), the aqueous solution is pyrogen-free, or substantially pyrogen-free. The excipients can be chosen, for example, to effect delayed release of an agent or to selectively target one or more cells, tissues or organs. The pharmaceutical composition can be in dosage unit form such as tablet, capsule (including sprinkle capsule and gelatin capsule), granule, lyophile for reconstitution, powder, solution, syrup, suppository, injection or the like. The composition can also be present in a transdermal delivery system, e.g., a skin patch. The composition can also be present in a solution suitable for topical administration, such as a lotion, cream, or ointment.

A pharmaceutically acceptable carrier can contain physiologically acceptable agents that act, for example, to stabilize, increase solubility or to increase the absorption of a compound such as a compound of the invention. Such physiologically acceptable agents include, for example, carbohydrates, such as glucose, sucrose or dextrans, antioxidants, such as ascorbic acid or glutathione, chelating agents, low molecular weight proteins or other stabilizers or excipients. The choice of a pharmaceutically acceptable carrier, including a physiologically acceptable agent, depends, for example, on the route of administration of the composition. The preparation or pharmaceutical composition can be a selfemulsifying drug delivery system or a selfmicroemulsifying drug delivery system. The pharmaceutical composition (preparation) also can be a liposome or other polymer matrix, which can have incorporated therein, for example, a compound of the invention. Liposomes, for example, which comprise phospholipids or other lipids, are nontoxic, physiologically acceptable and metabolizable carriers that are relatively simple to make and administer.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically acceptable carrier" as used herein means a pharmaceutically acceptable material, composition or vehicle, such as a liquid or solid filler, diluent, excipient, solvent or encapsulating material. Each carrier must be "acceptable" in the sense of being compatible with the other ingredients of the formulation and not injurious to the patient. Some examples of materials which can serve as pharmaceutically acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations.

A pharmaceutical composition (preparation) can be administered to a subject by any of a number of routes of administration including, for example, orally (for example, drenches as in aqueous or non-aqueous solutions or suspensions, tablets, capsules (including sprinkle capsules and gelatin capsules), boluses, powders, granules, pastes for application to the tongue); absorption through the oral mucosa (e.g., sublingually); subcutaneously; transdermally (for example as a patch applied to the skin); and topically (for example, as a cream, ointment or spray applied to the skin). The compound may also be formulated for inhalation. In certain embodiments, a compound may be simply dissolved or suspended in sterile water. Details of appropriate routes of administration and compositions suitable for same can be found in, for example, U.S. Pat. Nos. 6,110,973, 5,763,493, 5,731,000, 5,541,231, 5,427,798, 5,358,970 and 4,172,896, as well as in patents cited therein.

The formulations may conveniently be presented in unit dosage form and may be prepared by any methods well known in the art of pharmacy. The amount of active ingredient which can be combined with a carrier material to produce a single dosage form will vary depending upon the host being treated, the particular mode of administration. The amount of active ingredient that can be combined with a carrier material to produce a single dosage form will generally be that amount of the compound which produces a therapeutic effect. Generally, out of one hundred percent, this amount will range from about 1 percent to about ninety-nine percent of active ingredient, preferably from about 5 percent to about 70 percent, most preferably from about 10 percent to about 30 percent.

Methods of preparing these formulations or compositions include the step of bringing into association an active compound, such as a compound of the invention, with the carrier and, optionally, one or more accessory ingredients. In general, the formulations are prepared by uniformly and intimately bringing into association a compound of the present invention with liquid carriers, or finely divided solid carriers, or both, and then, if necessary, shaping the product.

Formulations of the invention suitable for oral administration may be in the form of capsules (including sprinkle capsules and gelatin capsules), cachets, pills, tablets, lozenges (using a flavored basis, usually sucrose and acacia or tragacanth), lyophile, powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia) and/or as mouth washes and the like, each containing a predetermined amount of a compound of the present invention as an active ingredient. Compositions or compounds may also be administered as a bolus, electuary or paste.

To prepare solid dosage forms for oral administration (capsules (including sprinkle capsules and gelatin capsules), tablets, pills, dragees, powders, granules and the like), the active ingredient is mixed with one or more pharmaceutically acceptable carriers, such as sodium citrate or dicalcium phosphate, and/or any of the following: (1) fillers or extenders, such as starches, lactose, sucrose, glucose, mannitol, and/or silicic acid; (2) binders, such as, for example, carboxymethylcellulose, alginates, gelatin, polyvinyl pyrrolidone, sucrose and/or acacia; (3) humectants, such as glycerol; (4) disintegrating agents, such as agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, cetyl alcohol and glycerol monostearate; (8) absorbents, such as kaolin and bentonite clay; (9) lubricants, such a talc, calcium stearate, magnesium stearate, solid polyethylene glycols, sodium lauryl sulfate, and mixtures thereof; (10) complexing agents, such as, modified and unmodified cyclodextrins; and (11) coloring agents. In the case of capsules (including sprinkle capsules and gelatin capsules), tablets and pills, the pharmaceutical compositions may also comprise buffering agents. Solid compositions of a similar type may also be employed as fillers in soft and hard-filled gelatin capsules using such excipients as lactose or milk sugars, as well as high molecular weight polyethylene glycols and the like.

A tablet may be made by compression or molding, optionally with one or more accessory ingredients. Compressed tablets may be prepared using binder (for example, gelatin or hydroxypropylmethyl cellulose), lubricant, inert diluent, preservative, disintegrant (for example, sodium starch glycolate or cross-linked sodium carboxymethyl cellulose), surface-active or dispersing agent. Molded tablets may be made by molding in a suitable machine a mixture of the powdered compound moistened with an inert liquid diluent.

The tablets, and other solid dosage forms of the pharmaceutical compositions, such as dragees, capsules (including sprinkle capsules and gelatin capsules), pills and granules, may optionally be scored or prepared with coatings and shells, such as enteric coatings and other coatings well known in the pharmaceutical-formulating art. They may also be formulated so as to provide slow or controlled release of the active ingredient therein using, for example, hydroxypropylmethyl cellulose in varying proportions to provide the desired release profile, other polymer matrices, liposomes and/or microspheres. They may be sterilized by, for example, filtration through a bacteria-retaining filter, or by incorporating sterilizing agents in the form of sterile solid compositions that can be dissolved in sterile water, or some other sterile injectable medium immediately before use. These compositions may also optionally contain opacifying agents and may be of a composition that they release the active ingredient(s) only, or preferentially, in a certain portion of the gastrointestinal tract, optionally, in a delayed manner. Examples of embedding compositions that can be used include polymeric substances and waxes. The active ingredient can also be in microencapsulated form, if appropriate, with one or more of the above-described excipients.

Liquid dosage forms useful for oral administration include pharmaceutically acceptable emulsions, lyophiles for reconstitution, microemulsions, solutions, suspensions, syrups and elixirs. In addition to the active ingredient, the liquid dosage forms may contain inert diluents commonly used in the art, such as, for example, water or other solvents, cyclodextrins and derivatives thereof, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, and mixtures thereof.

Besides inert diluents, the oral compositions can also include adjuvants such as wetting agents, emulsifying and suspending agents, sweetening, flavoring, coloring, perfuming and preservative agents.

Suspensions, in addition to the active compounds, may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

Dosage forms for the topical or transdermal administration include powders, sprays, ointments, pastes, creams, lotions, gels, solutions, patches and inhalants. The active compound may be mixed under sterile conditions with a pharmaceutically acceptable carrier, and with any preservatives, buffers, or propellants that may be required.

The ointments, pastes, creams and gels may contain, in addition to an active compound, excipients, such as animal and vegetable fats, oils, waxes, paraffins, starch, tragacanth, cellulose derivatives, polyethylene glycols, silicones, bentonites, silicic acid, talc and zinc oxide, or mixtures thereof.

Powders and sprays can contain, in addition to an active compound, excipients such as lactose, talc, silicic acid, aluminum hydroxide, calcium silicates and polyamide powder, or mixtures of these substances. Sprays can additionally contain customary propellants, such as chlorofluorohydrocarbons and volatile unsubstituted hydrocarbons, such as butane and propane.

Transdermal patches have the added advantage of providing controlled delivery of a compound of the present invention to the body. Such dosage forms can be made by dissolving or dispersing the active compound in the proper medium. Absorption enhancers can also be used to increase the flux of the compound across the skin. The rate of such flux can be controlled by either providing a rate controlling membrane or dispersing the compound in a polymer matrix or gel.

The phrases "parenteral administration" and "administered parenterally" as used herein means modes of administration other than enteral and topical administration, usually by injection, and includes, without limitation, intravenous, intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal and intrasternal injection and infusion. Pharmaceutical compositions suitable for parenteral administration comprise one or more active compounds in combination with one or more pharmaceutically acceptable sterile isotonic aqueous or nonaqueous solutions, dispersions, suspensions or emulsions, or sterile powders which may be reconstituted into sterile injectable solutions or dispersions just prior to use, which may contain antioxidants, buffers, bacteriostats, solutes which render the formulation isotonic with the blood of the intended recipient or suspending or thickening agents.

Examples of suitable aqueous and nonaqueous carriers that may be employed in the pharmaceutical compositions of the invention include water, ethanol, polyols (such as glycerol, propylene glycol, polyethylene glycol, and the like), and suitable mixtures thereof, vegetable oils, such as olive oil, and injectable organic esters, such as ethyl oleate. Proper fluidity can be maintained, for example, by the use of coating materials, such as lecithin, by the maintenance of the required particle size in the case of dispersions, and by the use of surfactants.

These compositions may also contain adjuvants such as preservatives, wetting agents, emulsifying agents and dispersing agents. Prevention of the action of microorganisms may be ensured by the inclusion of various antibacterial and antifungal agents, for example, paraben, chlorobutanol, phenol sorbic acid, and the like. It may also be desirable to include isotonic agents, such as sugars, sodium chloride, and the like into the compositions. In addition, prolonged absorption of the injectable pharmaceutical form may be brought about by the inclusion of agents that delay absorption such as aluminum monostearate and gelatin.

In some cases, in order to prolong the effect of a drug, it is desirable to slow the absorption of the drug from subcutaneous or intramuscular injection. This may be accomplished by the use of a liquid suspension of crystalline or amorphous material having poor water solubility. The rate of absorption of the drug then depends upon its rate of dissolution, which, in turn, may depend upon crystal size and crystalline form. Alternatively, delayed absorption of a parenterally administered drug form is accomplished by dissolving or suspending the drug in an oil vehicle.

Injectable depot forms are made by forming microencapsulated matrices of the subject compounds in biodegradable polymers such as polylactide-polyglycolide. Depending on the ratio of drug to polymer, and the nature of the particular polymer employed, the rate of drug release can be controlled. Examples of other biodegradable polymers include poly(orthoesters) and poly(anhydrides). Depot injectable formulations are also prepared by entrapping the drug in liposomes or microemulsions that are compatible with body tissue.

For use in the methods of this invention, active compounds can be given per se or as a pharmaceutical composition containing, for example, 0.1 to 99.5% (more preferably, 0.5 to 90%) of active ingredient in combination with a pharmaceutically acceptable carrier.

Methods of introduction may also be provided by rechargeable or biodegradable devices. Various slow release polymeric devices have been developed and tested in vivo in recent years for the controlled delivery of drugs, including proteinaceous biopharmaceuticals.

A variety of biocompatible polymers (including hydrogels), including both biodegradable and non-degradable polymers, can be used to form an implant for the sustained release of a compound at a particular target site.

Actual dosage levels of the active ingredients in the pharmaceutical compositions may be varied so as to obtain an amount of the active ingredient that is effective to achieve the desired therapeutic response for a particular patient, composition, and mode of administration, without being toxic to the patient.

The selected dosage level will depend upon a variety of factors including the activity of the particular compound or combination of compounds employed, or the ester, salt or amide thereof, the route of administration, the time of administration, the rate of excretion of the particular compound(s) being employed, the duration of the treatment, other drugs, compounds and/or materials used in combination with the particular compound(s) employed, the age, sex, weight, condition, general health and prior medical history of the patient being treated, and like factors well known in the medical arts.

A physician or veterinarian having ordinary skill in the art can readily determine and prescribe the therapeutically effective amount of the pharmaceutical composition required. For example, the physician or veterinarian could start doses of the pharmaceutical composition or compound at levels lower than that required in order to achieve the desired therapeutic effect and gradually increase the dosage until the desired effect is achieved. By "therapeutically effective amount" is meant the concentration of a compound that is sufficient to elicit the desired therapeutic effect. It is generally understood that the effective amount of the compound will vary according to the weight, sex, age, and medical history of the subject. Other factors which influence the effective amount may include, but are not limited to, the severity of the patient's condition, the disorder being treated, the stability of the compound, and, if desired, another type of therapeutic agent being administered with the compound of the invention. A larger total dose can be delivered by multiple administrations of the agent. Methods to determine efficacy and dosage are known to those skilled in the art (Isselbacher et al. (1996) Harrison's Principles of Internal Medicine 13 ed., 1814-1882, herein incorporated by reference).

In general, a suitable daily dose of an active compound used in the compositions and methods of the invention will be that amount of the compound that is the lowest dose effective to produce a therapeutic effect. Such an effective dose will generally depend upon the factors described above.

If desired, the effective daily dose of the active compound may be administered as one, two, three, four, five, six or more sub-doses administered separately at appropriate intervals throughout the day, optionally, in unit dosage forms. In certain embodiments of the present invention, the active compound may be administered two or three times daily. In preferred embodiments, the active compound will be administered once daily.

The patient receiving this treatment is any animal in need, including primates, in particular humans; and other mammals such as equines, cattle, swine, sheep, cats, and dogs; poultry; and pets in general.

In certain embodiments, compounds of the invention may be used alone or conjointly administered with another type of therapeutic agent.

The present disclosure includes the use of pharmaceutically acceptable salts of compounds of the invention in the compositions and methods of the present invention. In certain embodiments, contemplated salts of the invention include, but are not limited to, alkyl, dialkyl, trialkyl or tetra-alkyl ammonium salts. In certain embodiments, contemplated salts of the invention include, but are not limited to, L-arginine, benenthamine, benzathine, betaine, calcium hydroxide, choline, deanol, diethanolamine, diethylamine, 2-(diethylamino)ethanol, ethanolamine, ethylenediamine, N-methylglucamine, hydrabamine, 1H-imidazole, lithium, L-lysine, magnesium, 4-(2-hydroxyethyl)morpholine, piperazine, potassium, 1-(2-hydroxyethyl)pyrrolidine, sodium, triethanolamine, tromethamine, and zinc salts. In certain embodiments, contemplated salts of the invention include, but are not limited to, Na, Ca, K, Mg, Zn or other metal salts. In certain embodiments, contemplated salts of the invention include, but are not limited to, 1-hydroxy-2-naphthoic acid, 2,2-dichloroacetic acid, 2-hydroxyethanesulfonic acid, 2-oxoglutaric acid, 4-acetamidobenzoic acid, 4-aminosalicylic acid, acetic acid, adipic acid, l-ascorbic acid, l-aspartic acid, benzenesulfonic acid, benzoic acid, (+)-camphoric acid, (+)-camphor-10-sulfonic acid, capric acid (decanoic acid), caproic acid (hexanoic acid), caprylic acid (octanoic acid), carbonic acid, cinnamic acid, citric acid, cyclamic acid, dodecylsulfuric acid, ethane-1,2-disulfonic acid, ethanesulfonic acid, formic acid, fumaric acid, galactaric acid, gentisic acid, d-glucoheptonic acid, d-gluconic acid, d-glucuronic acid, glutamic acid, glutaric acid, glycerophosphoric acid, glycolic acid, hippuric acid, hydrobromic acid, hydrochloric acid, isobutyric acid, lactic acid, lactobionic acid, lauric acid, maleic acid, l-malic acid, malonic acid, mandelic acid, methanesulfonic acid, naphthalene-1,5-disulfonic acid, naphthalene-2-sulfonic acid, nicotinic acid, nitric acid, oleic acid, oxalic acid, palmitic acid, pamoic acid, phosphoric acid, proprionic acid, l-pyroglutamic acid, salicylic acid, sebacic acid, stearic acid, succinic acid, sulfuric acid, l-tartaric acid, thiocyanic acid, p-toluenesulfonic acid, trifluoroacetic acid, and undecylenic acid salts.

The pharmaceutically acceptable acid addition salts can also exist as various solvates, such as with water, methanol, ethanol, dimethylformamide, and the like. Mixtures of such solvates can also be prepared. The source of such solvate can be from the solvent of crystallization, inherent in the solvent of preparation or crystallization, or adventitious to such solvent.

Wetting agents, emulsifiers and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically acceptable antioxidants include: (1) water-soluble antioxidants, such as ascorbic acid, cysteine hydrochloride, sodium bisulfate, sodium metabisulfite, sodium sulfite and the like; (2) oil-soluble antioxidants, such as ascorbyl palmitate, butylated hydroxyanisole (BHA), butylated hydroxytoluene (BHT), lecithin, propyl gallate, alpha-tocopherol, and the like; and (3) metal-chelating agents, such as citric acid, ethylenediamine tetraacetic acid (EDTA), sorbitol, tartaric acid, phosphoric acid, and the like.

Definitions

Unless otherwise defined herein, scientific and technical terms used in this application shall have the meanings that are commonly understood by those of ordinary skill in the art. Generally, nomenclature used in connection with, and techniques of, chemistry, cell and tissue culture, molecular biology, cell and cancer biology, neurobiology, neurochemistry, virology, immunology, microbiology, pharmacology, genetics and protein and nucleic acid chemistry, described herein, are those well known and commonly used in the art.

The methods and techniques of the present disclosure are generally performed, unless otherwise indicated, according to conventional methods well known in the art and as described in various general and more specific references that are cited and discussed throughout this specification. See, e.g. "Principles of Neural Science", McGraw-Hill Medical, New York, N.Y. (2000); Motulsky, "Intuitive Biostatistics", Oxford University Press, Inc. (1995); Lodish et al., "Molecular Cell Biology, 4th ed.", W. H. Freeman & Co., New York (2000); Griffiths et al., "Introduction to Genetic Analysis, 7th ed.", W. H. Freeman & Co., N.Y. (1999); and Gilbert et al., "Developmental Biology, 6th ed.", Sinauer Associates, Inc., Sunderland, MA (2000).

Chemistry terms used herein, unless otherwise defined herein, are used according to conventional usage in the art, as exemplified by "The McGraw-Hill Dictionary of Chemical Terms", Parker S., Ed., McGraw-Hill, San Francisco, C.A. (1985).

All of the above, and any other publications, patents and published patent applications referred to in this application are specifically incorporated by reference herein. In case of conflict, the present specification, including its specific definitions, will control.

The term "agent" is used herein to denote a chemical compound (such as an organic or inorganic compound, a mixture of chemical compounds), a biological macromolecule (such as a nucleic acid, an antibody, including parts thereof as well as humanized, chimeric and human antibodies and monoclonal antibodies, a protein or portion thereof, e.g., a peptide, a lipid, a carbohydrate), or an extract made from biological materials such as bacteria, plants, fungi, or animal (particularly mammalian) cells or tissues. Agents include, for example, agents whose structure is known, and those whose structure is not known. The ability of such agents to inhibit AR or promote AR degradation may render them suitable as "therapeutic agents" in the methods and compositions of this disclosure.

A "patient," "subject," or "individual" are used interchangeably and refer to either a human or a non-human animal. These terms include mammals, such as humans, primates, livestock animals (including bovines, porcines, etc.), companion animals (e.g., canines, felines, etc.) and rodents (e.g., mice and rats).

"Treating" a condition or patient refers to taking steps to obtain beneficial or desired results, including clinical results. As used herein, and as well understood in the art, "treatment" is an approach for obtaining beneficial or desired results, including clinical results. Beneficial or desired clinical results can include, but are not limited to, alleviation or amelioration of one or more symptoms or conditions, diminishment of extent of disease, stabilized (i.e., not worsening) state of disease, preventing spread of disease, delay or slowing of disease progression, amelioration or palliation of the disease state, and remission (whether partial or total), whether detectable or undetectable. "Treatment" can also mean prolonging survival as compared to expected survival if not receiving treatment.

The term "preventing" is art-recognized, and when used in relation to a condition, such as a local recurrence (e.g., pain), a disease such as cancer, a syndrome complex such as heart failure or any other medical condition, is well understood in the art, and includes administration of a composition which reduces the frequency of, or delays the onset of, symptoms of a medical condition in a subject relative to a subject which does not receive the composition. Thus, prevention of cancer includes, for example, reducing the number of detectable cancerous growths in a population of patients receiving a prophylactic treatment relative to an untreated control population, and/or delaying the appearance of detectable cancerous growths in a treated population versus an untreated control population, e.g., by a statistically and/or clinically significant amount.

"Administering" or "administration of" a substance, a compound or an agent to a subject can be carried out using one of a variety of methods known to those skilled in the art. For example, a compound or an agent can be administered, intravenously, arterially, intradermally, intramuscularly, intraperitoneally, subcutaneously, ocularly, sublingually, orally (by ingestion), intranasally (by inhalation), intraspinally, intracerebrally, and transdermally (by absorption, e.g., through a skin duct). A compound or agent can also appropriately be introduced by rechargeable or biodegradable polymeric devices or other devices, e.g., patches and pumps, or formulations, which provide for the extended, slow or controlled release of the compound or agent. Administering can also be performed, for example, once, a plurality of times, and/or over one or more extended periods.

Appropriate methods of administering a substance, a compound or an agent to a subject will also depend, for example, on the age and/or the physical condition of the subject and the chemical and biological properties of the compound or agent (e.g., solubility, digestibility, bioavailability, stability and toxicity). In some embodiments, a compound or an agent is administered orally, e.g., to a subject by ingestion. In some embodiments, the orally administered compound or agent is in an extended release or slow release formulation, or administered using a device for such slow or extended release.

As used herein, the phrase "conjoint administration" refers to any form of administration of two or more different therapeutic agents such that the second agent is administered while the previously administered therapeutic agent is still effective in the body (e.g., the two agents are simultaneously effective in the patient, which may include synergistic effects of the two agents). For example, the different therapeutic compounds can be administered either in the same formulation or in separate formulations, either concomitantly or sequentially. Thus, an individual who receives such treatment can benefit from a combined effect of different therapeutic agents.

A "therapeutically effective amount" or a "therapeutically effective dose" of a drug or agent is an amount of a drug or an agent that, when administered to a subject will have the intended therapeutic effect. The full therapeutic effect does not necessarily occur by administration of one dose, and may occur only after administration of a series of doses. Thus, a therapeutically effective amount may be administered in one or more administrations. The precise effective amount needed for a subject will depend upon, for example, the subject's size, health and age, and the nature and extent of the condition being treated, such as cancer or MDS. The skilled worker can readily determine the effective amount for a given situation by routine experimentation.

As used herein, the terms "optional" or "optionally" mean that the subsequently described event or circumstance may occur or may not occur, and that the description includes instances where the event or circumstance occurs as well as instances in which it does not. For example, "optionally substituted alkyl" refers to the alkyl may be substituted as well as where the alkyl is not substituted.

It is understood that substituents and substitution patterns on the compounds of the present invention can be selected by one of ordinary skilled person in the art to result chemically stable compounds which can be readily synthesized by techniques known in the art, as well as those methods set forth below, from readily available starting materials. If a substituent is itself substituted with more than one group, it is understood that these multiple groups may be on the same carbon or on different carbons, so long as a stable structure results.

As used herein, the term "optionally substituted" refers to the replacement of one to six hydrogen radicals in a given structure with the radical of a specified substituent including, but not limited to: hydroxyl, hydroxyalkyl, alkoxy, halogen, alkyl, nitro, silyl, acyl, acyloxy, aryl, cycloalkyl, heterocyclyl, amino, aminoalkyl, cyano, haloalkyl, haloalkoxy, —OCO—CH$_2$—O-alkyl, —OP(O)(O-alkyl)$_2$ or —CH$_2$—OP(O)(O-alkyl)$_2$. Preferably, "optionally substituted" refers to the replacement of one to four hydrogen radicals in a given structure with the substituents mentioned above. More preferably, one to three hydrogen radicals are replaced by the substituents as mentioned above. It is understood that the substituent can be further substituted.

As used herein, the term "alkyl" refers to saturated aliphatic groups, including but not limited to C$_1$-C$_{10}$ straight-chain alkyl groups or C$_1$-C$_{10}$ branched-chain alkyl groups. Preferably, the "alkyl" group refers to C$_1$-C$_6$ straight-chain alkyl groups or C$_1$-C$_6$ branched-chain alkyl groups. Most preferably, the "alkyl" group refers to C$_1$-C$_4$ straight-chain alkyl groups or C$_1$-C$_4$ branched-chain alkyl groups. Examples of "alkyl" include, but are not limited to, methyl, ethyl, 1-propyl, 2-propyl, n-butyl, sec-butyl, tert-butyl, 1-pentyl, 2-pentyl, 3-pentyl, neo-pentyl, 1-hexyl, 2-hexyl, 3-hexyl, 1-heptyl, 2-heptyl, 3-heptyl, 4-heptyl, 1-octyl, 2-octyl, 3-octyl or 4-octyl and the like. The "alkyl" group may be optionally substituted.

The term "acyl" is art-recognized and refers to a group represented by the general formula hydrocarbylC(O)—, preferably alkylC(O)—.

The term "acylamino" is art-recognized and refers to an amino group substituted with an acyl group and may be represented, for example, by the formula hydrocarbylC(O)NH—.

The term "acyloxy" is art-recognized and refers to a group represented by the general formula hydrocarbylC(O)O—, preferably alkylC(O)O—.

The term "alkoxy" refers to an alkyl group having an oxygen attached thereto. Representative alkoxy groups include methoxy, ethoxy, propoxy, tert-butoxy and the like.

The term "alkoxyalkyl" refers to an alkyl group substituted with an alkoxy group and may be represented by the general formula alkyl-O-alkyl.

The term "alkyl" refers to saturated aliphatic groups, including straight-chain alkyl groups, branched-chain alkyl groups, cycloalkyl (alicyclic) groups, alkyl-substituted cycloalkyl groups, and cycloalkyl-substituted alkyl groups. In preferred embodiments, a straight chain or branched chain alkyl has 30 or fewer carbon atoms in its backbone (e.g., C$_{1-30}$ for straight chains, C$_{3-30}$ for branched chains), and more preferably 20 or fewer.

Moreover, the term "alkyl" as used throughout the specification, examples, and claims is intended to include both unsubstituted and substituted alkyl groups, the latter of which refers to alkyl moieties having substituents replacing a hydrogen on one or more carbons of the hydrocarbon backbone, including haloalkyl groups such as trifluoromethyl and 2,2,2-trifluoroethyl, etc.

The term "C$_{x-y}$" or "C$_x$-C$_y$", when used in conjunction with a chemical moiety, such as, acyl, acyloxy, alkyl, alkenyl, alkynyl, or alkoxy is meant to include groups that contain from x to y carbons in the chain. C$_0$alkyl indicates a hydrogen where the group is in a terminal position, a bond if internal. A C$_{1-6}$alkyl group, for example, contains from one to six carbon atoms in the chain.

The term "alkylamino", as used herein, refers to an amino group substituted with at least one alkyl group.

The term "alkylthio", as used herein, refers to a thiol group substituted with an alkyl group and may be represented by the general formula alkylS—.

The term "amide", as used herein, refers to a group

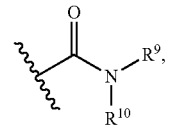

wherein R$^9$ and R$^{10}$ each independently represent a hydrogen or hydrocarbyl group, or R$^9$ and R$^{10}$ taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

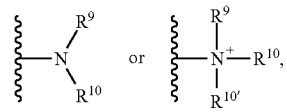

wherein R$^9$, R$^{10}$, and R$^{10'}$ each independently represent a hydrogen or a hydrocarbyl group, or R$^9$ and R$^{10}$ taken together with the N atom to which they are attached complete a heterocycle having from 4 to 8 atoms in the ring structure.

The term "aminoalkyl", as used herein, refers to an alkyl group substituted with an amino group.

The term "aralkyl", as used herein, refers to an alkyl group substituted with an aryl group.

The term "aryl" as used herein include substituted or unsubstituted single-ring aromatic groups in which each atom of the ring is carbon. Preferably the ring is a 5- to 7-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "carbamate" is art-recognized and refers to a group

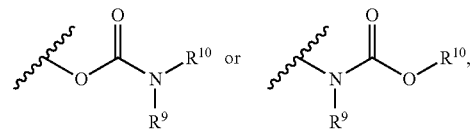

wherein R$^9$ and R$^{10}$ independently represent hydrogen or a hydrocarbyl group.

The term "carbocyclylalkyl", as used herein, refers to an alkyl group substituted with a carbocycle group.

The term "carbocycle" includes 5-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring.

Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo [2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0] octane, 4,5,6,7-tetrahydro-1H-indene and bicyclo[4.1.0] hept-3-ene. "Carbocycles" may be substituted at any one or more positions capable of bearing a hydrogen atom.

The term "carbocyclylalkyl", as used herein, refers to an alkyl group substituted with a carbocycle group.

The term "carbonate" is art-recognized and refers to a group —$OCO_2$—.

The term "carboxy", as used herein, refers to a group represented by the formula —$CO_2H$.

The term "ester", as used herein, refers to a group —$C(O)OR^9$ wherein $R^9$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical. Examples of ethers include, but are not limited to, heterocycle-O-heterocycle and aryl-O-heterocycle. Ethers include "alkoxyalkyl" groups, which may be represented by the general formula alkyl-O-alkyl.

The terms "halo" and "halogen" as used herein means halogen and includes chloro, fluoro, bromo, and iodo.

The terms "hetaralkyl" and "heteroaralkyl", as used herein, refers to an alkyl group substituted with a hetaryl group.

The terms "heteroaryl" and "hetaryl" include substituted or unsubstituted aromatic single ring structures, preferably 5- to 7-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or hydrogen. Preferred heteroatoms are nitrogen, oxygen, and sulfur.

The term "heterocyclylalkyl", as used herein, refers to an alkyl group substituted with a heterocycle group.

The terms "heterocyclyl", "heterocycle", and "heterocyclic" refer to substituted or unsubstituted non-aromatic ring structures, preferably 3- to 10-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "hydrocarbyl", as used herein, refers to a group that is bonded through a carbon atom that does not have a ═O or ═S substituent, and typically has at least one carbon-hydrogen bond and a primarily carbon backbone, but may optionally include heteroatoms. Thus, groups like methyl, ethoxyethyl, 2-pyridyl, and even trifluoromethyl are considered to be hydrocarbyl for the purposes of this application, but substituents such as acetyl (which has a ═O substituent on the linking carbon) and ethoxy (which is linked through oxygen, not carbon) are not. Hydrocarbyl groups include, but are not limited to, aryl, heteroaryl, carbocycle, heterocycle, alkyl, alkenyl, alkynyl, and combinations thereof.

The term "hydroxyalkyl", as used herein, refers to an alkyl group substituted with a hydroxy group.

The term "lower" when used in conjunction with a chemical moiety, such as, acyl, acyloxy, alkyl, alkenyl, alkynyl, or alkoxy is meant to include groups where there are ten or fewer atoms in the substituent, preferably six or fewer. A "lower alkyl", for example, refers to an alkyl group that contains ten or fewer carbon atoms, preferably six or fewer. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

The term "sulfate" is art-recognized and refers to the group —$OSO_3H$, or a pharmaceutically acceptable salt thereof.

The term "sulfonamide" is art-recognized and refers to the group represented by the general formulae

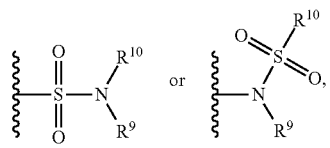

wherein $R^9$ and $R^{10}$ independently represents hydrogen or hydrocarbyl.

The term "sulfoxide" is art-recognized and refers to the group-$S(O)$—.

The term "sulfonate" is art-recognized and refers to the group $SO_3H$, or a pharmaceutically acceptable salt thereof.

The term "sulfone" is art-recognized and refers to the group —$S(O)_2$—.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate.

The term "thioalkyl", as used herein, refers to an alkyl group substituted with a thiol group.

The term "thioester", as used herein, refers to a group —C(O)SR$^9$ or —SC(O)R$^9$ wherein R$^9$ represents a hydrocarbyl.

The term "thioether", as used herein, is equivalent to an ether, wherein the oxygen is replaced with a sulfur.

The term "urea" is art-recognized and may be represented by the general formula

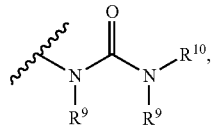

wherein R$^9$ and R$^{10}$ independently represent hydrogen or a hydrocarbyl.

The term "modulate" as used herein includes the inhibition or suppression of a function or activity (such as cell proliferation) as well as the enhancement of a function or activity.

The phrase "pharmaceutically acceptable" is art-recognized. In certain embodiments, the term includes compositions, excipients, adjuvants, polymers and other materials and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

"Pharmaceutically acceptable salt" or "salt" is used herein to refer to an acid addition salt or a basic addition salt which is suitable for or compatible with the treatment of patients.

The term "pharmaceutically acceptable acid addition salt" as used herein means any non-toxic organic or inorganic salt of any base compounds represented by Formula I. Illustrative inorganic acids which form suitable salts include hydrochloric, hydrobromic, sulfuric and phosphoric acids, as well as metal salts such as sodium monohydrogen orthophosphate and potassium hydrogen sulfate. Illustrative organic acids that form suitable salts include mono-, di-, and tricarboxylic acids such as glycolic, lactic, pyruvic, malonic, succinic, glutaric, fumaric, malic, tartaric, citric, ascorbic, maleic, benzoic, phenylacetic, cinnamic and salicylic acids, as well as sulfonic acids such as p-toluene sulfonic and methanesulfonic acids. Either the mono or di-acid salts can be formed, and such salts may exist in either a hydrated, solvated or substantially anhydrous form. In general, the acid addition salts of compounds of Formula I are more soluble in water and various hydrophilic organic solvents, and generally demonstrate higher melting points in comparison to their free base forms. The selection of the appropriate salt will be known to one skilled in the art. Other non-pharmaceutically acceptable salts, e.g., oxalates, may be used, for example, in the isolation of compounds of Formula I for laboratory use, or for subsequent conversion to a pharmaceutically acceptable acid addition salt.

The term "pharmaceutically acceptable basic addition salt" as used herein means any non-toxic organic or inorganic base addition salt of any acid compounds represented by Formula I or any of their intermediates. Illustrative inorganic bases which form suitable salts include lithium, sodium, potassium, calcium, magnesium, or barium hydroxide. Illustrative organic bases which form suitable salts include aliphatic, alicyclic, or aromatic organic amines such as methylamine, trimethylamine and picoline or ammonia. The selection of the appropriate salt will be known to a person skilled in the art.

Many of the compounds useful in the methods and compositions of this disclosure have at least one stereogenic center in their structure. This stereogenic center may be present in a R or a S configuration, said R and S notation is used in correspondence with the rules described in Pure Appl. Chem. (1976), 45, 11-30. The disclosure contemplates all stereoisomeric forms such as enantiomeric and diastereoisomeric forms of the compounds, salts, prodrugs or mixtures thereof (including all possible mixtures of stereoisomers). See, e.g., WO 01/062726.

Furthermore, certain compounds which contain alkenyl groups may exist as Z (zusammen) or E (entgegen) isomers. In each instance, the disclosure includes both mixture and separate individual isomers.

Some of the compounds may also exist in tautomeric forms. Such forms, although not explicitly indicated in the formulae described herein, are intended to be included within the scope of the present disclosure.

"Prodrug" or "pharmaceutically acceptable prodrug" refers to a compound that is metabolized, for example hydrolyzed or oxidized, in the host after administration to form the compound of the present disclosure (e.g., compounds of formula I). Typical examples of prodrugs include compounds that have biologically labile or cleavable (protecting) groups on a functional moiety of the active compound. Prodrugs include compounds that can be oxidized, reduced, aminated, deaminated, hydroxylated, dehydroxylated, hydrolyzed, dehydrolyzed, alkylated, dealkylated, acylated, deacylated, phosphorylated, or dephosphorylated to produce the active compound. Examples of prodrugs using ester or phosphoramidate as biologically labile or cleavable (protecting) groups are disclosed in U.S. Pat. Nos.

6,875,751, 7,585,851, and 7,964,580, the disclosures of which are incorporated herein by reference. The prodrugs of this disclosure are metabolized to produce a compound of Formula I. The present disclosure includes within its scope, prodrugs of the compounds described herein. Conventional procedures for the selection and preparation of suitable prodrugs are described, for example, in "Design of Prodrugs" Ed. H. Bundgaard, Elsevier, 1985.

The phrase "pharmaceutically acceptable carrier" as used herein means a pharmaceutically acceptable material, composition or vehicle, such as a liquid or solid filter, diluent, excipient, solvent or encapsulating material useful for formulating a drug for medicinal or therapeutic use.

The term "Log of solubility", "Log S" or "log S" as used herein is used in the art to quantify the aqueous solubility of a compound. The aqueous solubility of a compound significantly affects its absorption and distribution characteristics. A low solubility often goes along with a poor absorption. Log S value is a unit stripped logarithm (base 10) of the solubility measured in mol/liter.

EXAMPLES

The invention now being generally described, it will be more readily understood by reference to the following examples which are included merely for purposes of illustration of certain aspects and embodiments of the present invention, and are not intended to limit the invention.

Example 1: General Methods

Generation of BEAS2B Cells with Stable Expression of TCF/LEF Luciferase Reporter BEAS2B cells (ATCC CRL-9609) were seeded in a 6-well plate and infected with Cignal lentiviral particles containing a TCF/LEF luciferase reporter (Qiagen CLS-018L). Cells were spin infected at 37° C. for one hour using a multiplicity of infection of 20. Cells were selected with 0.6 µg/mL puromycin to isolate stably expressing clones.

Luciferase Reporter Measurement

For luciferase reporter assays conducted outside of the high-throughput drug screen, BEAS2B cells were seeded in a 96-well plate at 20,000 cells per well. The following day, cells were with treated DMSO, 5 µM CHIR99021 (CHIR; Tocris 4423), or 5 µM CHIR plus WIC2 (Key Organics GP-0355), Coumarin (Sigma C4261), or WIC1 for 24 hours. Lysis reactions were conducted using BrightGlo (Promega E1910) and incubated for two minutes at room temperature prior to transferring luminescence reactions to white-bottom, white-walled 96-well plates (Costar). Toxicity assays were conducted by adding Cell Titer Glo reagent (Promega) following manufacturer's protocol. Luminescence readings were conducted using the Clariostar plate reader.

Mice 6-10-week-old male and female $C_{57}BL/6J$ wild type mice were purchased from The Jackson Laboratory (Bar Harbor, Maine). Mice were maintained in a pathogen-free facility at the Division of Laboratory Animal Medicine (DLAM) at UCLA. Experiments were conducted in accordance with the guidelines by the DLAM Committee on Animal Care.

Human Tissue Procurement

Large airways and bronchial tissues were acquired from de-identified normal human donors after lung transplantations at the Ronald Reagan UCLA Medical Center. Tissues were procured under Institutional Review Board-approved protocols at the David Geffen School of Medicine at UCLA.

ABSC Isolation and Fluorescence-Activated Cell Sorting (FACS)

Mouse and human ABSCs were isolated following a previously published method. Briefly, mouse tracheas were dissected, cleaned, and incubated in 16 U/mL dispase for 30 minutes (1 hour for human) at room temperature. Tracheas were then incubated in 0.5 mg/mL DNase for another 30 minutes (1 hour for human) at room temperature. Epithelium was stripped and incubated in 0.1% Trypsin-EDTA for 30 minutes (1 hour for human) shaking at 37° C. to generate a single cell suspension. Isolated cells were passed through a 40 µm strainer and stained with fluorophore-conjugated antibodies against ITGA6 and TROP2. ITGA6+ TROP2+ cells were obtained via FACS that was completed using the BD FACSAria cell sorter.

Air-Liquid Interface (ALI) Cultures and In Vitro Treatments 24-well 6.5 mm transwells with 0.4 µm pore polyester membrane inserts were coated with 0.2 mg/mL collagen type I dissolved in 60% ethanol and allowed to air dry. ABSCs were seeded at 100,000 cells per well and allowed to grow in the submerged phase of culture for 4-5 days with 500 µl media in the basal chamber and 200 µl media in the apical chamber. ALI cultures were then established and culture with only 500 µl media in the basal chamber, and cultures harvested at varying timepoints for immunofluorescence studies. Media was changed every other day and cultures were maintained at 37° C. and 5% $C_{O2}$. ABSCs were treated with the indicated concentrations of GSK3XV (Sigma 361558), CHIR or WIC1.

Mouse Tracheal Epithelial Cell (MTEC) Plus and Serum-Free Media

Mouse ABSCs were grown in MTEC Plus media and MTEC serum-free media during the submerged and ALI phases of culture, respectively. MTEC base media is DMEM/Ham's F12 50/50 (Corning 15090CV). Table S1 and Table S2 indicate the media components and concentrations for MTEC Plus and MTEC serum-free media, respectively.

TABLE S1

MTEC Plus Media Formulation.

| Component | Concentration |
| --- | --- |
| HEPES (Sigma H0887) | 15 mM |
| Sodium Bicarbonate (Life Technologies 25080-094) | 3.6 mM |
| L-glutamine (Invitrogen 35050-061) | 4 mM |
| Insulin (Sigma I6634) | 10 µg/mL |
| Transferrin (Sigma T5391) | 5 µg/mL |
| Cholera Toxin (C8052) | 0.1 µg/mL |
| Epidermal Growth Factor (Corning 354001) | 25 ng/mL |

TABLE S2

MTEC Serum-Free Media Formulation.

| Component | Concentration |
| --- | --- |
| HEPES | 15 mM |
| Sodium Bicarbonate | 3.6 mM |
| L-glutamine | 4 mM |
| Insulin | 5 µg/mL |
| Transferrin | 5 µg/mL |
| Cholera Toxin | 0.025 µg/mL |
| Epidermal Growth Factor | 5 ng/mL |
| Bovine Pituitary Extract | 30 µg/mL |

In Vitro EdU Proliferation Assays

In vitro proliferation was studied using the Click-iT EdU incorporation assay kit (Invitrogen C10337) following the company's protocol. Briefly, mouse and human AB SC cultures were treated with 10 μM EdU 6-8 hours prior to commencing IFs. Cells were fixed with 400 paraformaldehyde for 15 minutes followed by permeabilization in 0.5% Triton-X for 20 minutes. EdU cocktail was incubated for 30 minutes in darkness followed by immunocytochemistry.

Immunocytochemistry

Mouse and human ABSCs were fixed in 400 paraformaldehyde for 15 minutes followed by permeabilization with 0.50% Triton-X for 10 minutes. Cells were blocked using serum-free protein block (Dako X090930) for one hour at room temperature and overnight primary antibody incubation. Secondary antibodies were incubated for 1 hour in darkness, washed, and mounted using Vectashield hardest mounting medium with DAPI (Vector Labs H-1500). IF images were obtained using an LSM780 or LSM880 Zeiss confocal microscope and composite images generated using Fiji.

Immunofluorescence (IF)

4-5 μm thick paraffin-embedded sections were deparaffinized by placing them on a 60° C. heating block for 1-2 hours and through a series of Xylene and ethanol washes. Antigen retrieval was then performed using a pressure cooker for 10 minutes in 1 mM EDTA. Samples were permeabilized with 0.5% Triton-X, blocked using serum-free protein block (Dako X090930) for one hour, and incubated in primary antibody overnight. Secondary antibodies were incubated for 1 hour in darkness, washed, and mounted using Vectashield hardest mounting medium with DAPI (Vector Labs H-1500). IF images were obtained using an LSM780 or LSM880 Zeiss confocal microscope and composite images generated using Fiji.

Quantitative Real-Time Polymerase Chain Reaction

RNA was isolated with the RNeasy Mini Kit (Qiagen 74104) following manufacturer's protocol and quantified using a NanoDrop Spectrophotometer (ThermoFisher). cDNA synthesis was performed using the TaqMan Reverse Transcription Reagents (ThermoFisher) as indicated by the company. qPCR was then performed using the TaqMan PCR Master Mix (Applied Biosystems) on the StepOne-Plus Real Time PCR System.

Statistical Analysis

Data are presented as the mean±standard error of the mean values. Student's t-tests were used to assess statistical significance. Calculated p-values are indicated on individual figures.

Example 2: Airway Basal Stem Cell Homeostasis is Controlled by Perturbations in Canonical Wnt Signaling In Vitro mABSCs were seeded in a 6-well transwell plate and transiently transfected with 0.8 g of the TOPFLASH luciferase reporter and 0.8 g Renilla Luciferase reporter vector pRL-TK for internal control (Promega). Transfections were conducted using Lipofectamine 2000 Transfection Reagent (ThermoFisher 11668030) following the manufacturer's protocol.

Figure 2A:
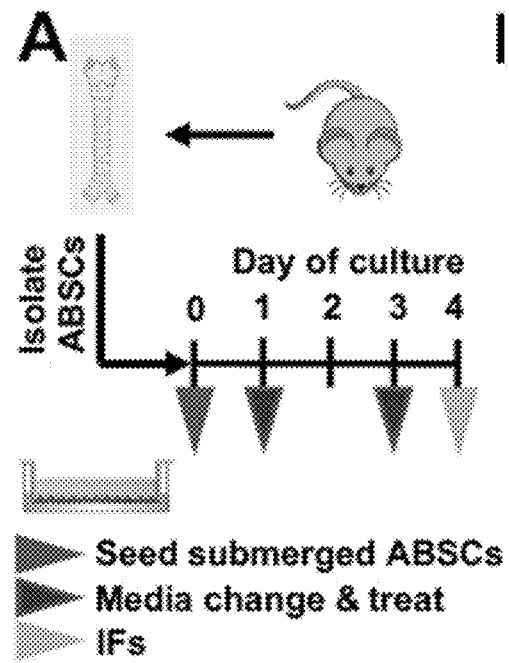
FIG. 2A depicts an exemplary method for the activation of Wnt signaling in mice with CHIR (a GSK3 β inhibitor that increases β-catenin levels and activates Wnt/β-catenin signaling).
Figure 2B:
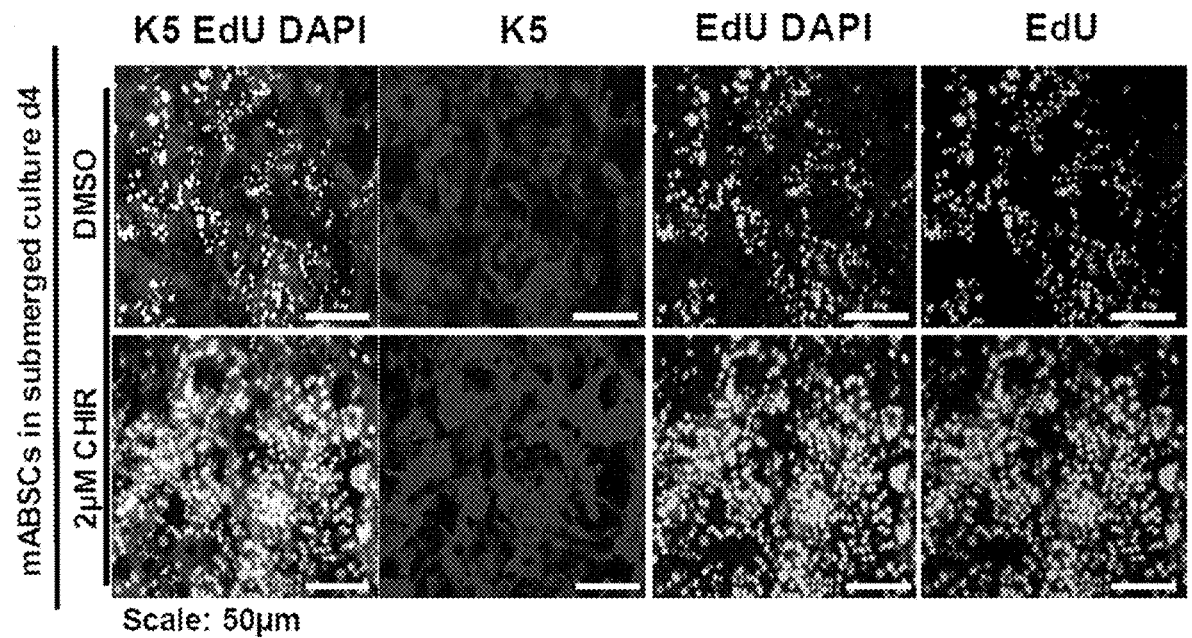
FIGS. 2B and 2C show the results of an EdU proliferation assay from mice ABSCs treated with CHIR. A statistically significant increase in proliferation was observed.
Figure 2C:
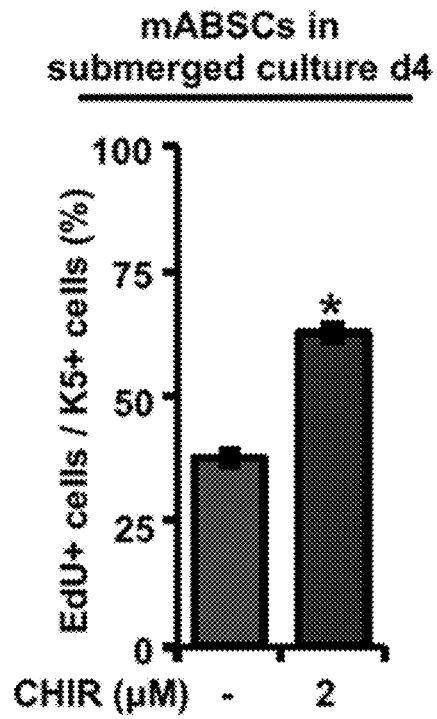
Figure 2D:
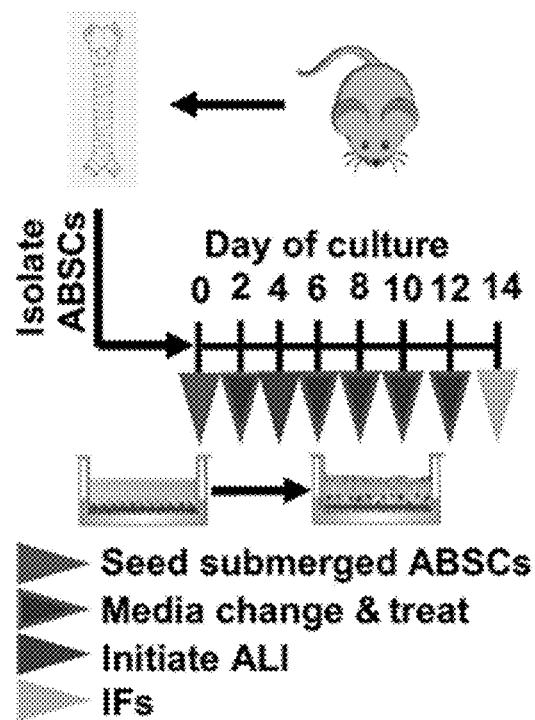
FIG. 2D depicts a second exemplary method for the activation of Wnt signaling in mice treated with CHIR.
Figure 2E:
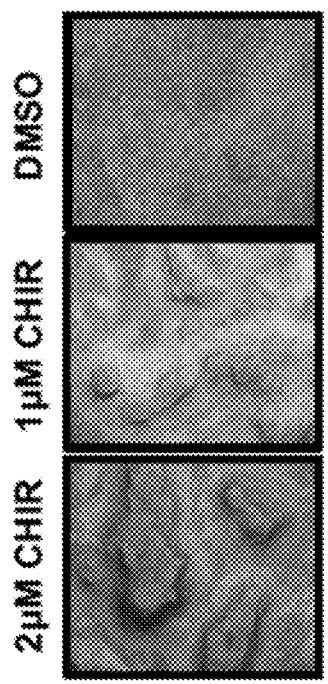
FIG. 2E shows the different morphology of ABSCs treating with DMSO and CHIR. The cells treated with CHIR exhibited a clumping morphology reminiscent of PMLs.
Figure 2F:
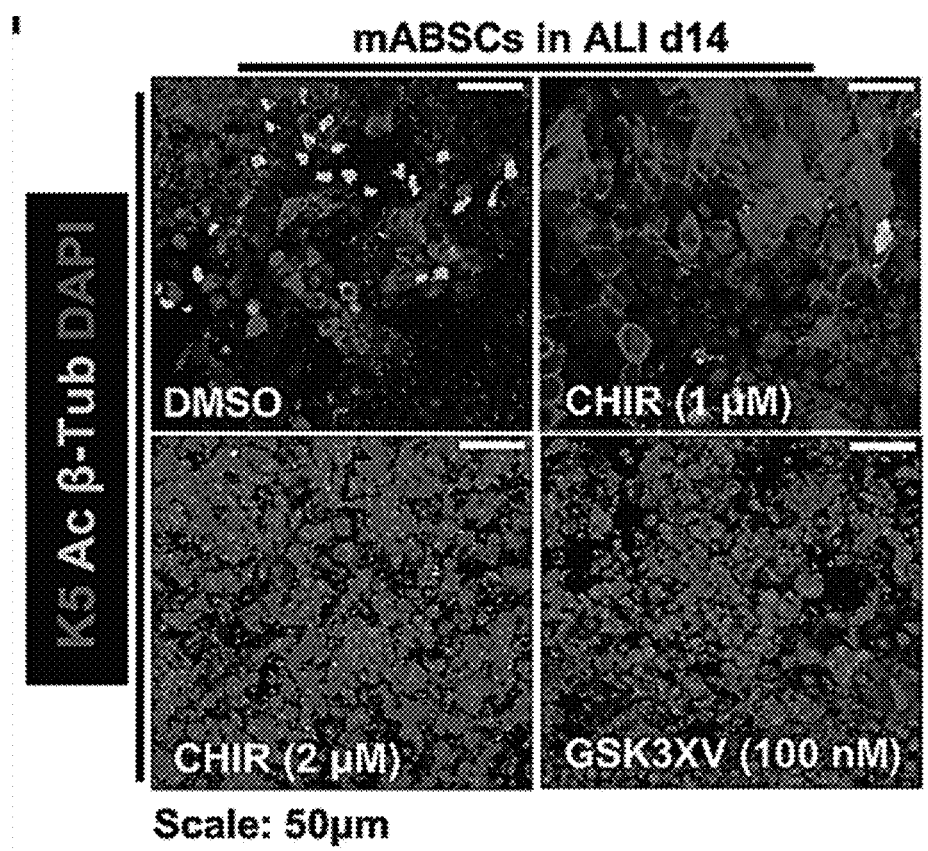
FIGS. 2F and 2G show the effects of treatment of ABSCs with certain GSK3β inhibitors. Treated ABSCs displayed a significant reduction in ciliated cells.
Figure 2G:
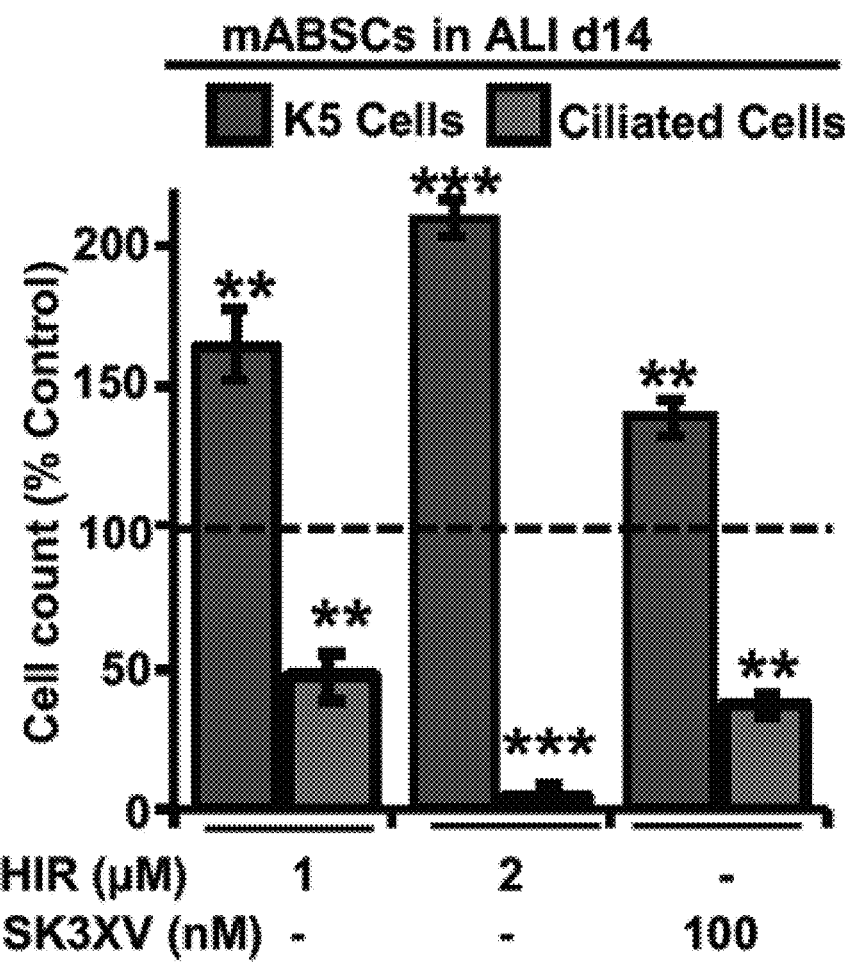
Figure 2H:
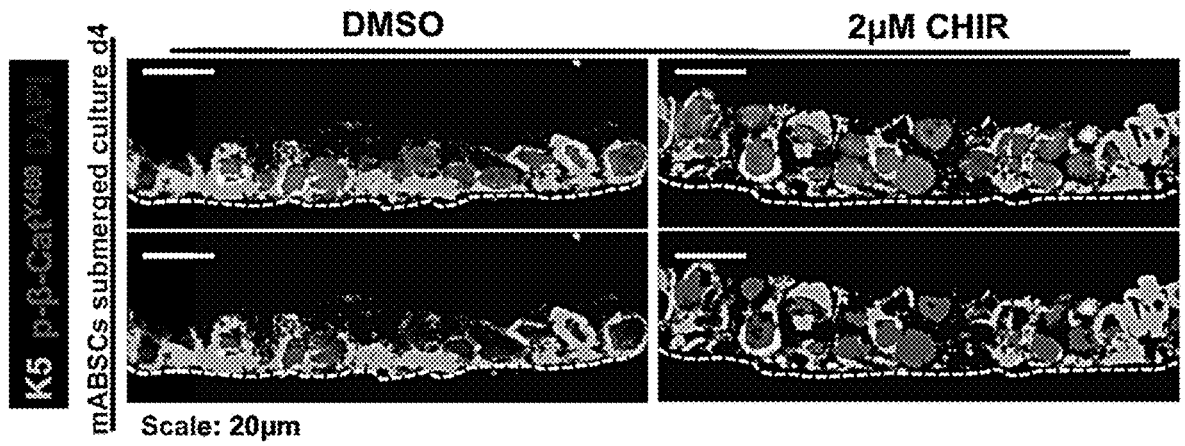
FIGS. 2H and 2I shows the results of IF staining on ABSCs treated with CHIR. An increase in nuclear p-β-catenin$Y_{489}$ relative to DMSO-treated control cultures.
Figure 2I:
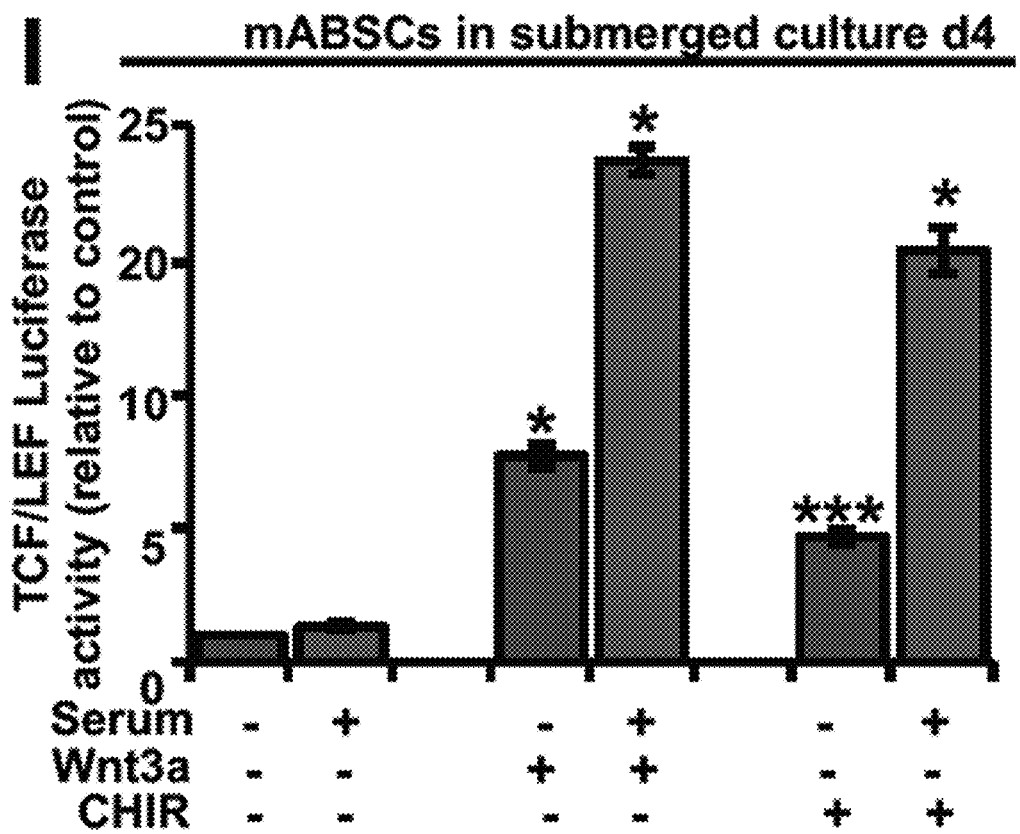

To determine whether the pathobiology observed in human patients can be modeled in vitro, mouse ABSCs (mABSCs) were treated with GSK3β inhibitor CHIR99021 (CHIR) under submerged culture conditions for 4 days to activate canonical Wnt signaling (FIG. 2A). Following this, EdU proliferation assays from mABSCs treated were with CHIR and a statistically significant increased proliferation in comparison to DMSO-treated controls (FIGS. 2B & C) was observed. Strikingly, air-liquid interface (ALI) differentiation first illustrated that mABSCs treated with CHIR exhibited a dose-dependent heaping morphology that resembles the PMLs seen in the airways of patients (FIG. 2E). Further, mABSCs treated with two independent GSK3β inhibitors (CHIR and GSK3XV) displayed a significant reduction in the percentage of ciliated cells, indicated by the absence of acetylated β-tubulin, and an increased pool of K5+ mABSCs (FIGS. 2F & G). To determine the extent of Wnt/β-catenin signaling activation upon dysregulated ABSC homeostasis, IFs on mABSCs treated with CHIR and observed increased nuclear p-β-catenin$^{Y489}$ relative to DMSO-treated control cultures (FIG. 2H) was performed. Additionally, GSK3β inhibition and recombinant Wnt3a increased TCF/LEF activity measured by a luciferase reporter in comparison to DMSO-treated cultures (FIG. 2I).

Figure 1C:
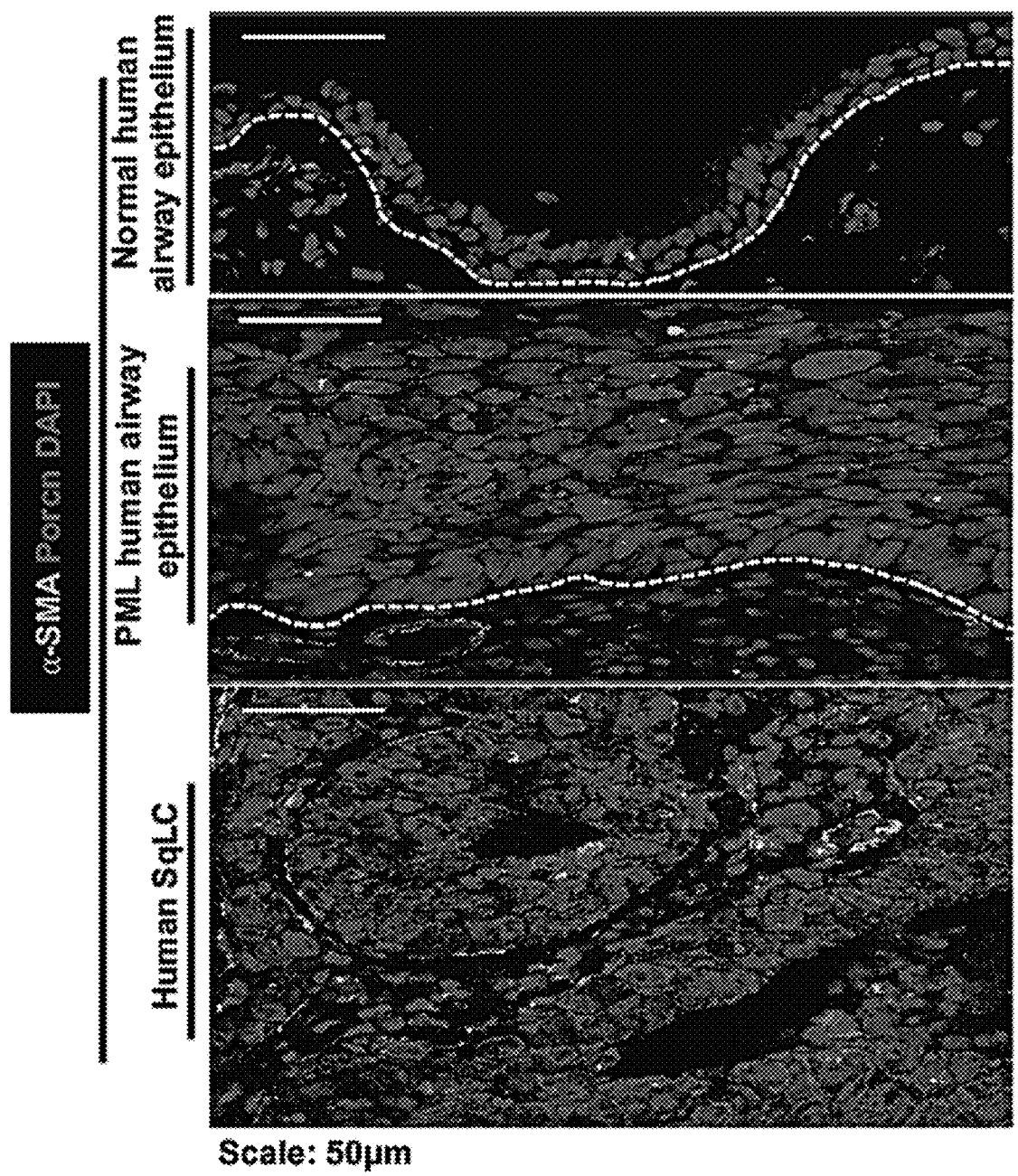
Figure 1D:
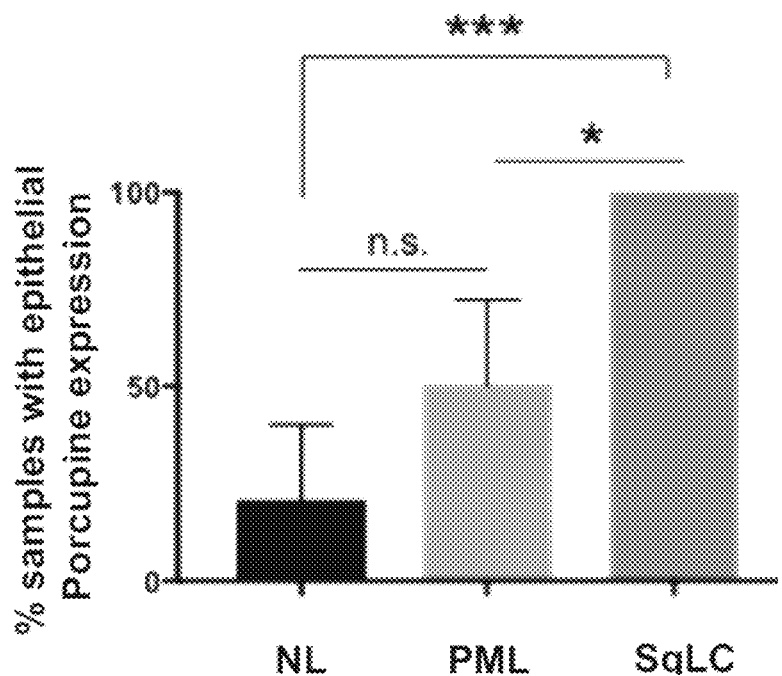
Figure 1E:
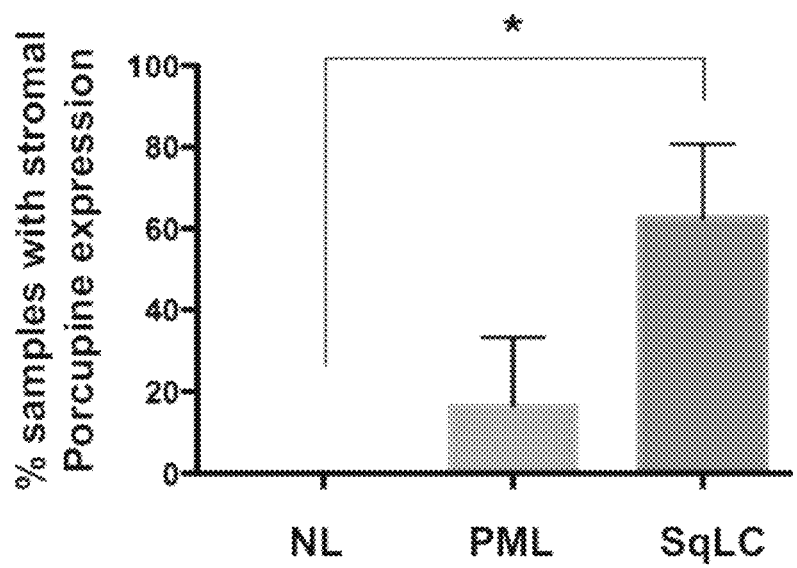
Figure 1F:
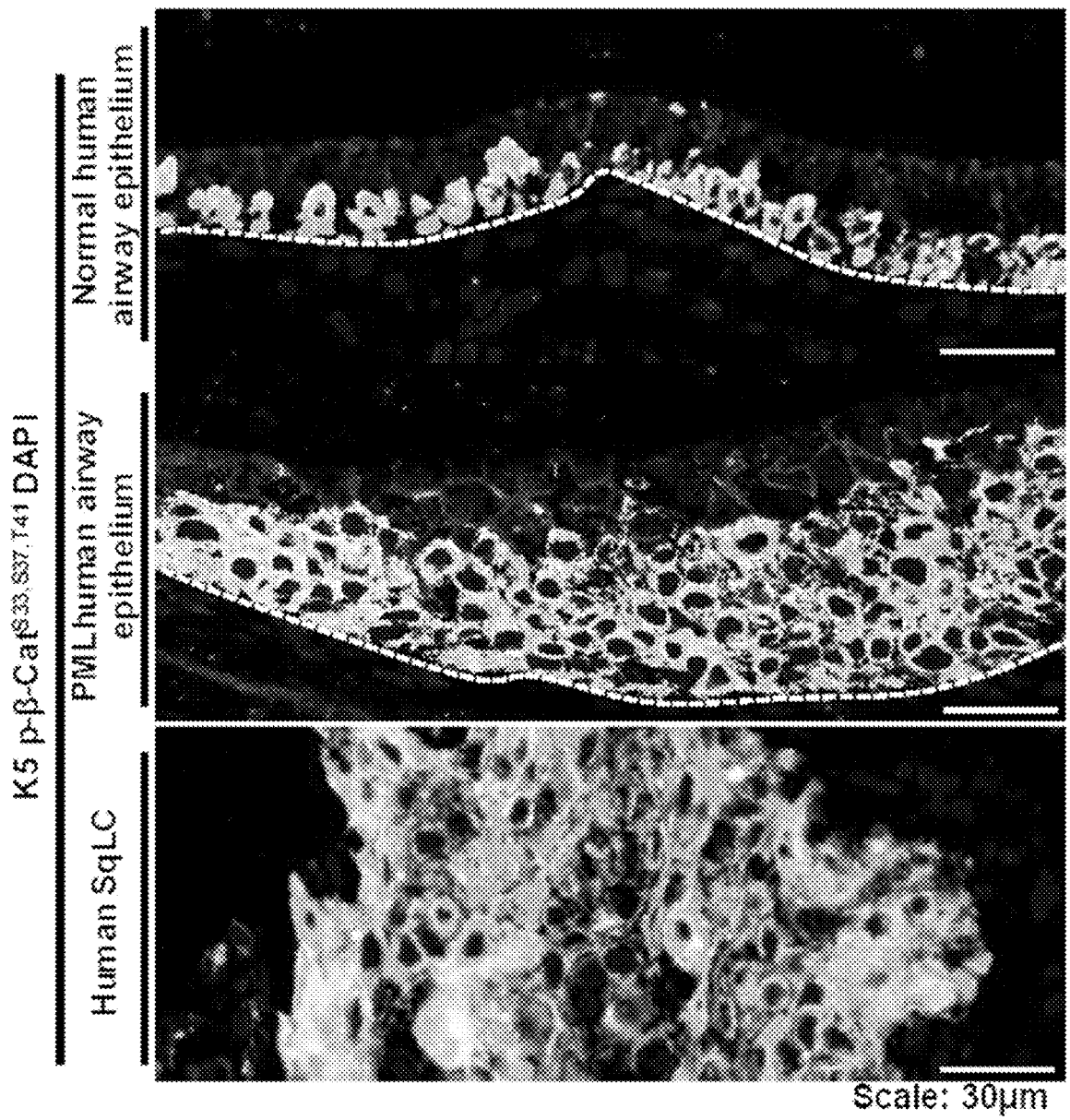
Figure 1G:
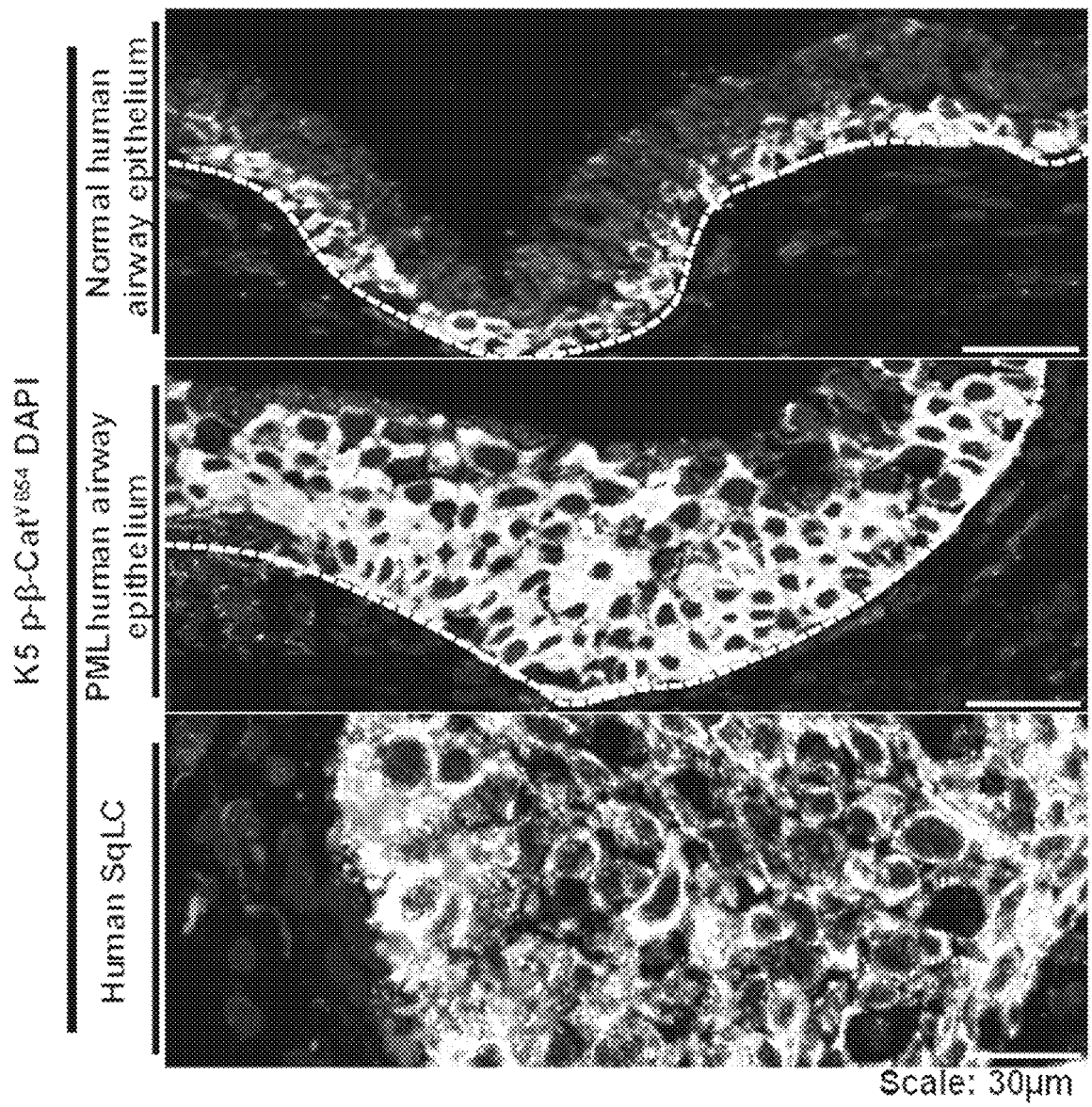
Figure 1H:
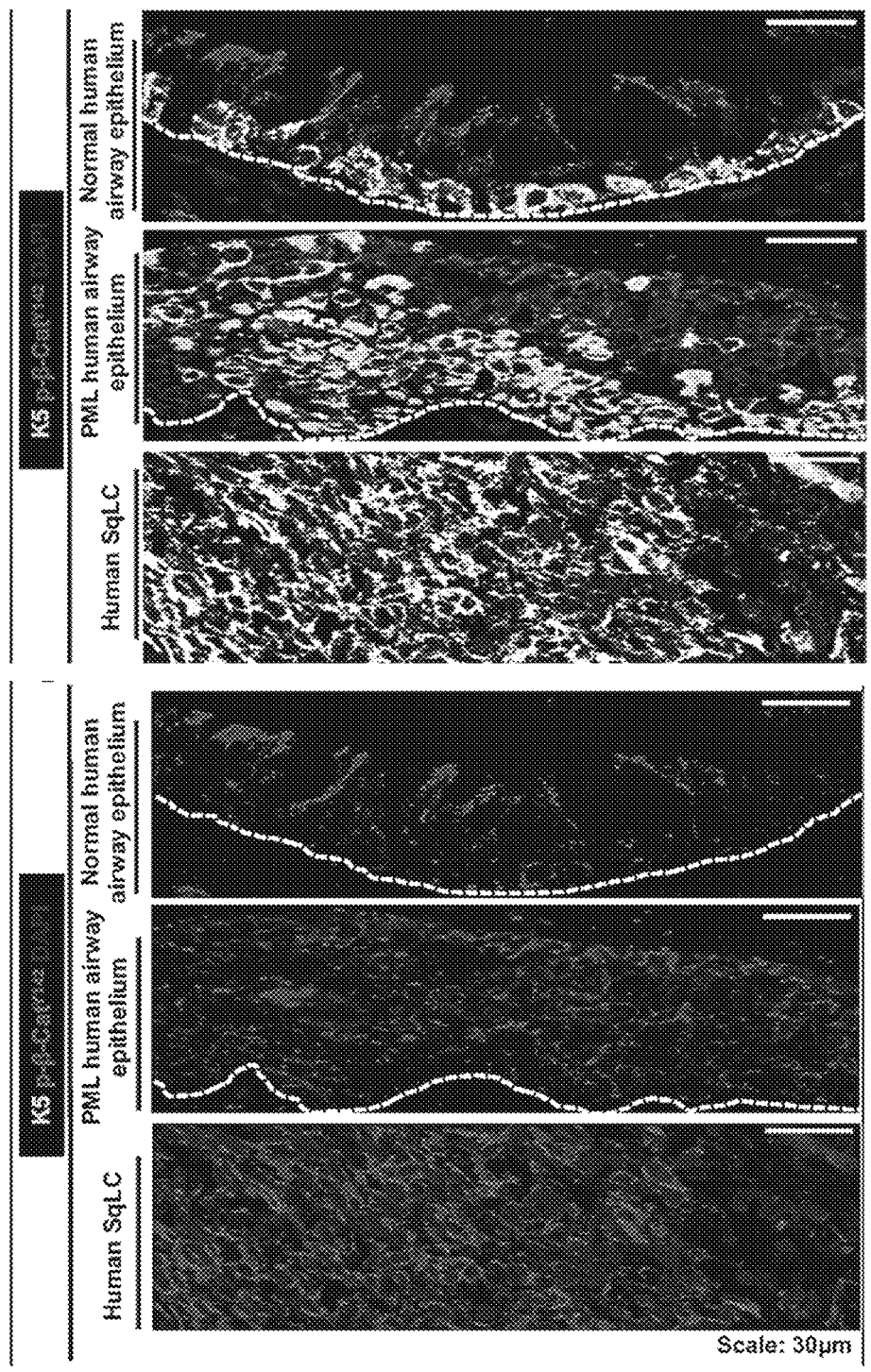
Figure 1I:
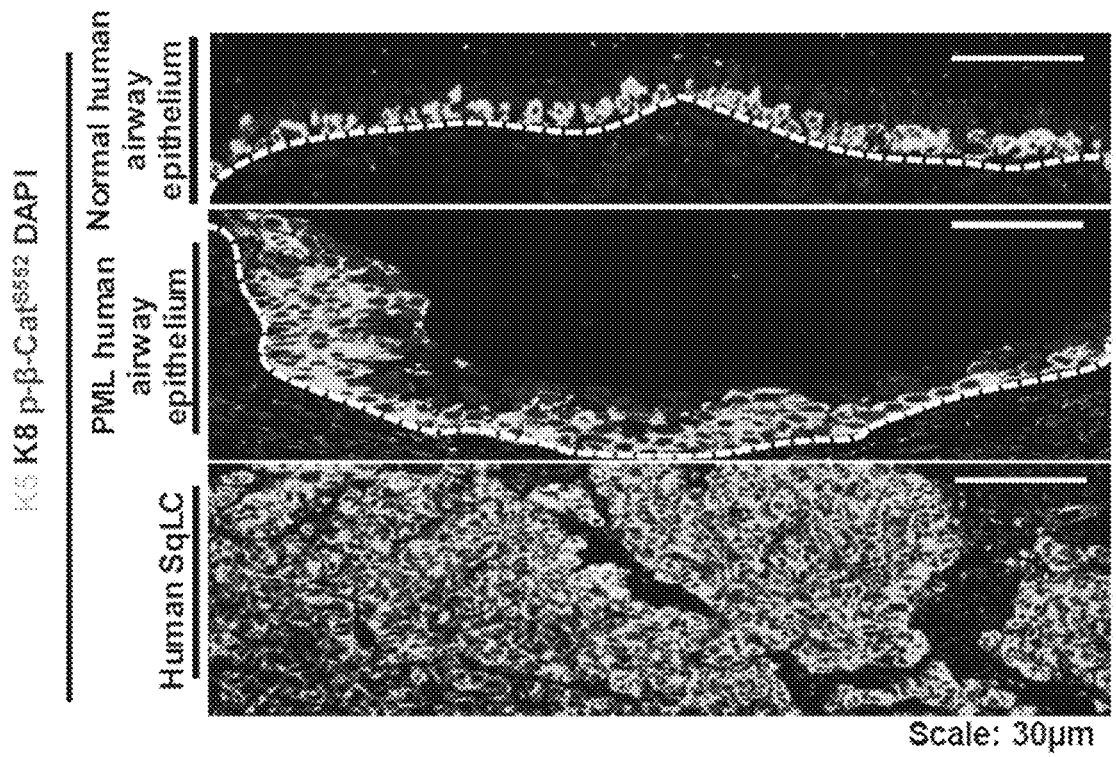
Figure 1J:
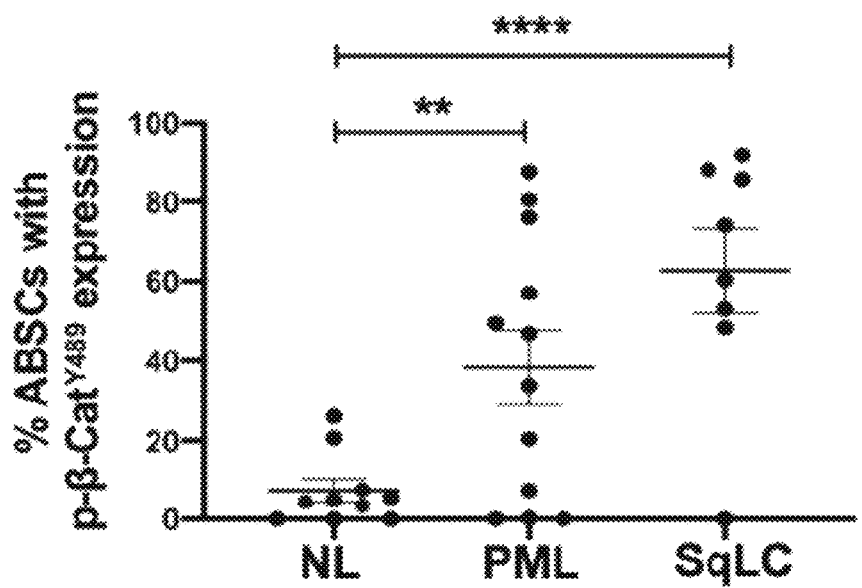
FIG. 1J shows the quantification of the percentage of ABSCs that are β-catenin-p-Y489+ (nuclear β-catenin) as well as the percentage of Porcupine+ ABSCs and stromal cells during stepwise progression to human lung squamous cell carcinoma. 7.2% of ABSCs contained nuclear β-catenin-p-Y489 in normal samples, 38.3% in premalignant lesions (PMLs), and 62.7% in SqLC.
Figure 1K:
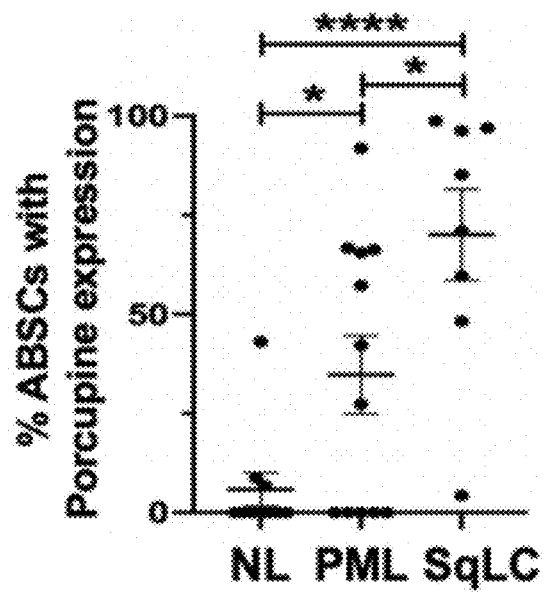
FIG. 1K shows the quantification of the percentage of ABSCs that contain porcupine expression (secrete Wnts). 5.8% of ABSCs contained Porcupine expression in normal airways, 34.8% in PMLs, and 70.1% in SqLCs
Figure 1L:
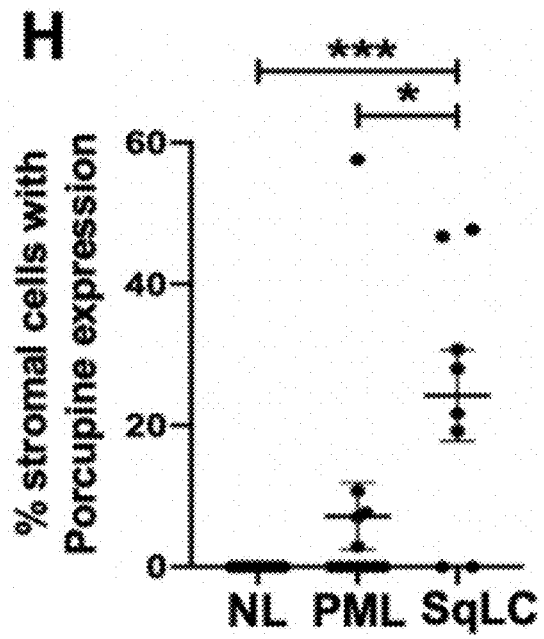
FIG. 1L shows the quantification of the percentage of ABSCs that contain porcupine expression. 0% of stromal cells contained Porcupine expression in normal airways, 7.2% in PMLs, and 24.3% in SqLCs

Example 3: Emergence of Dysregulated Wnt/p-β-Catenin$^{Y489}$ Signaling Axis in Stepwise Progression to Human Squamous Lung Cancer SqLC is thought to arise from excessive proliferation of K5+ ABSCs and progress through a series of histologically-defined premalignant intermediates as a product of dysfunctional homeostatic mechanisms. Further, β-catenin post-translational modifications have been shown to regulate its subcellular localization and signaling in other contexts. To determine whether Wnt/β-catenin signaling is dysregulated during human SqLC progression, immunofluorescence (IF) staining and analysis was performed on human patient airway samples for varying pathway components. In contrast to its nuclear expression in only 5.2% of histologically normal human airway epithelia, β-catenin phosphorylated at Y489 (p-β-catenin$^{Y489}$) uniquely localized to the nucleus in 35.7% of human airway premalignant lesions (PMLs) and in 50.9% of SqLC patient samples (FIGS. 1A & B). This stood in contrast to other phosphorylated forms of β-catenin that only localized to the membrane or cytoplasm (FIGS. 1F-I). Utilizing Porcupine IF staining as an indicator of Wnt secretion by airway cells, minimal epithelial and no stromal expression of Porcupine in normal human airways was observed (FIGS. 1C-E). However, Porcupine was expressed in the epithelium of 50% and 100% of PMLs and SqLC samples analyzed, respectively (FIGS. 1C & D). Percentage of samples that contained positive Porcupine staining in the stromal compartment was then determined. While zero of the five normal human airways examined had positive stromal Porcupine staining, 16.7% PMLs and 62.5% SqLCs displayed positive stromal Porcupine expression (FIG. 1E). These studies collectively elucidate the emergence of a dysregulated Wnt/p-β-catenin$^{Y481}$ signaling axis during stepwise progression to human SqLC.

Figure 3A:
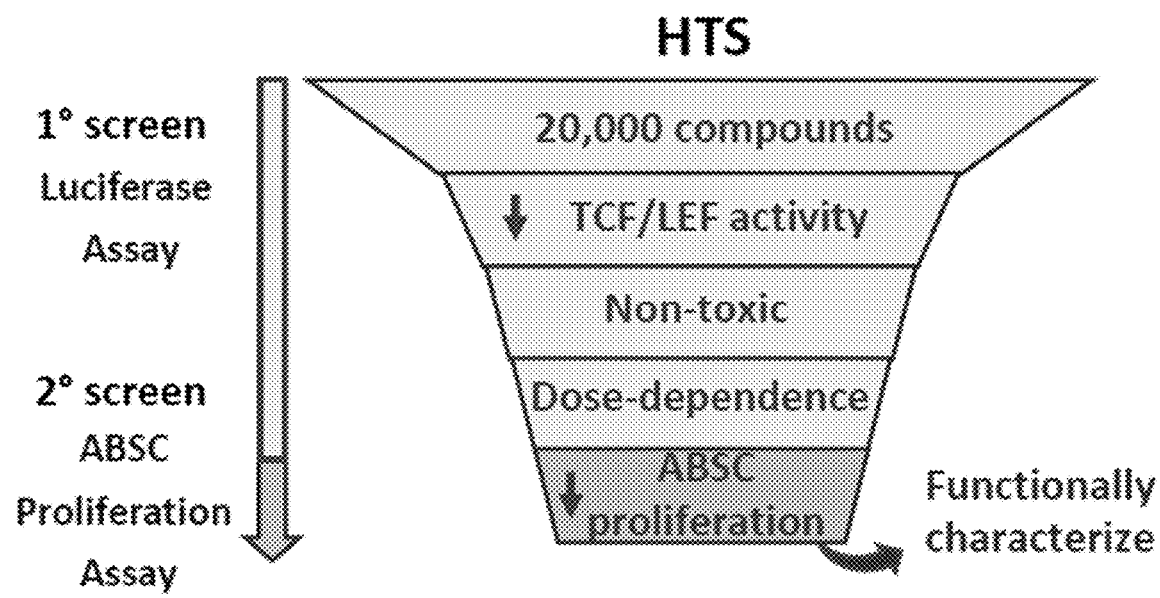
FIG. 3A depicts the methodology of a high-through put drug screen for compounds which would decrease Wnt/β-catenin signaling activity and ABSC proliferation
Figure 3B:
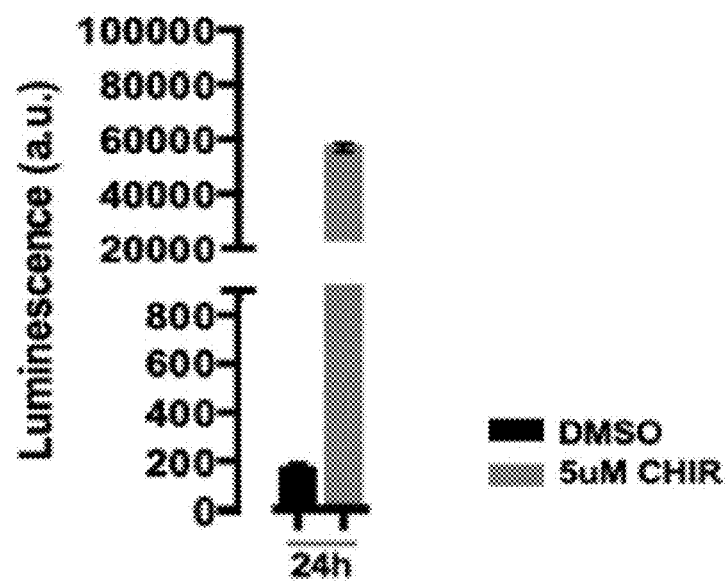
FIG. 3B shows the transduction of BEAS2B cells, a normal human epithelial cell line to stably express a TCF/LEF luciferase reporter that was CHIR-inducible.

Example 4: High-Throughput Drug Screening Identifies a Novel Small Molecule Inhibitor of Canonical Wnt Signaling In light of the finding that Wnt/β-catenin signaling drives ABSC hyperproliferation, a small molecule inhibitors of the pathway that could restore airway homeostasis. A high-throughput drug screen was established to identify compounds capable of reducing TCF/LEF activity measured by a luciferase reporter induced by CHIR treatment in a 384-well format (FIG. 3A). Briefly, white-bottom 384-well plates (Greiner One) were precoated overnight with 0.01 mg/mL fibronectin from human plasma (Sigma F0895), 0.03 mg/mL rat tail collagen type I (Corning 354249), and 0.01 mg/mL BSA (ThermoFisher BP-9706) diluted in 50 uL of Airway Epithelial Cell Growth Medium (PromoCell C21060). Precoat was then aspirated and washed using 100 µL the BioTek EL406. A custom V&P pin tool mounted to a Beckman FX liquid handler was then used to pin 0.5 µL of 10 mM stock compound. 2,000 BEAS2B cells per well were then seeded using the Multidrop. Cells were therefore treated with 1% DMSO, 5 µM CHIR, or 5 µM CHIR+10 µM pinned compound and incubated for 24 hours at 37° C. and 5% $CO_2$. 5 µg/mL Hoechst 33342 was added to each well, incubated for 15 minutes, and wells were visualized using the ImageXpress XL system. 25 µL BrightGlo (Promega) was subsequently added to each well using the BioTek EL405 and incubated for 2 minutes prior reading luminescence values with the Envision plate reader (FIG. 3B). Morphometric measurements were performed by counting Hoechst-labeled cell nuclei per well. These data and BrightGlo luminescence data were uploaded into the Collaborative Drug Discovery (CDD) cloud-based database system. Hits were selected on a cut-off of more than 3 standard deviations from mean using data normalized to reference CHIR-treated wells within each plate. Z' factor values were used to assess assay quality and was calculated by: Z'=1-3(SD Total+ SDBackground)/(MeanTotal-MeanBackground) where SDTotal and MeanTotal are the standard deviation and mean of signal for CHIR-treated wells, and SDBackground and MeanBackground are the standard deviation and mean of signal for DMSO-treated wells. The Z' factor value was calculated to be 0.82.

Figure 3C:
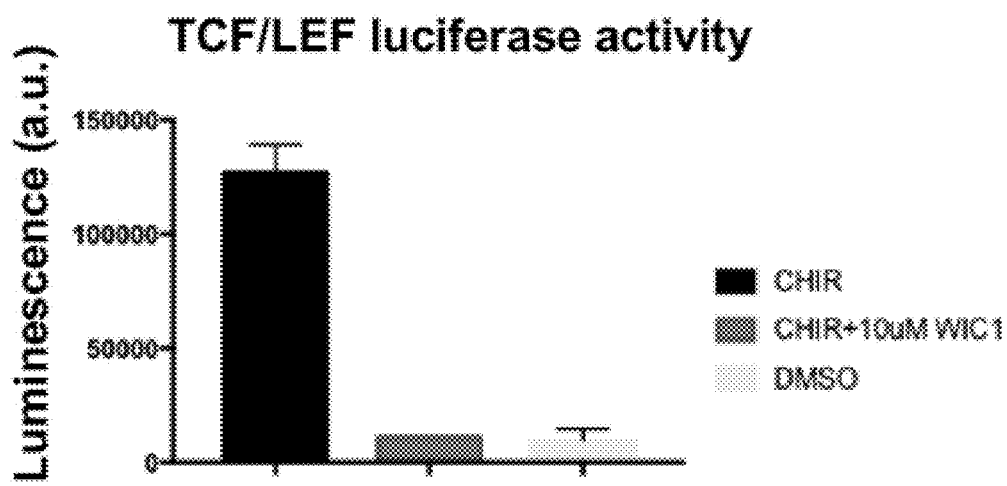
FIG. 3C depicts the results of a TCF/LEF luciferase assay in the transduced BEAS2B cell line. WIC1 decreases TFC/LEF luciferase reporter activity.
Figure 3D:
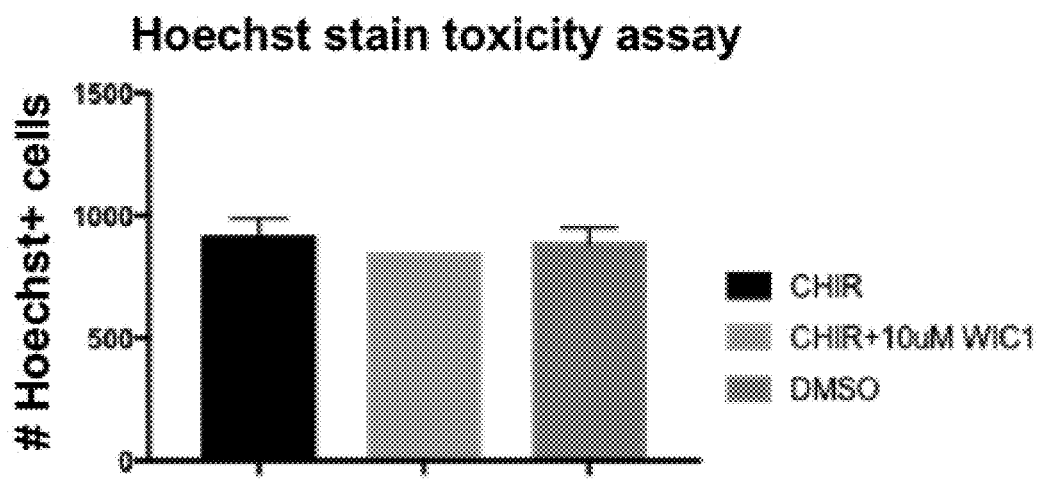
FIG. 3D depicts the results of a Hoechst stain toxicity assay of CHIR, CHIR+10 uM WIC1, and DMSO. WIC1 showed minimal toxicity.
Figure 3E:
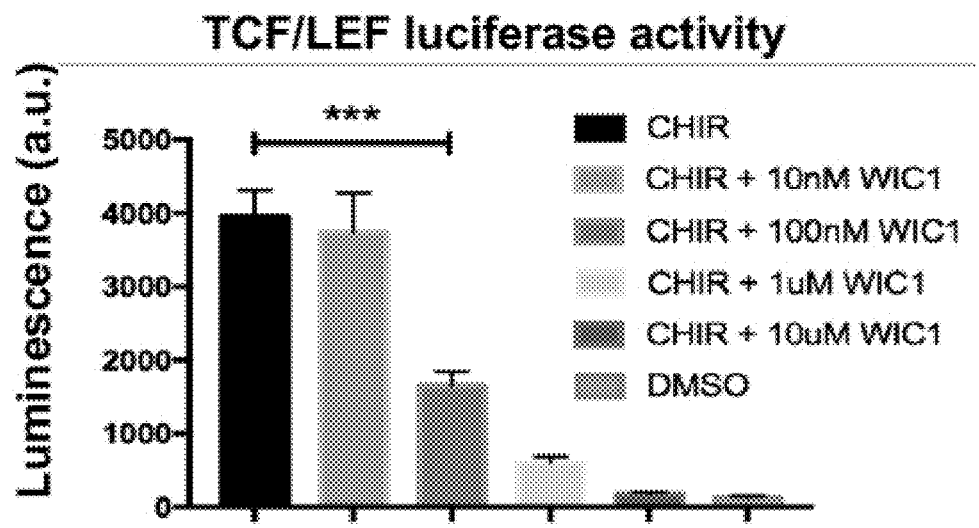
FIG. 3E depicts the results of a TCF/LEF luciferase assay in the transduced BEAS2B cell line wherein the cells were treated with various concentrations of WIC1. Higher concentrations of WIC1 decrease TFC/LEF luciferase reporter activity to a greater extent.
Figure 3F:
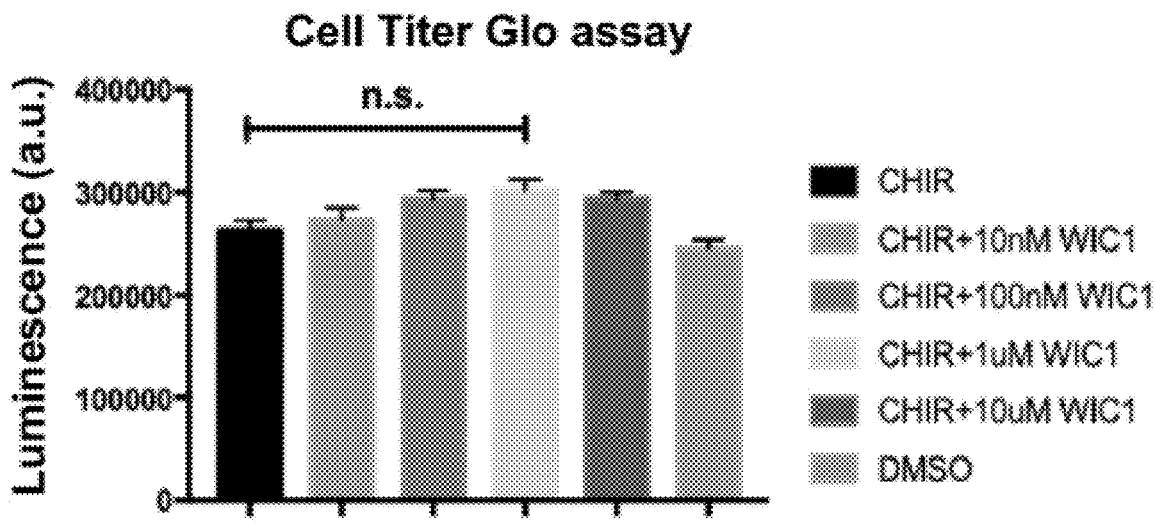
FIG. 3F depicts the results of a Cell Titer GLo assay with various concentrations of WIC1. WIC1 showed minimal toxicity at each concentration.
Figure 3G:
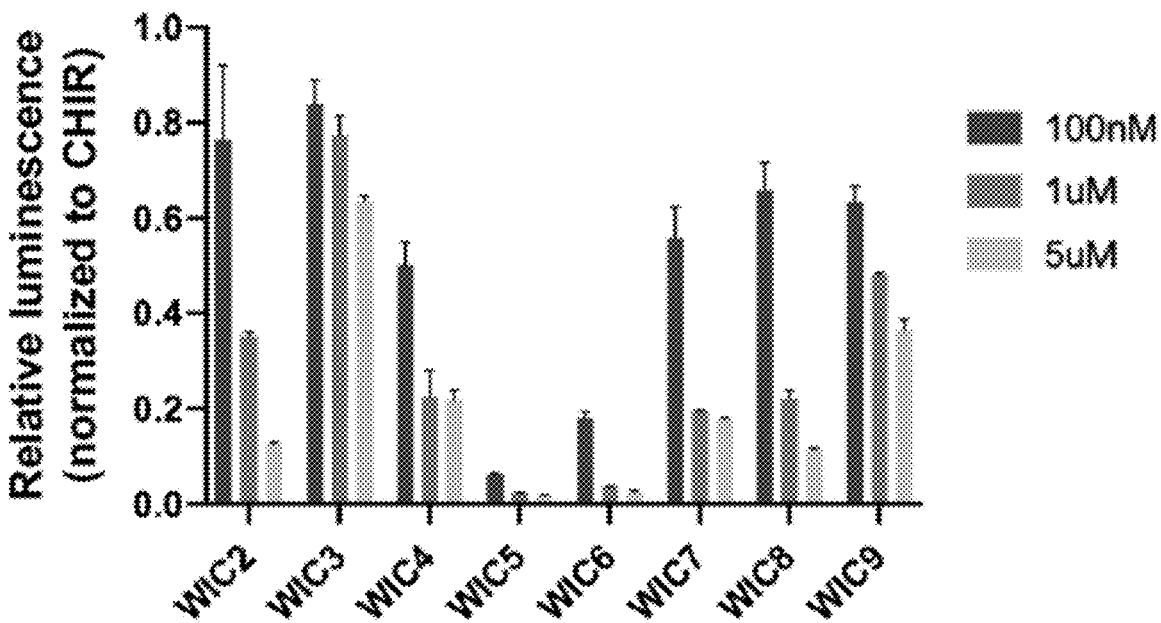
FIG. 3G depicts the activity of other exemplary compounds of the disclosure in the transduced BEAS2B cell line.
Figure 3H:
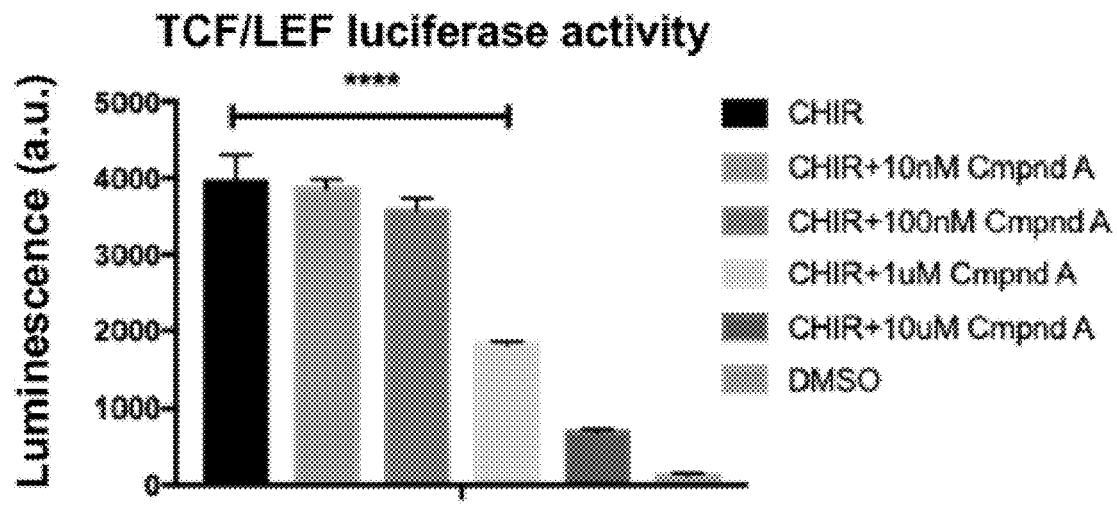
FIG. 3H depicts the results of a TCF/LEF luciferase assay in the transduced BEAS2B cell line wherein the cells were treated with various concentrations of compound A. Higher concentrations of compound A decrease TFC/LEF luciferase reporter activity to a greater extent.
Figure 3I:
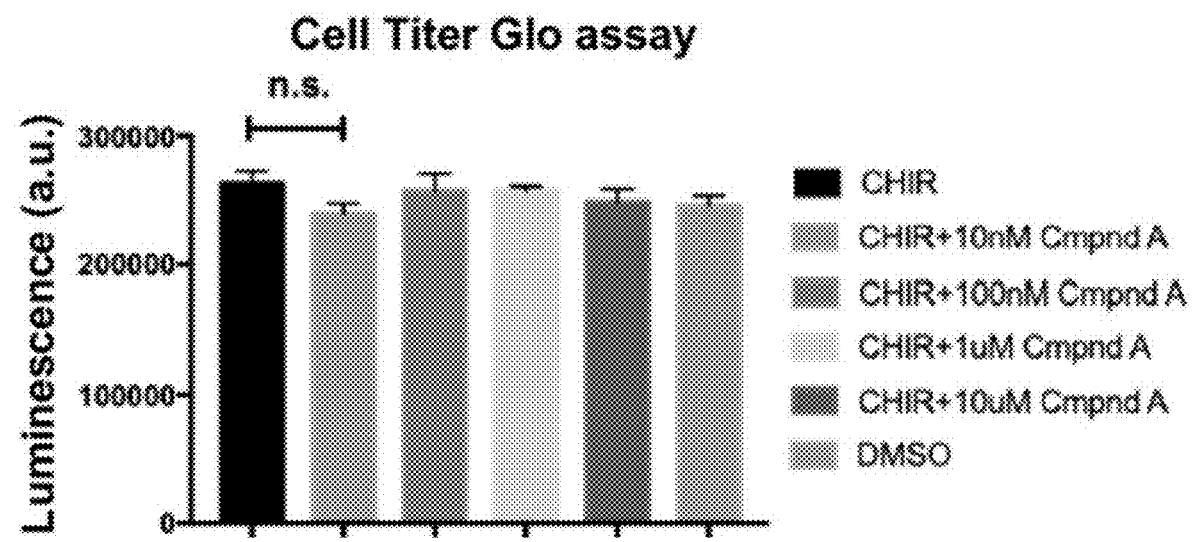
FIG. 3I depicts the results of a Cell Titer GLo assay with various concentrations of compound A. Compound A showed minimal toxicity at each concentration.
Figure 3J:
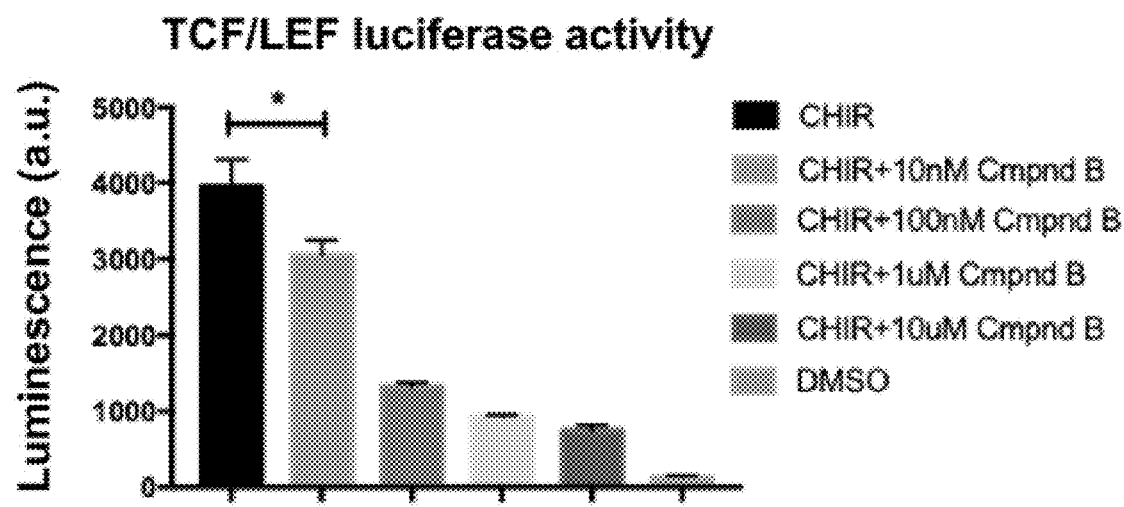
FIG. 3J depicts the results of a TCF/LEF luciferase assay in the transduced BEAS2B cell line wherein the cells were treated with various concentrations of compound B. Higher concentrations of compound B decrease TFC/LEF luciferase reporter activity to a greater extent.
Figure 3K:
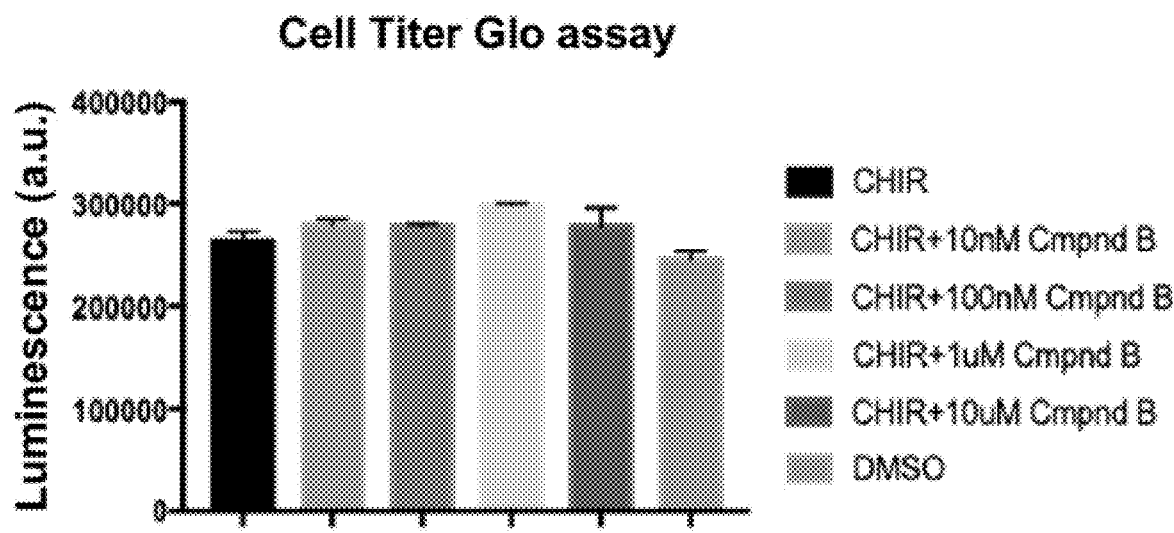
FIG. 3K depicts the results of a Cell Titer GLo assay with various concentrations of compound B. Compound B showed minimal toxicity at each concentration.
Figure 3L:
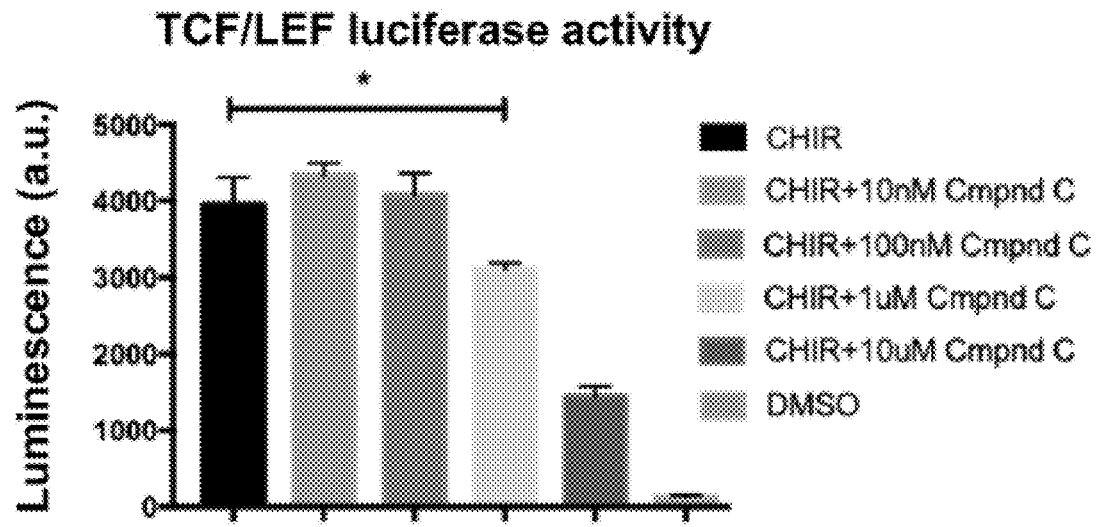
FIG. 3L depicts the results of a TCF/LEF luciferase assay in the transduced BEAS2B cell line wherein the cells were treated with various concentrations of compound C. Higher concentrations of compound C decrease TFC/LEF luciferase reporter activity to a greater extent.
Figure 3M:
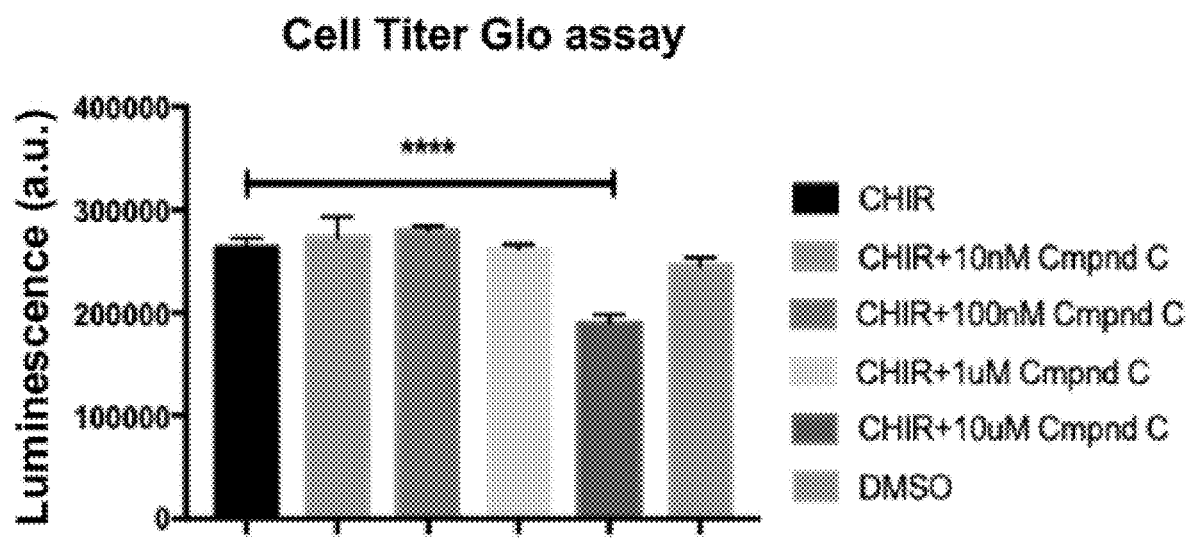
FIG. 3M depicts the results of a Cell Titer GLo assay with various concentrations of compound C. Compound C showed minimal toxicity at each concentration.
Figure 3N:
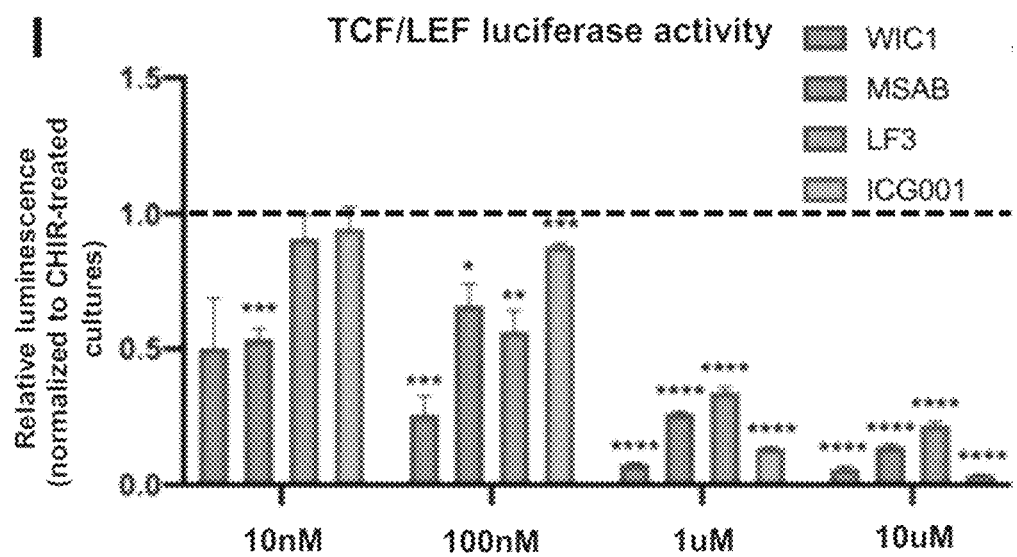
FIG. 3N depicts the results of a TCF/LEF luciferase assay in the transduced BEAS2B cell line wherein the cells were treated with various concentrations of WIC1, MSAB, LF3, or ICG001. MSAB was the only inhibitor that decreased TCF/LEF activity at 10 nM. WIC1 remained the most potent inhibitor at 100 nm and 1 µM.
Figure 3O:
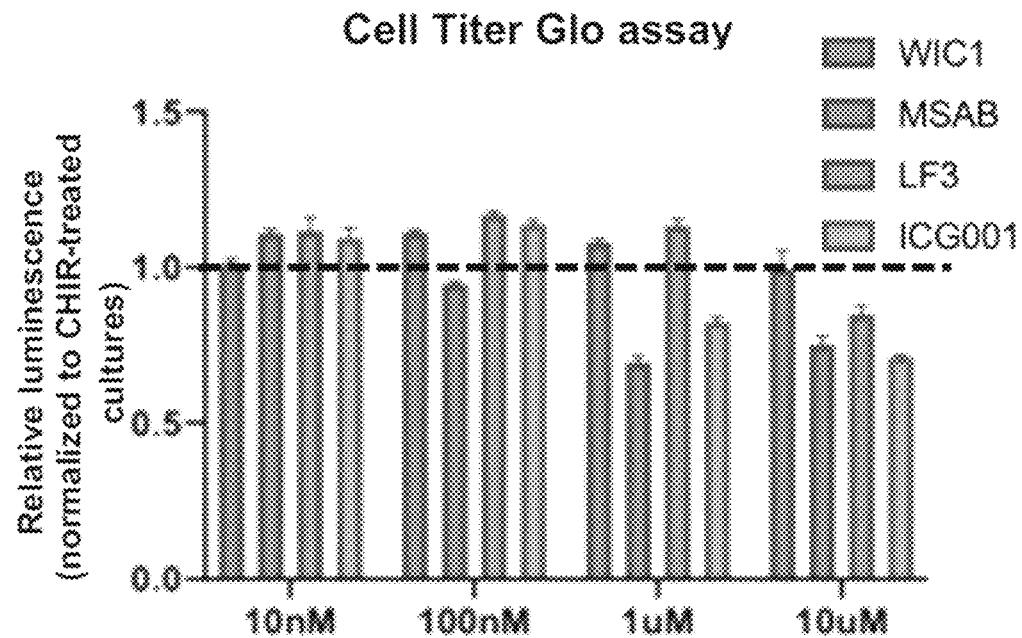
FIG. 3O depicts the results of a Cell Titer GLo assay with various concentrations of WIC1, MSAB, LF3, or ICG001. WIC1 showed minimal toxicity while the other inhibitors all showed dose dependent toxicity.

Compounds that yielded fewer than 80% of nuclei compared to DMSO-controls were considered toxic and removed from further analysis. Approximately 20,000 small molecules were screened and 70 compounds that decreased TCF/LEF activity were identified, 8 of which were non-toxic, and 4 that exhibited dose-dependence. Compounds A-C reproducibly decreased TCF/LEF activity and were non-toxic by Cell Titer Glo (FIGS. 3H-3M), though did not modulate ABSC proliferation (data not shown). However, Wnt Inhibitor Compound 1 (WIC1), was a small molecule that decreased TCF/LEF luciferase reporter activity (FIG. 3C) and displayed no toxicity by Hoechst stain (FIG. 3D). Further, BEAS2Bs treated with a dose course of WIC1 showed a stepwise decrease in TCF/LEF activity (FIG. 3E) and remained non-toxic at 10 µM by Cell Titer Glo assay (FIG. 3F).

In light of the structure of WIC1, structural activity relationship studies with an additional 160 small molecules that bear structural resemblance to WIC1 was conducted. TCF/LEF luciferase dose-course assays was conducted and eight additional small molecules that reproducibly decreased reporter activity, named WIC2-WIC9 were identified.

Figure 2J:
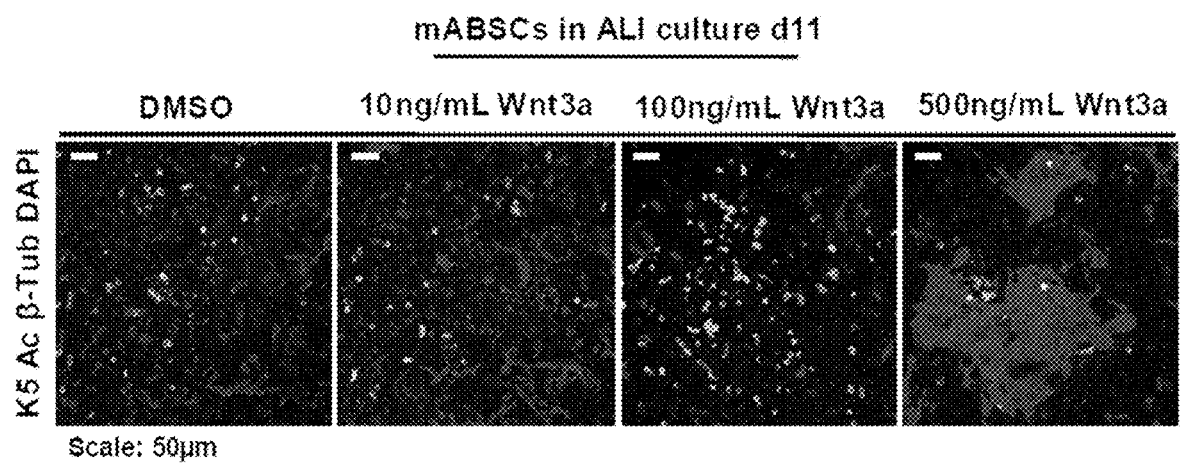
FIGS. 2J and 2K show the results of treating ABSC with varying concentrations of recombinant Wnt3A under ALI conditions. Medium levels of Wnt signaling (100 ng/mL) increased the proportion of ciliated cells, while high levels of Wnt signaling (500 ng/mL) produced fewer ciliated cells at the expense of K5+ mABSC expansion.
Figure 2K:
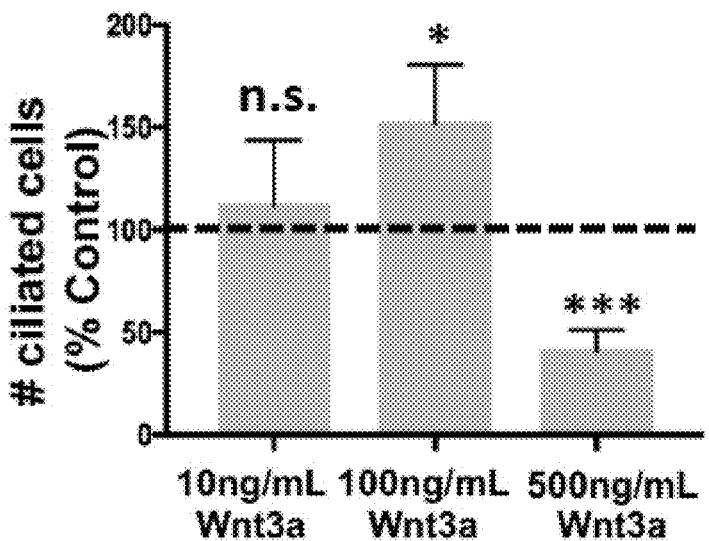
Figure 2L:
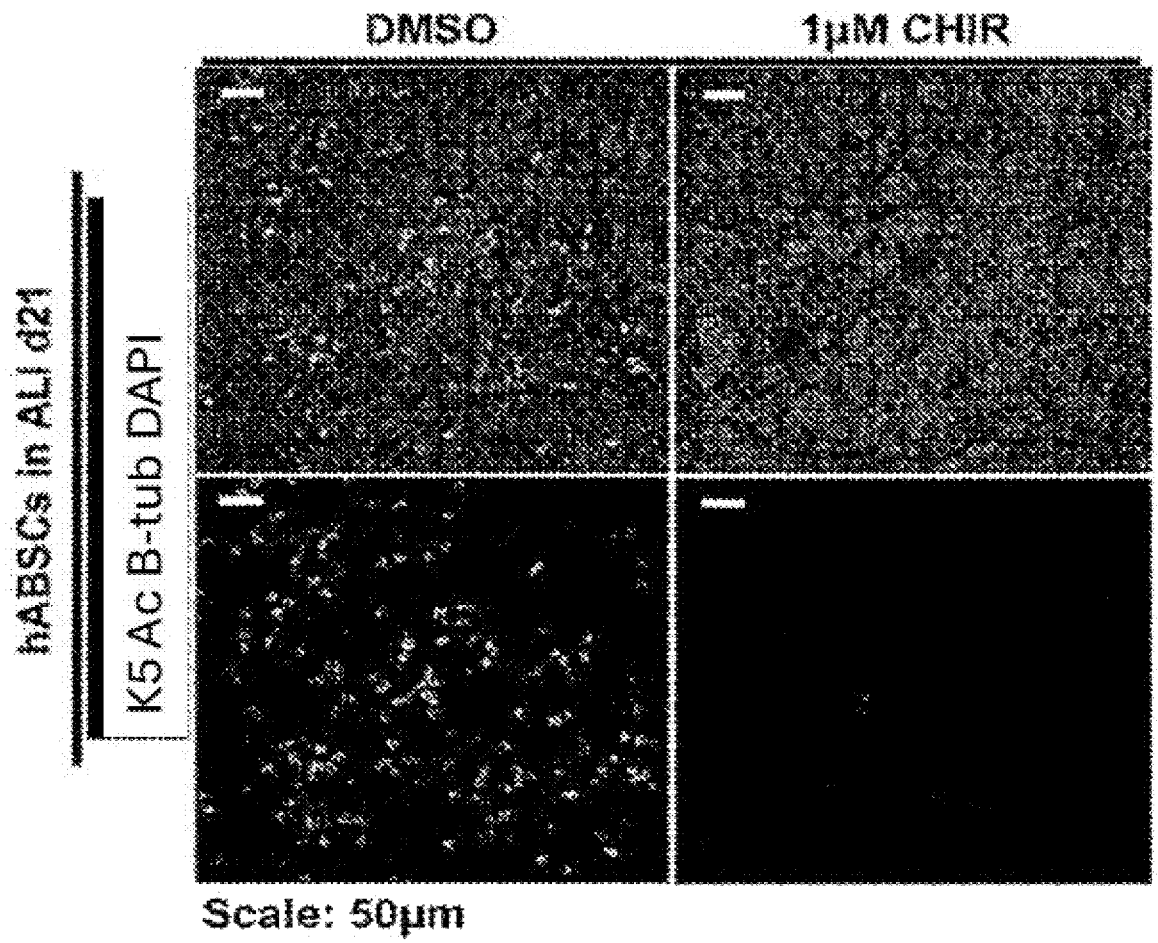
FIGS. 2L and M shows the results of treating human ABSCs with CHIR for 21 days. The treated cells exhibited abolished differentiation to the cilated cell fate and an increased pool for ABSCs.
Figure 2M:
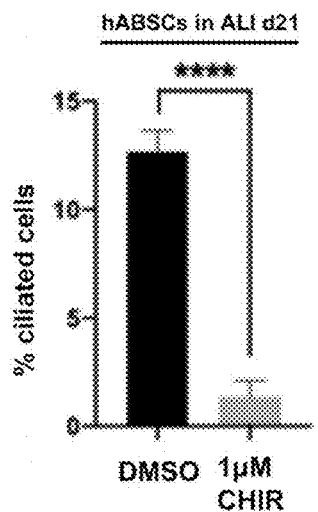
FIG. 2N shows that in mouse ABSCs with CHIR, other phosphorylated forms of β-catenin (p-β-catenin$^{Y654}$, p-β-catenin$^{S552}$, p-β-catenin$^{S33,S37,T41}$) remained primarily cytoplasmic or membranous in the submerged phase of culture.
Figure 2N:
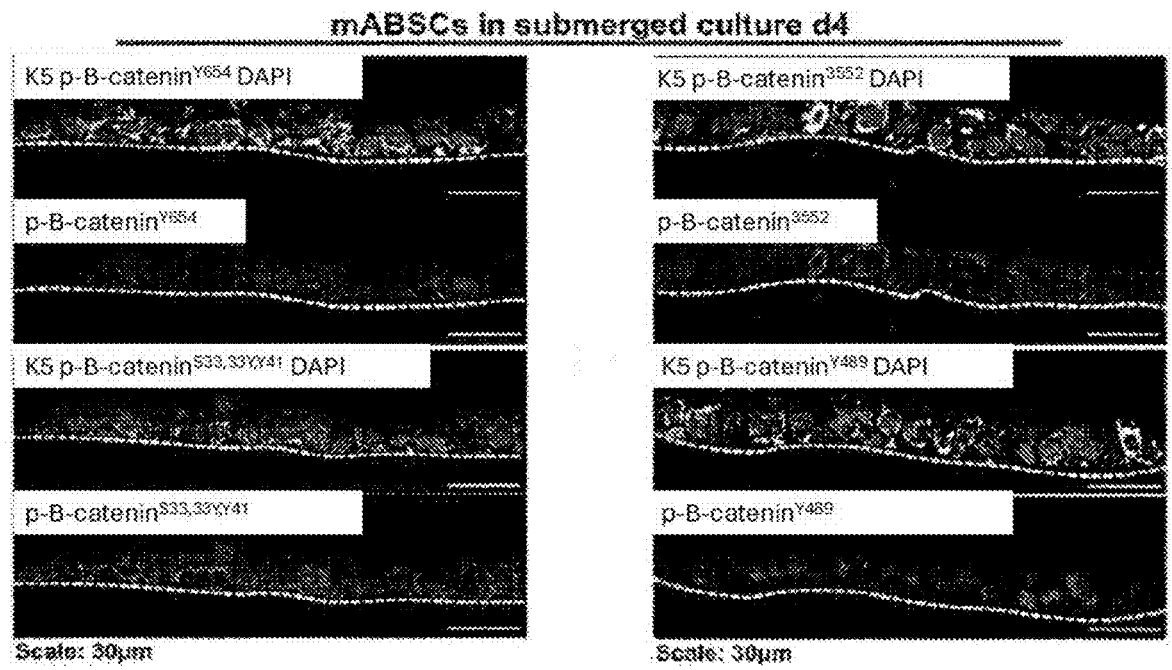
Figure 4A:
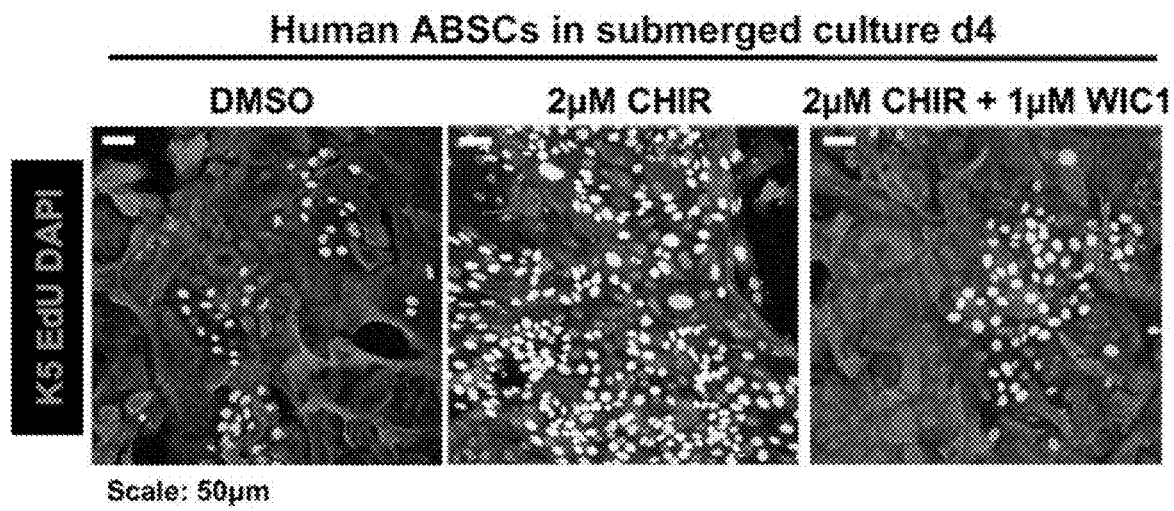
FIGS. 4A and 4B show the results of ABSCs treated with DMSO, CHIR, or CHIR+WIC1. Cultures treated with CHIR+WIC1 displayed a significant reduction in ABSC proliferation.
Figure 4B:
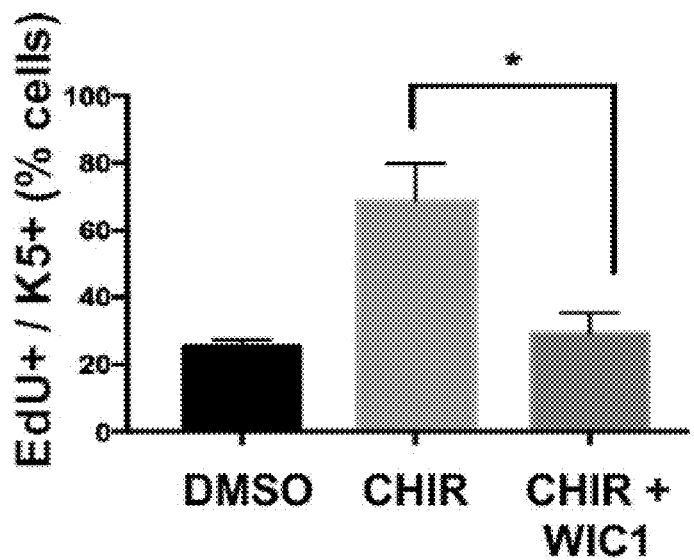
Figure 4C:
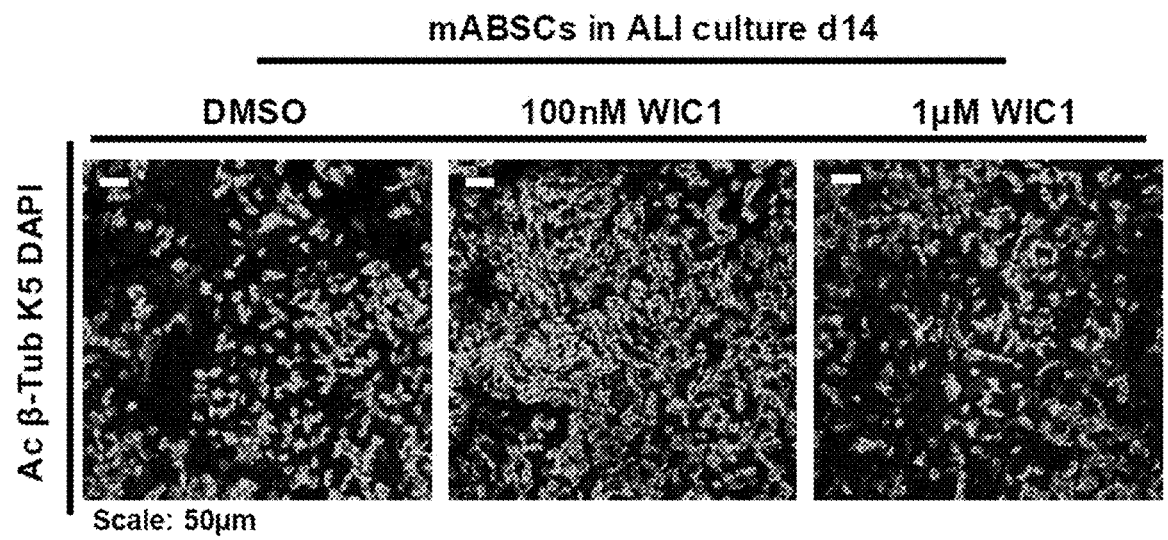
FIGS. 4C and 4D show the results of ABSCs treated with DMSO and WIC1 at varying concentrations under ALI conditions. Cultures treated with WIC1 at 100 nM showed increased differentiation to ciliated cells. However, cultures treated with WIC1 at 1 uM showed no change in differentiation compared to control, suggesting a dose dependent effect.
Figure 4D:
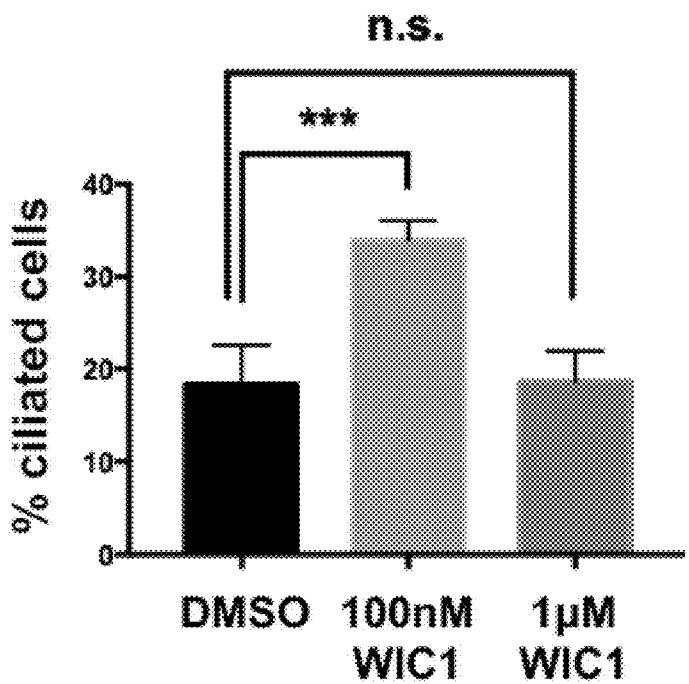
Figure 4E:
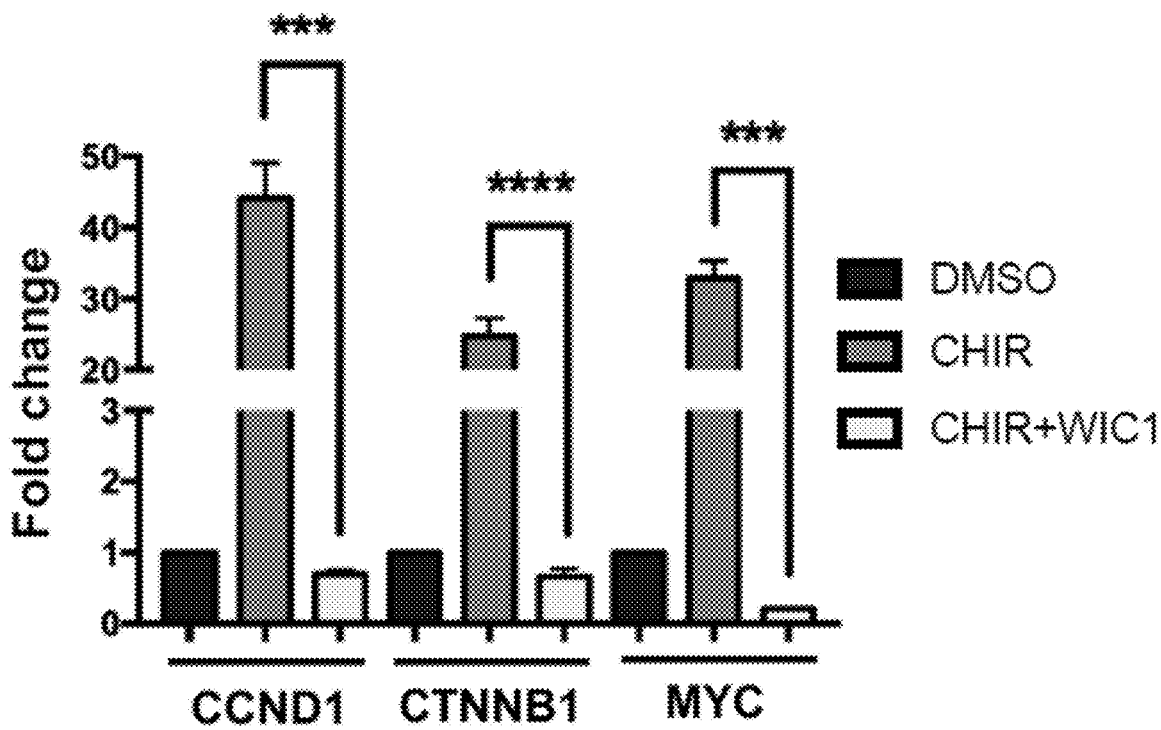
FIG. 4E shows the results of ABSCs treated with DMSO and WIC1 at varying concentrations under ALI conditions. WIC1 treatment resulted in decreased mRNA expression of 145 known downstream Wnt signaling target genes such as CCND1, MYC, and CTNNB1 by qRT-PCR.
Figure 4F:
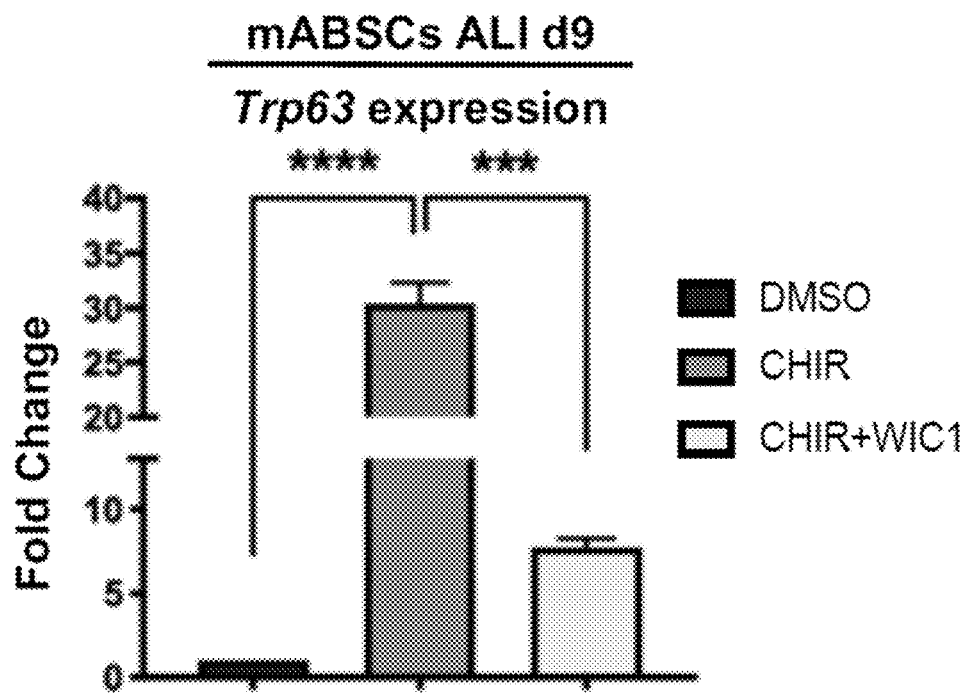
FIG. 4F shows that induction of Trp63 expression with CHIR treatment that is substantially reversed with WIC1 treatment.
Figure 4G:
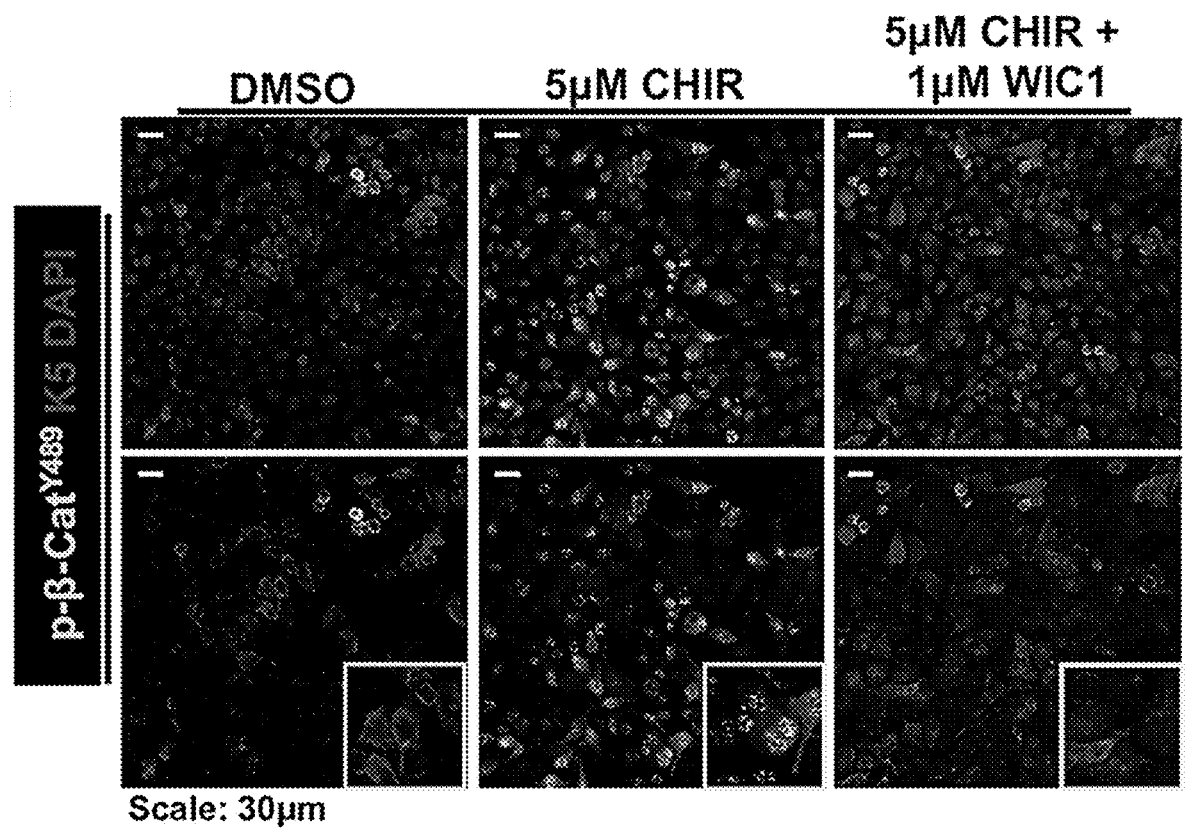
FIGS. 4G and H show that while CHIR treatment induced nuclear localization of p-β-catenin$^{Y489}$, addition of WIC1 to cultures decreased the nuclear localization.
Figure 4H:
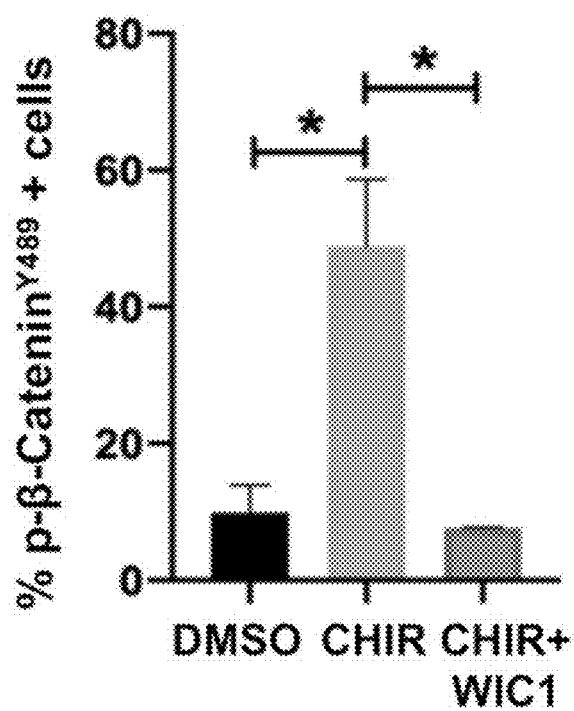
FIGS. 4I and J show the treatment of mABSCs under submerged culture conditions for 4 days with DMSO, 1 µM CHIR, and 1 µM CHIR+either 1 µM WIC1, 1 µM MSAB, 1 µM LF3, or 1 µM ICG001. Cultures treated with CHIR and all of the Wnt inhibitors, including WIC1, decreased mABSC proliferation to a similar degree, as measured by EdU incorporation.
FIGS. 4K and L shows ALI differentiation assay to ciliated cells with mABSCs treated with DMSO and two different concentrations (100 nM and 1 µM) of WIC1, MSAB, LF3, or ICG001. 100 nM of WIC1, LF3, and ICG001 induced a greater proportion of ciliated cells under ALI conditions in comparison to DMSO-treated cultures. However, treatment with 1 µM WIC1, LF3, or ICG001 had no effect on the percentage of ciliated cells in culture. Interestingly, neither 100 nM nor 1 µM MSAB increased differentiation to the ciliated cell fate.
FIG. 4M shows qRT-PCR studies from RNA isolated from BEAS2B cells identified an increase in TP63 expression with the addition of CHIR that was reduced upon addition of WIC1.
Figure 4I:
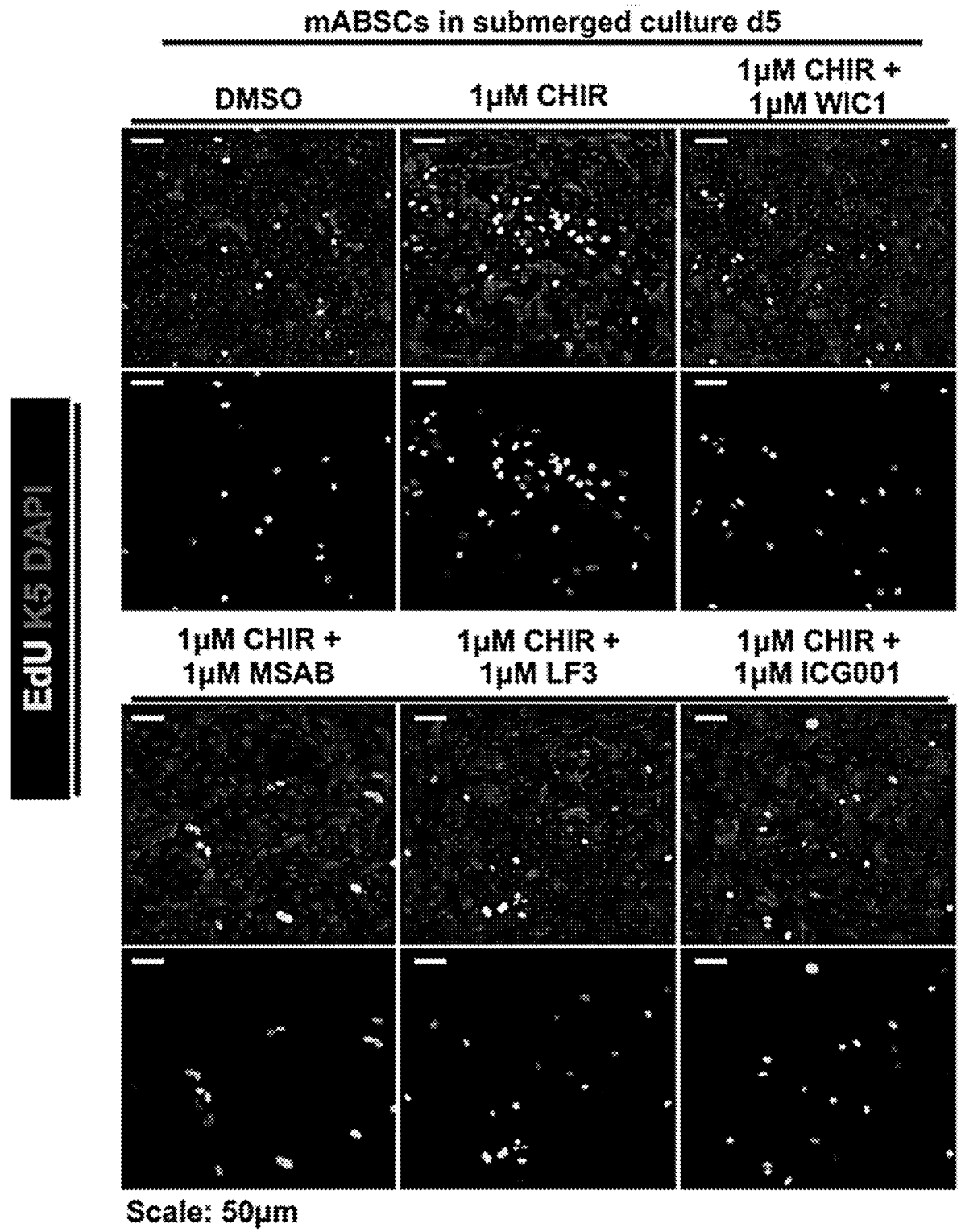
Figure 4J:
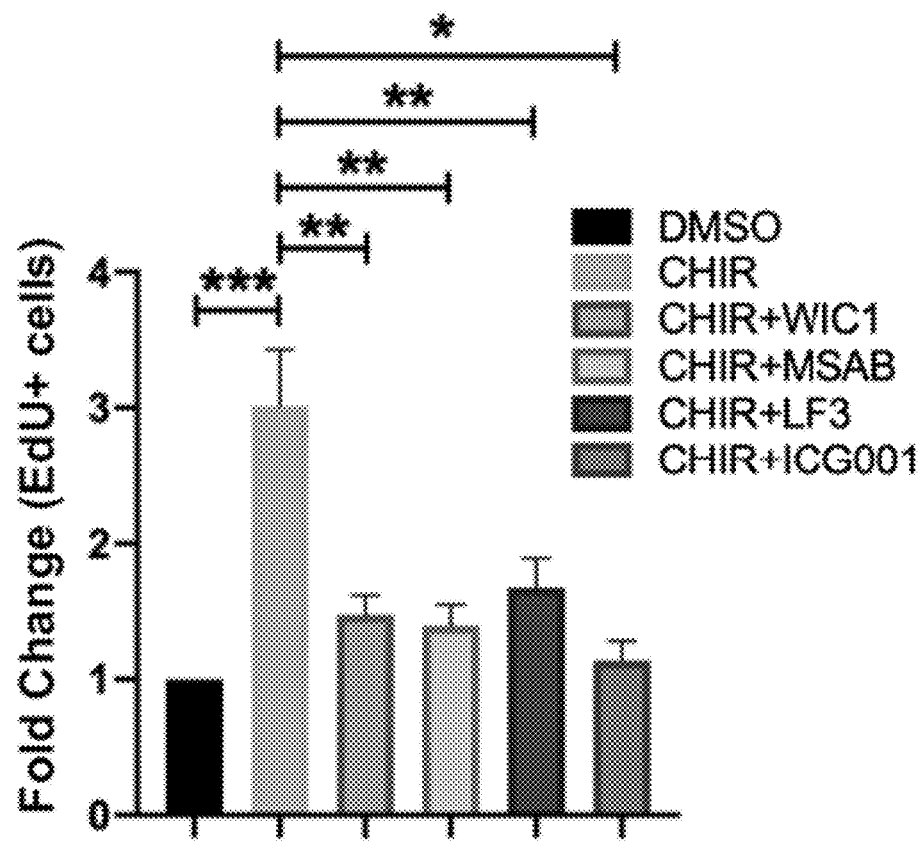
Figure 4K:
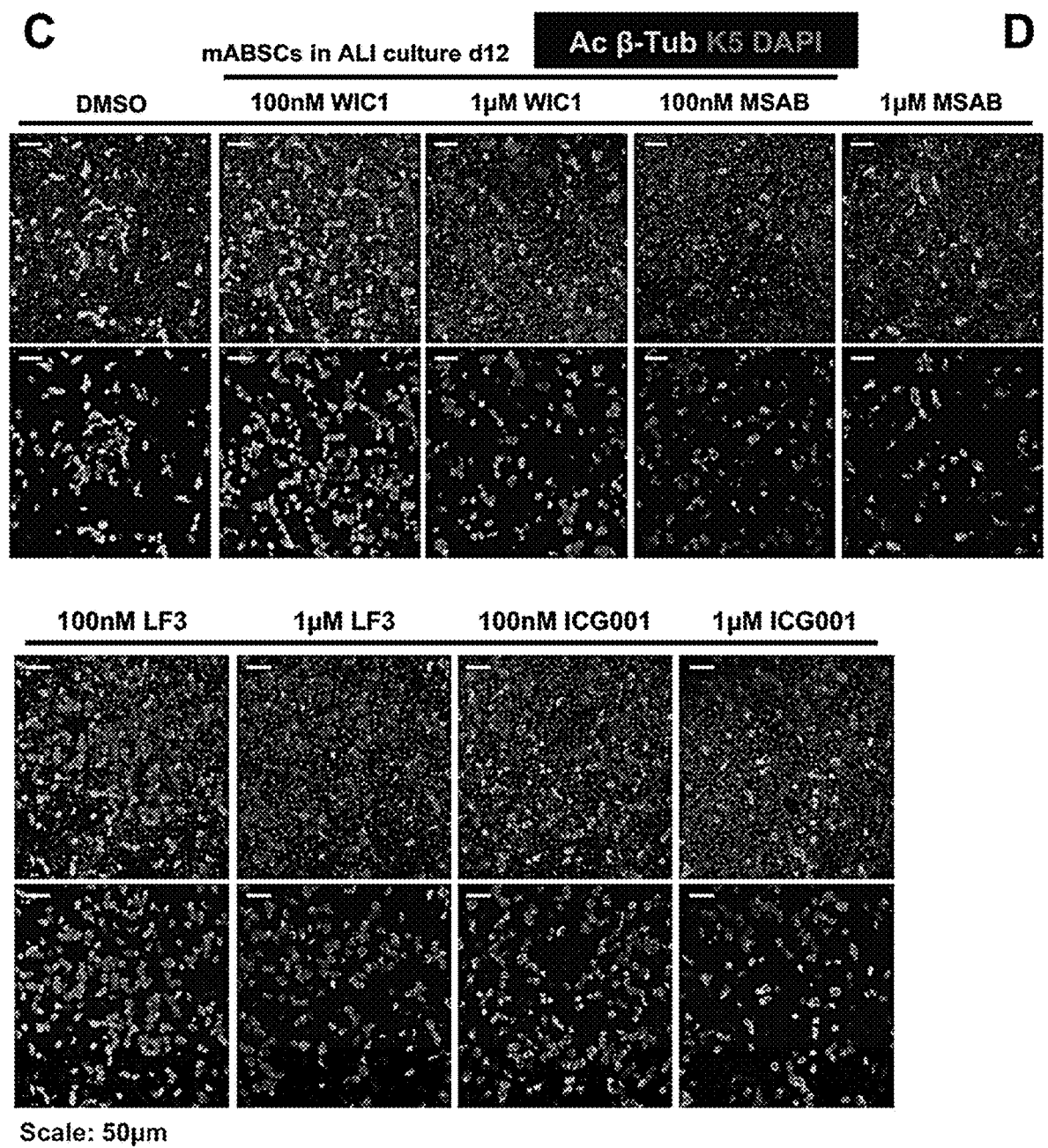
Figure 4L:
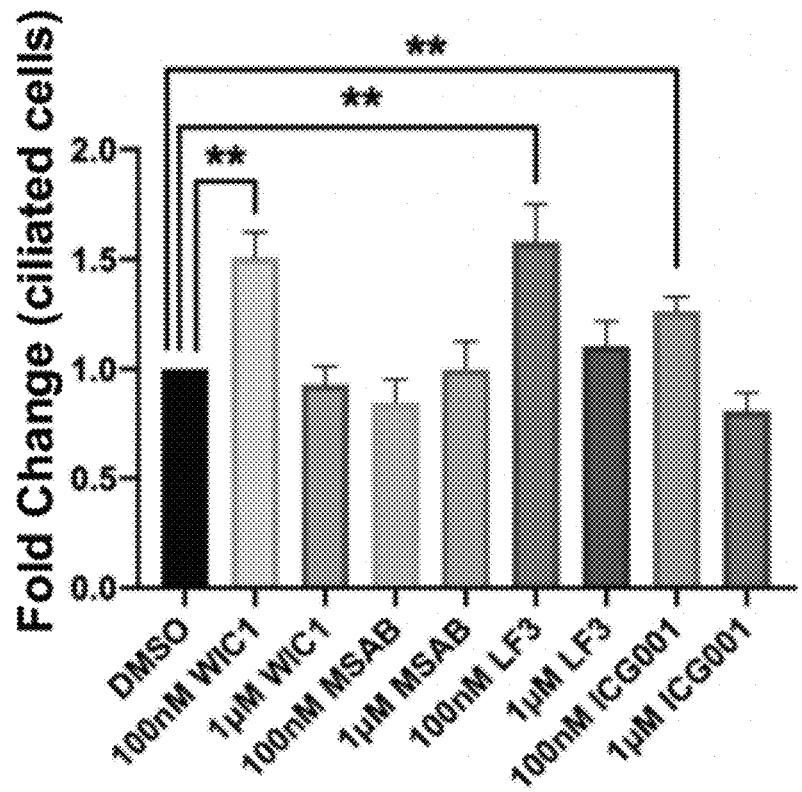
Figure 4M:
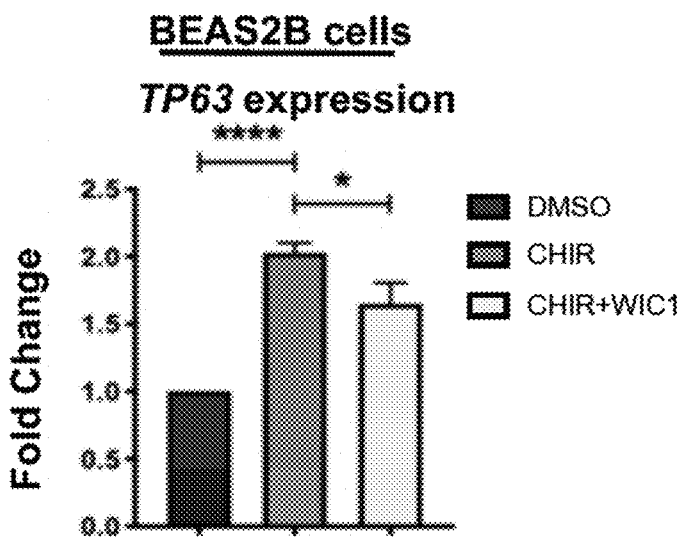

Example 5: WIC1 Inhibits Wnt-Induced ABSC Hyperproliferation and Promotes Ciliated Cell Differentiation To assess whether WIC1 could reverse Wnt/β-catenin-induced ABSC hyperproliferation, human ABSCs were treated with either DMSO, CHIR, or CHIR+WIC1. Cultures treated with CHIR+WIC1 displayed a significant reduction in ABSC proliferation (FIGS. 4A & 4B). It was then sought to determine if WIC1 could promote ABSC differentiation to ciliated cells under ALI conditions. Relative to DMSO-controls, cultures treated with 100 nM WIC1 significantly induced ciliated cell differentiation (FIGS. 4C & 4D). Interestingly, however, higher concentrations of WIC1 (1 µM) decreased the percentage of ciliated cells in culture (FIGS. 4C & 4D), consistent with the observation that tightly regulated levels of Wnt signaling are critical for proper regulation of airway homeostasis (FIGS. 2J & 2K). Further, WIC1 treatment resulted in decreased mRNA expression of known downstream Wnt signaling target genes such as CCND1, MYC, and CTNNB1 by qRT-PCR (FIG. 4E).

Collectively, these efforts identified a phosphorylated form of β-catenin that becomes activated in human patients during excessive ASBC proliferation in premalignancy and stepwise progression to SqLC. Importantly, WIC1 restores homeostasis to the airway epithelium by preventing ABSC hyperproliferation and improving differentiation to the ciliated cell fate. The combination of these effects improves mucociliary clearance and airway health. It therefore has implications for use in other airway diseases with poor mucociliary clearance, such as COPD.

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A method of treating squamous lung cancer in a subject comprising administering to the subject a compound selected from

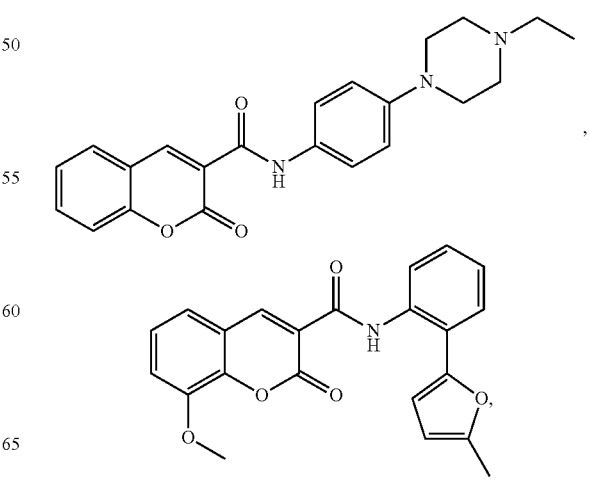

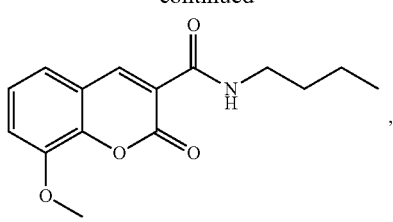

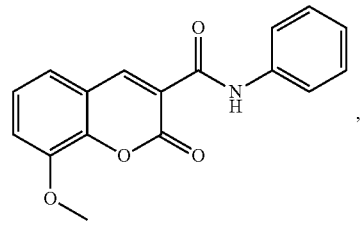

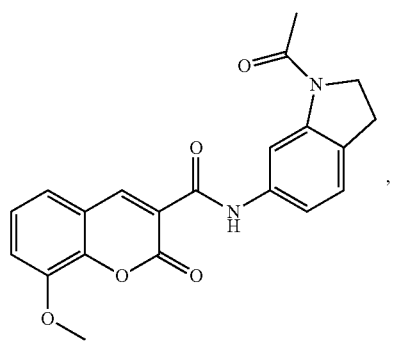

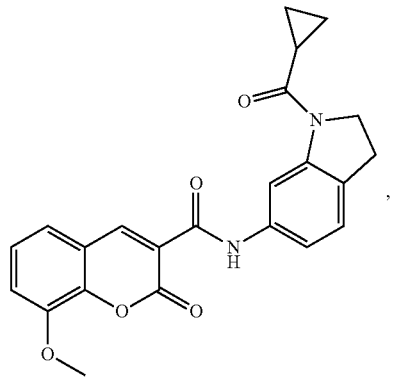

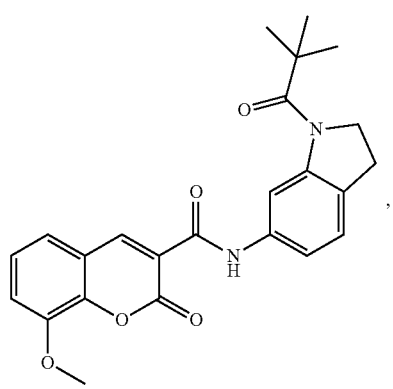

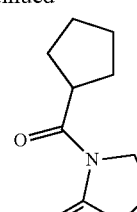

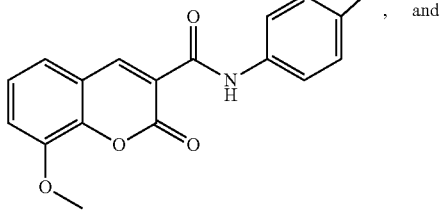

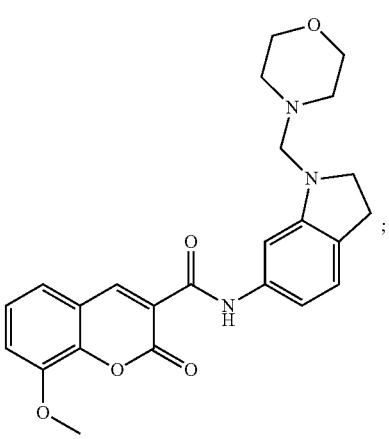

or a pharmaceutically acceptable salt thereof.

2. The method of claim 1, wherein the method inhibits ABSC hyperproliferation.

3. The method of claim 1, wherein the compound is administered by pulmonary administration.

4. The method of claim 1, wherein prior to the administration of the compound, the subject has suffered an airway injury.

5. The method of claim 4, wherein the subject suffered the injury 1, 2, 3, 4, 5, 6, 7, 8, 9, 10, 11, or 12 months prior to administration of the compound.

6. The method of claim 1, wherein the compound is

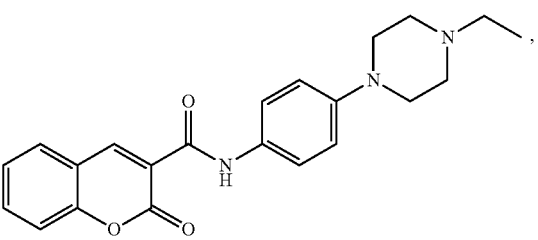 [SMILES: CCN1CCN(c2ccc(NC(=O)c3cc4ccccc4oc3=O)cc2)CC1]

or a pharmaceutically acceptable salt thereof.

7. The method of claim 1, wherein the compound is

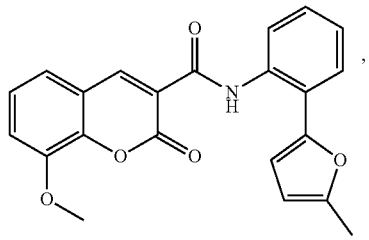 [SMILES: COc1cccc2cc(C(=O)Nc3ccccc3-c3ccc(C)o3)c(=O)oc12]

or a pharmaceutically acceptable salt thereof.

8. The method of claim 1, wherein the compound is

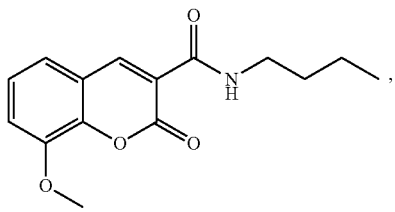 [SMILES: CCCCNC(=O)c1cc2cccc(OC)c2oc1=O]

or a pharmaceutically acceptable salt thereof.

9. The method of claim 1, wherein the compound is

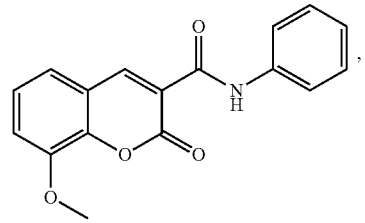 [SMILES: COc1cccc2cc(C(=O)Nc3ccccc3)c(=O)oc12]

or a pharmaceutically acceptable salt thereof.

10. The method of claim 1, wherein the compound is

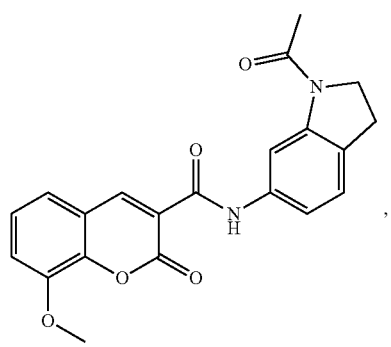 [SMILES: COc1cccc2cc(C(=O)Nc3ccc4c(c3)N(C(C)=O)CC4)c(=O)oc12]

or a pharmaceutically acceptable salt thereof.

11. The method of claim 1, wherein the compound is

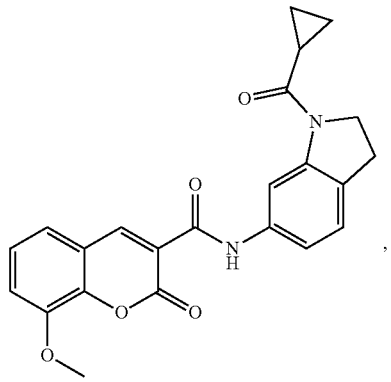 [SMILES: COc1cccc2cc(C(=O)Nc3ccc4c(c3)N(C(=O)C3CC3)CC4)c(=O)oc12]

or a pharmaceutically acceptable salt thereof.

12. The method of claim 1, wherein the compound is

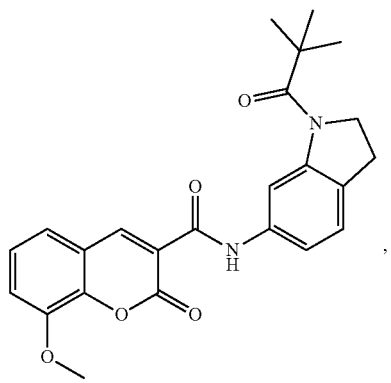 [SMILES: COc1cccc2cc(C(=O)Nc3ccc4c(c3)N(C(=O)C(C)(C)C)CC4)c(=O)oc12]

or a pharmaceutically acceptable salt thereof.

13. The method of claim 1, wherein the compound is

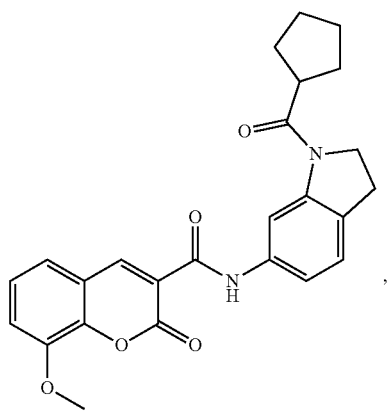 [SMILES: COc1cccc2cc(C(=O)Nc3ccc4c(c3)N(C(=O)C3CCCC3)CC4)c(=O)oc12]

or a pharmaceutically acceptable salt thereof.

14. The method of claim 1, wherein the compound is
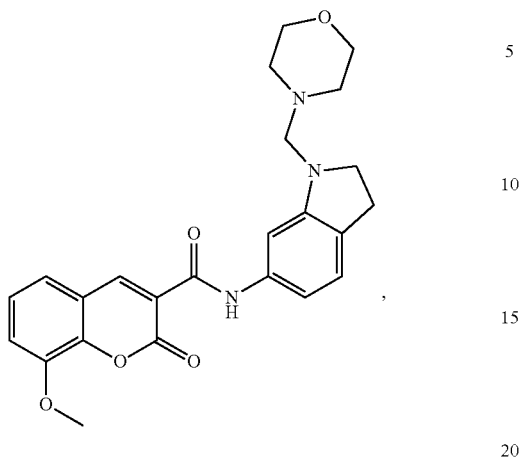
or a pharmaceutically acceptable salt thereof.
* * * * *